(12) United States Patent
Wakamatsu et al.

(10) Patent No.: US 11,729,487 B2
(45) Date of Patent: Aug. 15, 2023

(54) IMAGE PICKUP APPARATUS AND CONTROL METHOD THEREFOR

(71) Applicant: CANON KABUSHIKI KAISHA, Tokyo (JP)

(72) Inventors: Nobushige Wakamatsu, Tokyo (JP); Shinnosuke Osawa, Yokohama (JP); Ryota Ogawa, Kawasaki (JP); Yuki Tsuihiji, Yokohama (JP); Yusuke Shimizu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/371,437

(22) Filed: Jul. 9, 2021

(65) Prior Publication Data

US 2021/0337100 A1    Oct. 28, 2021

Related U.S. Application Data

(63) Continuation of application No. 16/830,028, filed on Mar. 25, 2020, now Pat. No. 11,102,389, which is a (Continued)

(30) Foreign Application Priority Data

Sep. 28, 2017    (JP) .................................. 2017-188938
Dec. 28, 2017    (JP) .................................. 2017-254231
Mar. 20, 2018    (JP) .................................. 2018-053078

(51) Int. Cl.
*H04N 23/60*      (2023.01)
*H04N 23/56*      (2023.01)
*G03B 17/02*      (2021.01)
*H04N 23/50*      (2023.01)
*H04N 23/68*      (2023.01)
*H04N 23/695*     (2023.01)
*G03B 15/00*      (2021.01)
*G03B 17/56*      (2021.01)
(Continued)

(52) U.S. Cl.
CPC ............. *H04N 23/60* (2023.01); *H04N 23/56* (2023.01); *G03B 17/02* (2013.01)

(58) Field of Classification Search
CPC .. H04N 5/232; H04N 5/2256; H04N 5/23222; H04N 5/23258; H04N 5/23287; H04N 5/23299; H04N 5/23216
See application file for complete search history.

(56) References Cited

U.S. PATENT DOCUMENTS

| 5,864,363 A | 1/1999 | Giefing et al. |
| 2003/0049027 A1 | 3/2003 | Umeda et al. |

(Continued)

FOREIGN PATENT DOCUMENTS

| CN | 102496195 A | 6/2012 |
| CN | 104978956 A | 10/2015 |

(Continued)

*Primary Examiner* — Christopher K Peterson
(74) *Attorney, Agent, or Firm* — Canon U.S.A., Inc. IP Division

(57) ABSTRACT

An image pickup apparatus is configured to change a shooting process based on data on a shot image. The image pickup apparatus is configured to, when the image pickup apparatus changes the shooting process, assign greater weights to the data on the shot image based on an instruction from a user than to the data on the shot image automatically processed.

14 Claims, 34 Drawing Sheets

Related U.S. Application Data continuation of application No. PCT/JP2018/034818, filed on Sep. 20, 2018.

(51) Int. Cl.
*G03B 5/00* (2021.01)
*G03B 7/091* (2021.01)
*H04N 23/51* (2023.01)
*H04N 23/54* (2023.01)
*H04N 23/55* (2023.01)
*H04N 23/58* (2023.01)
*H04N 23/61* (2023.01)

(56) References Cited

U.S. PATENT DOCUMENTS

| | | | |
|---|---|---|---|
| 2005/0114132 A1 | 5/2005 | Hsu | |
| 2010/0070483 A1* | 3/2010 | Delgo | G06F 16/739 707/706 |
| 2010/0171846 A1 | 7/2010 | Wood et al. | |
| 2016/0182800 A1 | 6/2016 | Kaneko | |
| 2016/0191810 A1* | 6/2016 | Tsubusaki | H04N 5/232945 348/240.1 |
| 2016/0269613 A1 | 9/2016 | Kallstrom et al. | |
| 2017/0155824 A1* | 6/2017 | Ikeda | H04N 5/23254 |
| 2017/0330335 A1* | 11/2017 | Hayashi | G06T 1/20 |
| 2018/0330526 A1* | 11/2018 | Corcoran | H04N 7/181 |
| 2019/0077353 A1* | 3/2019 | Lopez | G08G 1/07 |

FOREIGN PATENT DOCUMENTS

| | | |
|---|---|---|
| CN | 106292991 A | 1/2017 |
| CN | 107211088 A | 9/2017 |
| JP | 2002010135 A | 1/2002 |
| JP | 2002344957 A | 11/2002 |
| JP | 2009188792 A | 8/2009 |
| JP | 2009194900 A | 8/2009 |
| JP | 2012175533 A | 9/2012 |
| JP | 2012235257 A | 11/2012 |
| JP | 2013054430 A | 3/2013 |
| JP | 2016033571 A | 3/2016 |
| JP | 2016119615 A | 6/2016 |
| JP | 2016156877 A | 9/2016 |
| RU | 2541353 C2 | 2/2015 |
| WO | 2009079809 A1 | 7/2009 |

* cited by examiner

FIG. 26
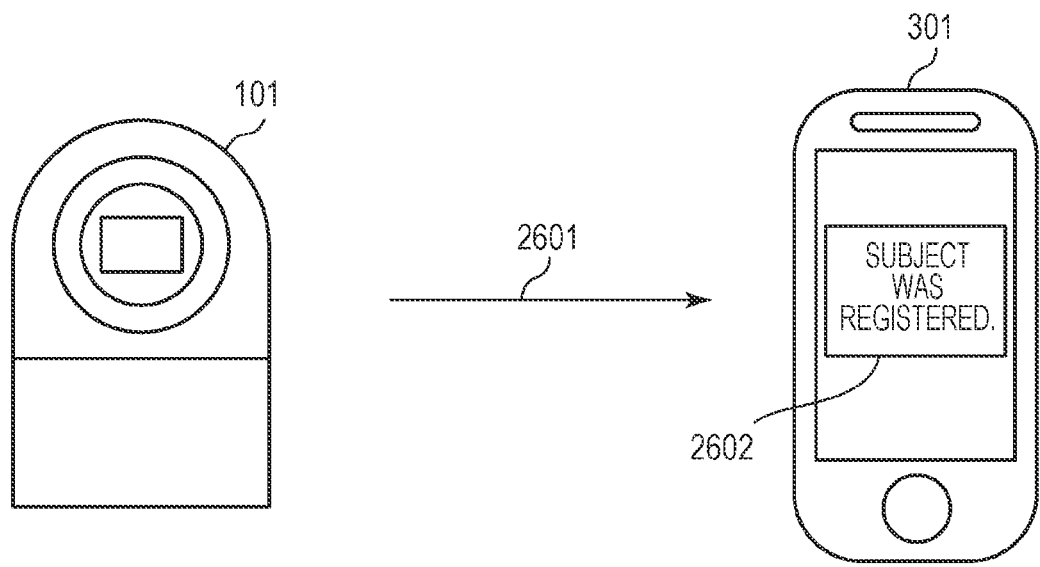
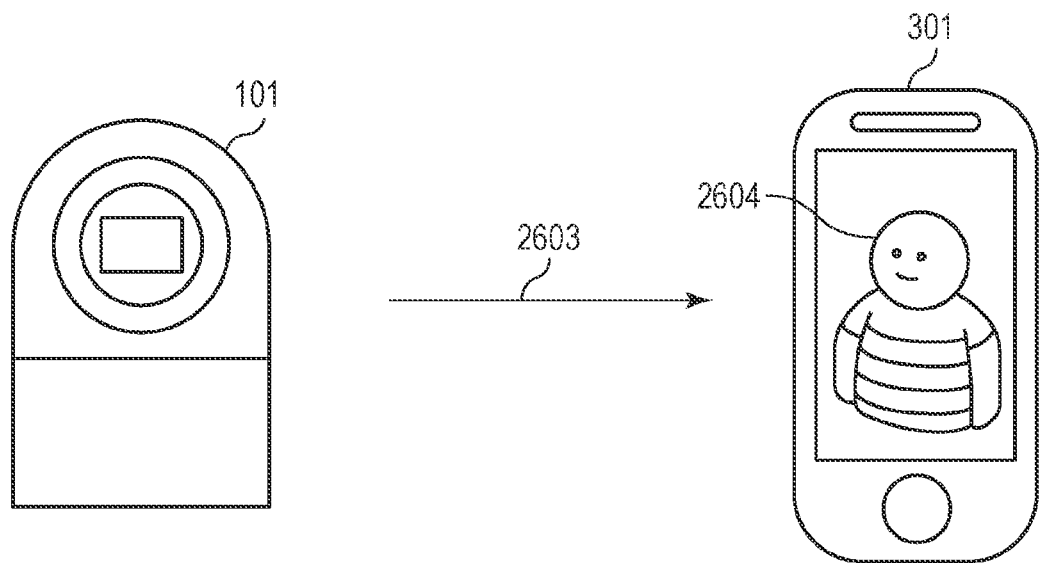

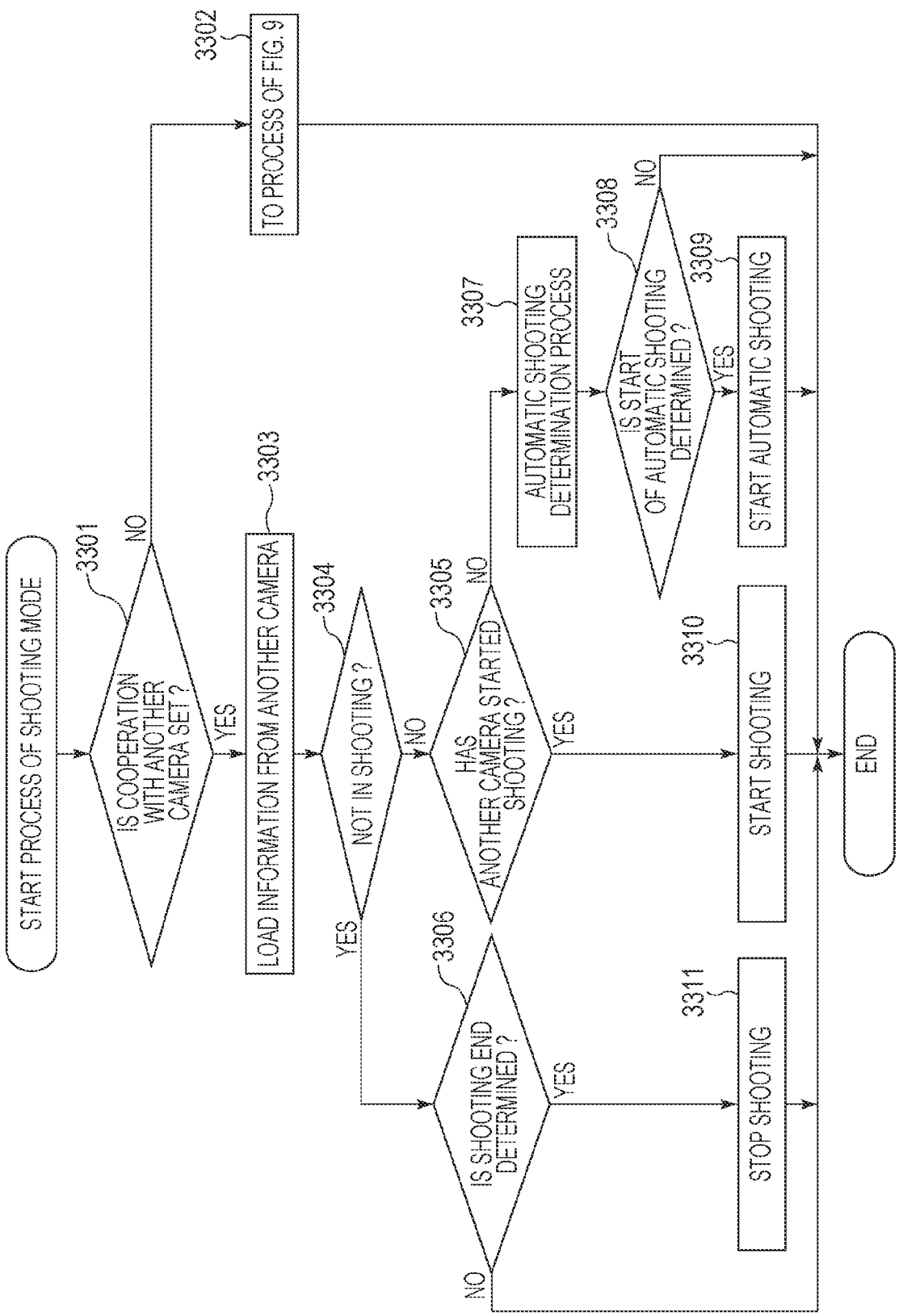

IMAGE PICKUP APPARATUS AND CONTROL METHOD THEREFOR

CROSS-REFERENCE TO RELATED APPLICATIONS

This application is a Continuation of U.S. patent application Ser. No. 16/830,028, filed Mar. 25, 2020, which is a Continuation of International Patent Application No. PCT/JP2018/034818, filed Sep. 20, 2018, which claims the benefit of Japanese Patent Application No. 2017-188938, filed Sep. 28, 2017, Japanese Patent Application No. 2017-254231, filed Dec. 28, 2017, and Japanese Patent Application No. 2018-053078, filed Mar. 20, 2018, all of which are hereby incorporated by reference herein in their entirety.

TECHNICAL FIELD

The present invention relates to an image pickup apparatus and a control method therefor.

BACKGROUND ART

In still image or video shooting with an image pickup apparatus, such as a camera, a user usually shoots an image by deciding a subject to be shot through a viewfinder, or the like, and adjusting the framing of the image to be shot through checking shooting conditions on his or her own. Such an image pickup apparatus has a function of detecting an error in user operation and informing the user of the error or detecting an external environment and, when the external environment is not suitable for shooting an image, informing the user that the environment is unsuitable. In addition, there is an existing mechanism of controlling a camera such that the camera is placed in a state suitable for shooting an image.

Such image pickup apparatuses that shoot an image through user operation include a life log camera that periodically and continually captures an image without a user shooting instruction (PCT Japanese Translation Patent Publication No. 2016-536868). A life log camera is used in a state of being attached to the body of a user with a strap, or the like, and records a scene that the user sees in a daily life as a video image at set time intervals. A life log camera shoots an image not at intended timing, such as the timing that a user releases a shutter, but at set time intervals, so an unexpected moment that is not usually shot can be recorded as a video image.

SUMMARY OF INVENTION

However, when a life log camera periodically and automatically shoots an image in a state where a user is wearing the life log camera, a video image that is not a user's preference may be acquired, and a video image of a moment that the user really wants may be not acquired.

The present invention is made in view of the above-described inconvenience, and it is an object of the present invention to provide an image pickup apparatus that is able to acquire a video image of a user's preference without any user's particular operation.

A technical characteristic of the present invention is a control method for an image pickup apparatus and includes a changing step of changing a process of the image pickup apparatus based on first data on a shot image shot by a shooting unit. In the changing step, when the process of the image pickup apparatus is changed, greater weights are assigned to the first data on the shot image based on an instruction from a user than to the first data on the shot image automatically processed.

Further features of the present invention will become apparent from the following description of exemplary embodiments with reference to the attached drawings.

BRIEF DESCRIPTION OF DRAWINGS

FIG. 26 is a diagram that illustrates notifying a smart device 301 that a subject was registered.

FIG. 33 is a flowchart that illustrates a process of the image pickup apparatus 101 when the image pickup apparatus 101 and the another camera 3201 are connected.

DESCRIPTION OF EMBODIMENTS

First Embodiment

Configuration of Image Pickup Apparatus

FIG. 1 is a diagram that schematically shows an image pickup apparatus of a first embodiment.

Figure 1A:
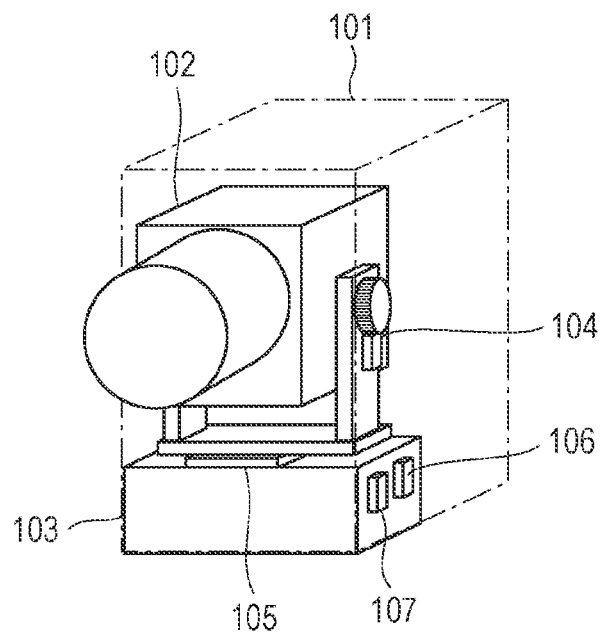
FIG. 1A is a diagram that schematically shows an image pickup apparatus.
Figure 1B:
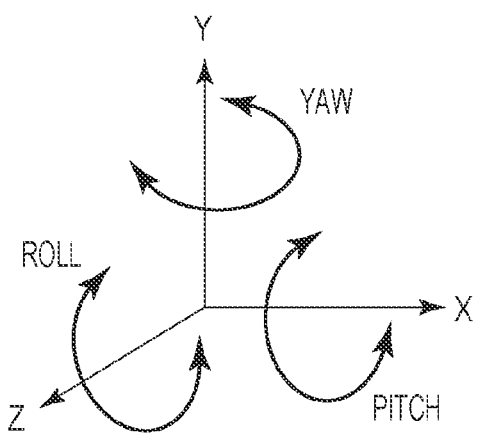
FIG. 1B is a view that illustrates a pitch direction, a yaw direction, and a roll direction.

The image pickup apparatus 101 shown in FIG. 1A includes an operating member with which a power switch can be operated (hereinafter, referred to as power button; however, which may also be an operation, such as tapping, flicking, and swiping, on a touch panel), and other components. A lens barrel 102 that is a housing containing a shooting lens group and imaging element that capture an image is installed in the image pickup apparatus 101. The lens barrel 102 has a rotation mechanism that can drive and turn the lens barrel 102 with respect to a fixed part 103. A tilt unit 104 is a motor-driven mechanism that can turn the lens barrel 102 in a pitch direction shown in FIG. 1B. A pan unit 105 is a motor-driven mechanism that can turn the lens barrel 102 in a yaw direction. Thus, the lens barrel 102 is turnable around one or more axes. FIG. 1B is a definition of axes in the position of the fixed part 103. An angular velocity meter 106 and an accelerometer 107 both are mounted on the fixed part 103 of the image pickup apparatus 101. The vibration of the image pickup apparatus 101 is detected based on the angular velocity meter 106 and the accelerometer 107. The tilt unit and the pan unit are rotationally driven based on the detected angle of vibration. Thus, a movement of the lens barrel 102 that is a movable part is corrected, or an inclination of the lens barrel 102 is corrected.

Figure 2:
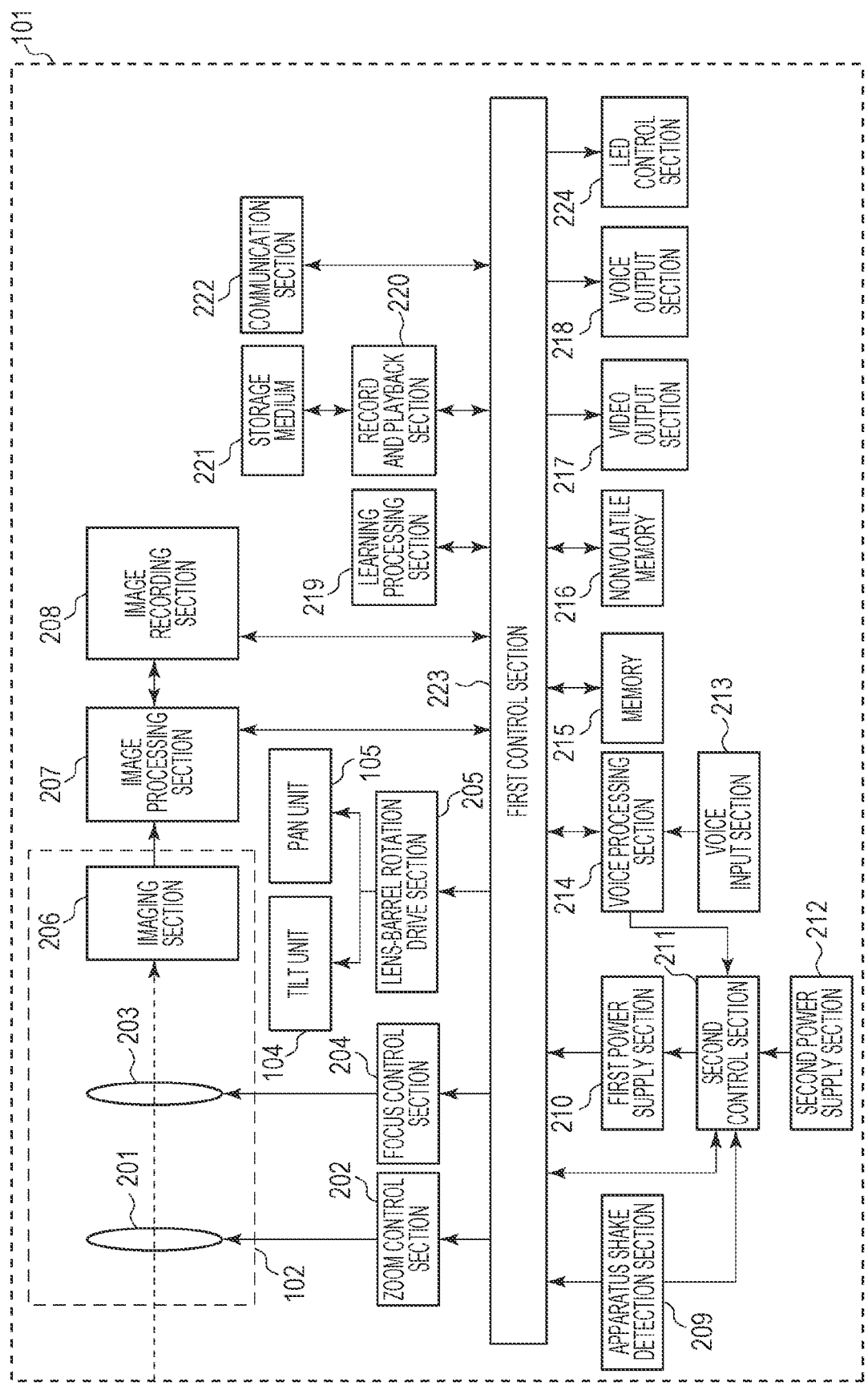
FIG. 2 is a diagram that shows the configuration of the image pickup apparatus.

FIG. 2 is a block diagram that shows the configuration of the image pickup apparatus of the present embodiment.

In FIG. 2, a first control section 223 is made up of a processor (for example, a CPU, a GPU, a microprocessor, an MPU, or the like), and a memory (for example, a DRAM, an SRAM, or the like). These control the blocks of the image pickup apparatus 101 by executing various processes or control data transfer among the blocks. A non-volatile memory (EEPROM) 216 is an electrically erasable and recordable memory. Constants, programs, and the like, for the operation of the first control section 223 are stored in the non-volatile memory 216.

In FIG. 2, a zoom unit 201 includes a zoom lens for scaling. A zoom control section 202 drives and controls the zoom unit 201. A focus unit 203 includes a lens for focus adjustment. A focus control section 204 drives and controls the focus unit 203.

In an imaging section 206, an imaging element receives light entering through lens groups and outputs information of electric charge commensurate with the amount of light to an image processing section 207 as analog image data. The image processing section 207 applies image processing, such as distortion correction, white balance adjustment, and color interpolation, to digital image data output through analog-to-digital conversion, and outputs the processed digital image data. The digital image data output from the image processing section 207 is converted by an image recording section 208 into a recording format, such as JPEG format, and is sent to a memory 215 or a video output section 217 (described later).

A lens-barrel rotation drive section 205 drives the tilt unit 104 and the pan unit 105 to cause the lens barrel 102 to be driven in a tilt direction and a pan direction.

In an apparatus shake detection section 209, for example, the angular velocity meter (gyro sensor) 106 that detects the three-axis angular velocities of the image pickup apparatus 101 and the accelerometer (acceleration sensor) 107 that detects the three-axis accelerations of the apparatus are mounted. The apparatus shake detection section 209 computes the rotation angle of the apparatus, the shift amount of the apparatus, and the like, based on the detected signals.

A voice input section 213 acquires a voice signal around the image pickup apparatus 101 from a microphone provided in the image pickup apparatus 101, performs analog-to-digital conversion on the voice signal, and sends the voice signal to a voice processing section 214. The voice processing section 214 executes a speech-related process, such as a process of optimizing the input digital voice signal. The voice signal processed by the voice processing section 214 is sent to the memory 215 by the first control section 223. The memory 215 temporarily stores an image signal obtained by the image processing section 207 and a voice signal obtained by the voice processing section 214.

The image processing section 207 reads out the image signal temporarily stored in the memory 215, for example, encodes the image signal, and generates a compressed image signal. The voice processing section 214 reads out the voice signal temporarily stored in the memory 215, for example, encodes the voice signal, and generates a compressed voice signal. The first control section 223 sends these compressed image signal and compressed voice signal to a record and playback section 220.

The record and playback section 220 records the compressed image signal generated by the image processing section 207, the compressed voice signal generated by the voice processing section 214, and other control data, and the like, related to shooting on a recording medium 221. When a voice signal is not compression-encoded, the first control section 223 sends the voice signal generated by the voice processing section 214 and the compressed image signal generated by the image processing section 207 to the record and playback section 220 and causes the record and playback section 220 to record the voice signal and the compressed image signal on the recording medium 221.

The recording medium 221 may be a recording medium built in the image pickup apparatus 101 or a removable recording medium. The recording medium 221 is able to record various data, such as a compressed image signal, compressed voice signal, and voice signal generated in the image pickup apparatus 101. A medium having a larger capacity than the non-volatile memory 216 is generally used as the recording medium 221. For example, the recording medium 221 may be a recording medium of any type, such as a hard disk, an optical disk, a magneto-optical disk, a CD-R, a DVD-R, a magnetic tape, a non-volatile semiconductor memory, and a flash memory.

The record and playback section 220 reads out (plays back) a compressed image signal, compressed voice signal, voice signal, various data, and programs recorded on the recording medium 221. The first control section 223 sends the read compressed image signal to the image processing section 207 and sends the compressed voice signal to the voice processing section 214. The image processing section 207 temporarily stores the compressed image signal in the memory 215, decodes the compressed image signal in a predetermined procedure, and sends the decoded signals to the video output section 217. The voice processing section 214 temporarily stores the compressed voice signal in the memory 215, decodes the compressed voice signal in a predetermined procedure, and sends the decoded signals to a voice output section 218.

A plurality of microphones is mounted on the image pickup apparatus 101 as the voice input section 213. The voice processing section 214 is able to detect the direction of a sound in a plane in which the plurality of microphones is installed and is used for searching or automatic shooting (described later). Furthermore, the voice processing section 214 detects specific voice commands. The voice commands may be some commands registered in advance, and may also be configured so that a user can register a specific voice in the image pickup apparatus. The voice processing section 214 also performs sound scene recognition. In sound scene recognition, a sound scene determination is performed by a network trained in advance through machine learning based on a large amount of voice data. For example, a network for detecting a specific scene, such as "a cheer rose", "clapping", and "speaking", is set in the voice processing section 214. When a specific sound scene or a specific voice command is detected, the voice processing section 214 is configured to output a detection trigger signal to the first control section 223 or a second control section 211.

The second control section 211, provided separately from the first control section 223 that controls the overall main system of the image pickup apparatus 101, controls an electric power supplied to the first control section 223.

A first power supply section 210 and a second power supply section 212 respectively supply an electric power for operating the first control section 223 and an electric power for operating the second control section 211. When the power button provided for the image pickup apparatus 101 is depressed, both the first control section 223 and the second control section 211 are initially supplied with an electric power; however, as will be described later, the first control section 223 is controlled to cause the first power supply section 210 to stop the electric power supplied to itself. While the first control section 223 is not in operation as well, the second control section 211 is in operation, and receives information from the apparatus shake detection section 209 or the voice processing section 214. The second control section is configured to execute a determination process as to whether to start up the first control section 223 based on various pieces of input information. When a startup is determined, the second control section is configured to provide an instruction to the first power supply section to supply an electric power.

The voice output section 218 outputs a preset voice pattern from a speaker built in the image pickup apparatus 101, for example, during shooting, or the like.

An LED control section 224 controls an LED provided for the image pickup apparatus 101 in a preset light blinking pattern, for example, during shooting, or the like.

The video output section 217 is made up of, for example, a video output terminal, and sends an image signal for causing a connected external display, or the like, to display a video image. The voice output section 218 and the video output section 217 may be a combined one terminal, for example, a terminal like a high-definition multimedia interface (HDMI) (registered trademark) terminal.

A communication section 222 performs communication between the image pickup apparatus 101 and an external apparatus and, for example, sends or receives data, such as a voice signal, an image signal, a compressed voice signal, and a compressed image signal. The communication section 222 also receives a shooting-related control signal, such as shooting start and stop commands and panning/tilting or zooming, and drives the image pickup apparatus 101 based on an instruction from an external apparatus bidirectionally communicable with the image pickup apparatus 101. The communication section 222 also sends or receives information, such as various learning-related parameters to be processed in a learning processing section 219 (described later), between the image pickup apparatus 101 and the external apparatus. The communication section 222 is, for example, a wireless communication module, such as an infrared communication module, Bluetooth (registered trademark) communication module, a wireless LAN communication module, a wireless USB, and a GPS receiver.

Configuration with External Communication Device

Figure 3:
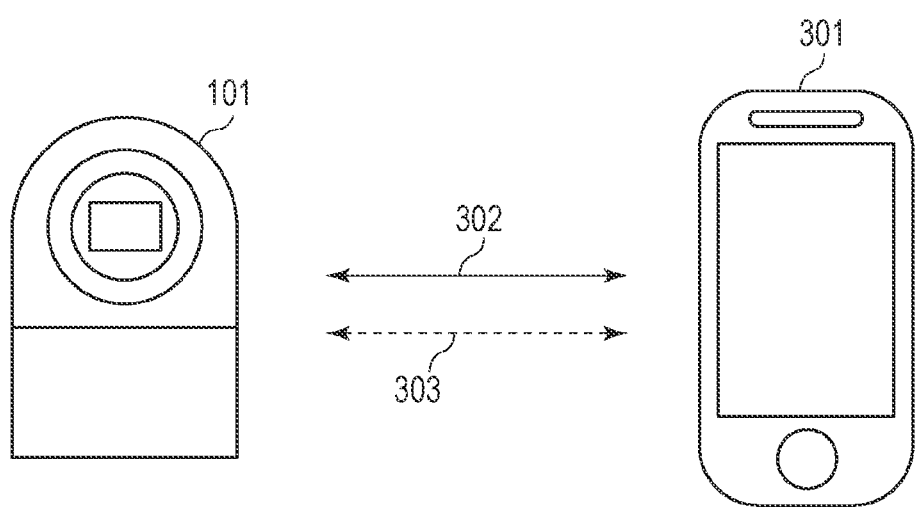
FIG. 3 is a diagram that shows the configuration of the image pickup apparatus and external apparatus.

FIG. 3 is a diagram that shows an example of the configuration of a wireless communication system between the image pickup apparatus 101 and an external apparatus 301. The image pickup apparatus 101 is a digital camera with a shooting function. The external apparatus 301 is a smart device including a Bluetooth communication module and a wireless LAN communication module.

The image pickup apparatus 101 and the smart device 301 are communicable by means of, for example, communication 302 based on a wireless LAN compliant with a series of IEEE 802.11 standards, and communication 303 having a master-slave relationship like a control station and a tributary station, such as Bluetooth Low Energy (hereinafter, referred to as "BLE"). The wireless LAN and the BLE each are an example of communication methods. When each communication apparatus has two or more communication functions and, for example, one of the communication functions, which performs communication in the relationship between a control station and a tributary station, is able to control the other communication function, another communication method may be used. However, without loss of generality, first communication, such as a wireless LAN, provides higher-speed communication than second communication, such as BLE, and the second communication is defined as at least any one of the one having a lower electric power consumption than the first communication and the one having a shorter communicable distance than the first communication.

Figure 4:
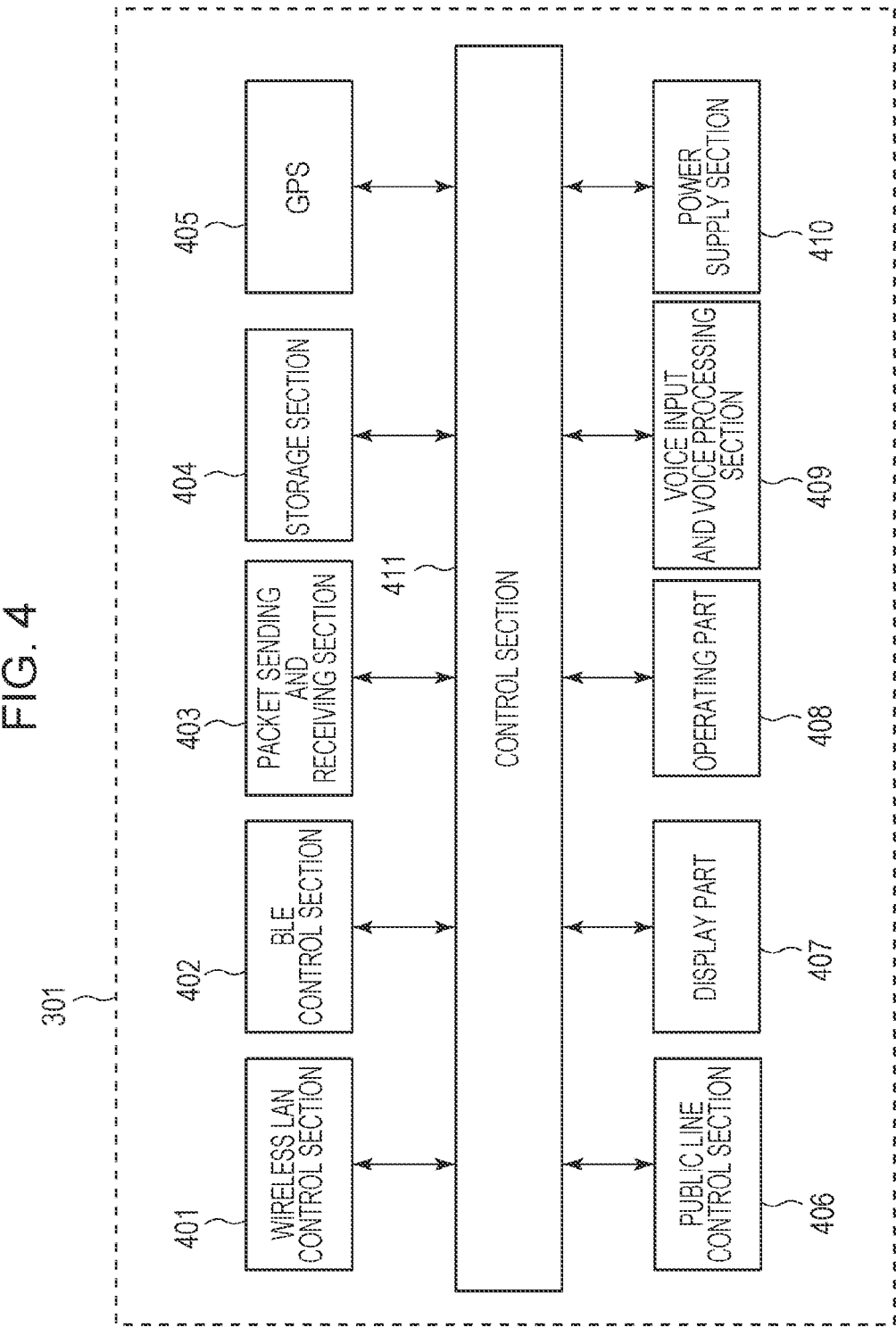
FIG. 4 is a diagram that shows the configuration of the external apparatus.

The configuration of the smart device 301 will be described with reference to FIG. 4.

The smart device 301 includes, for example, not only a wireless LAN control section 401 for wireless LAN and a BLE control section 402 for BLE but also a public line control section 406 for public wireless communication. The smart device 301 further includes a packet sending and receiving section 403. The wireless LAN control section 401 performs a driver that executes a wireless LAN RF control and communication process and various control over communication with a wireless LAN compliant with a series of IEEE 802.11 standards, and protocol processing on communication with the wireless LAN. The BLE control section 402 performs a driver that executes a BLE RF control and communication process and various control over communication with BLE, and protocol processing on communication with BLE. The public line control section 406 performs a driver that executes a public wireless communication RF control and communication process and various control over communication with public wireless communication, and protocol processing related to public wireless communication. The public wireless communication is, for example, compliant with IMT (International Multimedia Telecommunications) standard, LTE (Long Term Evolution) standard, or the like. The packet sending and receiving section 403 executes a process for performing at least any one of sending and receiving packets related to communication with a wireless LAN and BLE and public wireless communication. In this example, description will be made on the assumption that the smart device 301 performs at least one of sending and receiving of packets in communication; however, other than packet switching, another communication format, for example, circuit switching, or the like, may be used.

The smart device 301 further includes, for example, a control section 411, a storage section 404, a GPS receiving section 405, a display part 407, an operating part 408, a voice input and voice processing section 409, and a power supply section 410. The control section 411, for example, controls the entire smart device 301 by running a control program stored in the storage section 404. The storage section 404 stores, for example, the control program that the control section 411 runs and various pieces of information such as parameters for communication. Various operations (described later) are implemented by the control section 411 running the control program stored in the storage section 404.

The power supply section 410 supplies an electric power to the smart device 301. The display part 407 has, for example, a function that is able to output visually recognizable information like an LCD and an LED or output a sound like a speaker, and displays various pieces of information. The operating part 408 is, for example, a button, or the like, that receives a user's operation on the smart device 301. The display part 407 and the operating part 408 may be made up of a common member, for example, a touch panel, or the like.

The voice input and voice processing section 409 may be, for example, configured to acquire a voice emitted from the user through a general-purpose microphone built in the smart device 301 and acquire a user's operation command through voice recognition processing.

A voice command based on a user's speech is acquired via an exclusive application installed in the smart device. The voice command may be stored as a specific voice command for causing the voice processing section 214 of the image pickup apparatus 101 to recognize the specific voice command via the communication 302 based on the wireless LAN.

The GPS (global positioning system) receiving section 405 receives GPS signals that are sent from satellites, analyzes the GPS signals, and estimates the current position (longitude and latitude information) of the smart device 301. Alternatively, for position estimation, the current position of the smart device 301 may be estimated based on information about an ambient wireless network by using a WPS (Wi-Fi Positioning System), or the like. When the acquired current GPS position information is located within a preset positional range (within the range of a predetermined radius), moving information is provided to the image pickup apparatus 101 via the BLE control section 402 and is used as a parameter for automatic shooting or automatic editing (described later). When a change in the position of the GPS position information is greater than or equal to a predetermined range, moving information is provided to the image pickup apparatus 101 via the BLE control section 402 and is used as a parameter for automatic shooting or automatic editing (described later).

As described above, the smart device 301 exchanges data with the image pickup apparatus 101 by means of communication using the wireless LAN control section 401 and the BLE control section 402. The image pickup apparatus 101 and the smart device 301 send or receive data, for example, a voice signal, an image signal, a compressed voice signal, a compressed image signal, or the like. An operating instruction for shooting, or the like, of the image pickup apparatus 101, sending of voice command registration data, or providing of predetermined position detection and place movement based on GPS position information is performed from the smart device. Learning data is also sent or received via the exclusive application installed in the smart device. The external apparatus 301 is not limited to the smart device 301. The external apparatus 301 may be, for example, an apparatus having no display part 407, operating part 408, or the like, and specialized to voice input. With this apparatus, a voice emitted from the user is acquired through the above-described microphone, a user's operation command is acquired through voice recognition processing, and the operation command is provided to the image pickup apparatus 101. Other than the above, this apparatus may have a function of reading out news by using voice recognition, a communication function with a cloud, and a speaker. The apparatus may have a function of sound output for research purposes using a search engine or a function of a dialogue system.

Configuration of Accessories

Figure 5:
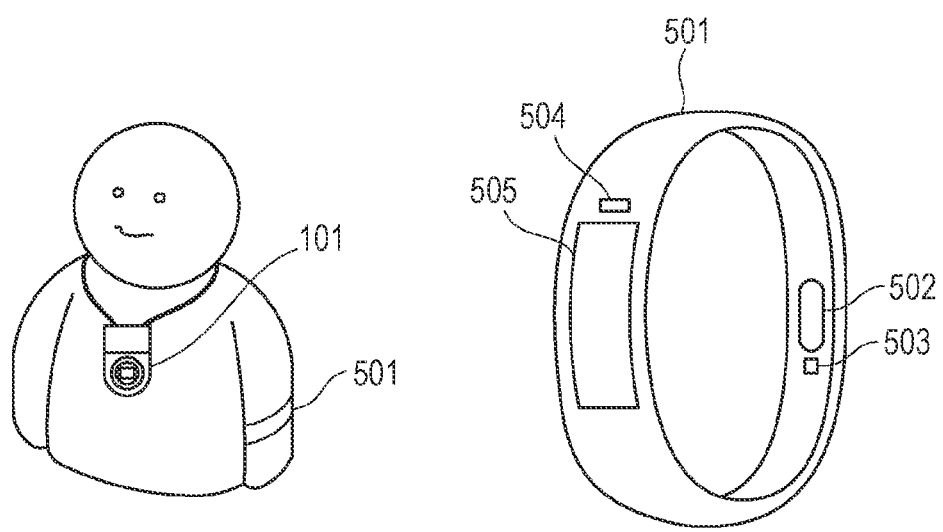
FIG. 5 is a diagram that shows the configuration of the image pickup apparatus and external apparatus.

FIG. 5 is a diagram that shows an example of the configuration of an external apparatus 501 that is communicable with the image pickup apparatus 101. The image pickup apparatus 101 is a digital camera with a shooting function. The external apparatus 501 is a wearable device including various sensing parts and communicable with the image pickup apparatus 101 using, for example, a Bluetooth communication module, or the like.

The wearable device 501 is configured to be wearable on, for example, an arm, or the like, of a user. A sensor that detects biological information, such as the pulse, heart rate, and blood flow of the user, at predetermined intervals, an acceleration sensor that is able to detect the motion status of the user, or the like, is installed in the wearable device 501.

Examples of a biological information detection part 502 include a pulse sensor that detects the pulse, a heart rate sensor that detects the heart rate, a blood flow sensor that detects the blood flow, and a sensor that senses that a change in potential due to the contact of a skin with an electrically conductive polymer is detected. In the present embodiment, description will be made by using a heart rate sensor as the biological information detection part 502. The heart rate sensor detects the heart rate of the user by irradiating infrared light to a skin using an LED, or the like, detecting infrared light transmitting through a body tissue with a light receiving sensor, and applying signal processing to the infrared light. The biological information detection part 502 outputs the detected biological information to a control section 607 (described later) as a signal.

A shake detection part 503 that detects the motion status of the user is equipped with, for example, an acceleration sensor or a gyro sensor and is able to detect a motion based on information about an acceleration as to, for example, whether the user is moving, whether the user is performing an action by swinging the arm, or the like.

The wearable device 501 is also equipped with an operating part 505 that receives a user's operation on the wearable device 501 and a display part 504, such as an LCD and an LED, that outputs visually recognizable information.

Figure 6:
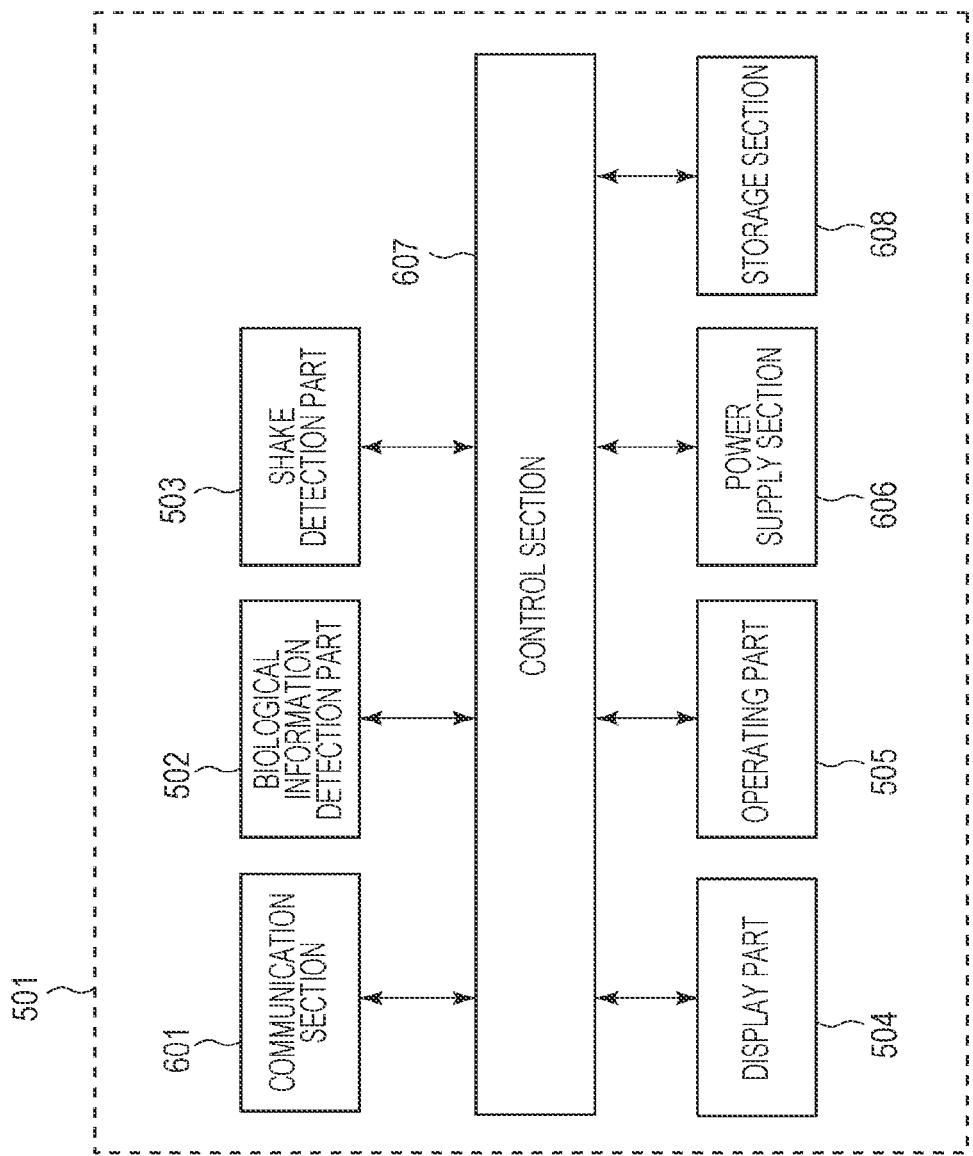
FIG. 6 is a diagram that shows the configuration of the external apparatus.

The configuration of the wearable device 501 will be described with reference to FIG. 6.

The wearable device 501 includes, for example, the control section 607, the communication section 601, the biological information detection part 502, the shake detection part 503, the display part 504, the operating part 505, a power supply section 606, and a storage section 608.

The control section 607, for example, controls the entire wearable device 501 by running a control program stored in the storage section 608. The storage section 608 stores, for example, the control program that the control section 607 runs and various pieces of information such as parameters for communication. Various operations (described later) are implemented by, for example, the control section 607 running the control program stored in the storage section 608.

The power supply section 606 supplies an electric power to the wearable device 501. The display part 504 has, for example, a function that is able to output visually recognizable information like an LCD and an LED or output a sound like a speaker, and displays various pieces of information. The operating part 505 is, for example, a button, or the like, that receives a user's operation on the wearable device 501. The display part 504 and the operating part 505 may be made up of a common member, for example, a touch panel, or the like.

The operating part may be, for example, configured to acquire a voice emitted from the user though a general-purpose microphone built in the wearable device 501, acquire the voice emitted from the user through voice processing, and acquire a user's operation command through voice recognition processing.

Various pieces of detected information from the biological information detection part 502 and the shake detection part 503 are processed by the control section 607, and the detected information is sent to the image pickup apparatus 101 by the communication section 601.

For example, detected information is sent to the image pickup apparatus 101 at the timing at which a change in the heart rate of the user is detected, or detected information is sent at the timing at which a change in the moving status, such as walking, running, and stopping. Also, for example, detected information is sent at the timing at which a preset arm swinging motion is detected, or detected information is sent at the timing at which a preset distance movement is detected.

Figure 30:
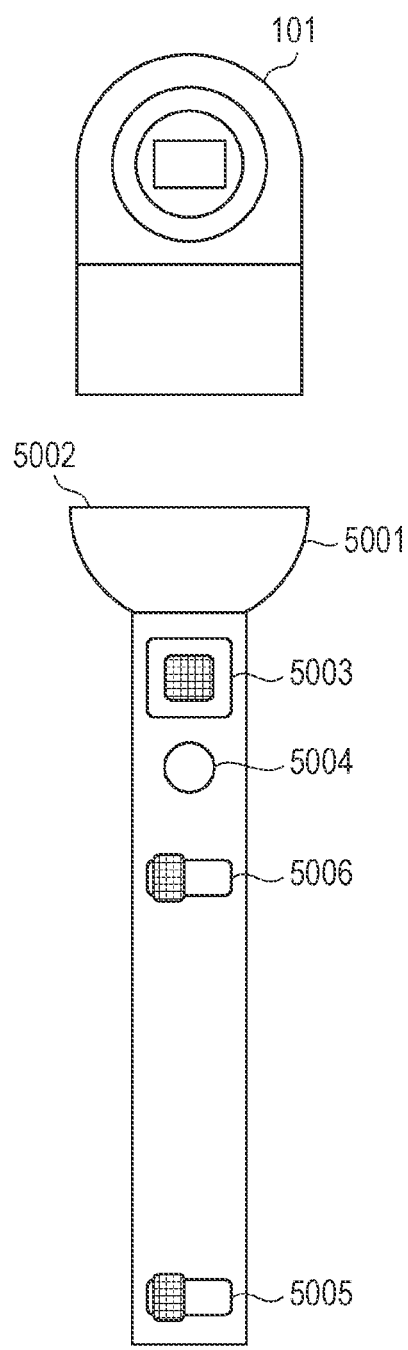
FIG. 30 is a view that shows an example of a hand-held control attachment.

FIG. 30 is an example of a hand-held control attachment.

The image pickup apparatus body 101 includes no operating member, such as a shutter button for shooting instruction, and the image pickup apparatus 101 may be configured to be operated with operating members provided for the attachment.

Figure 31:
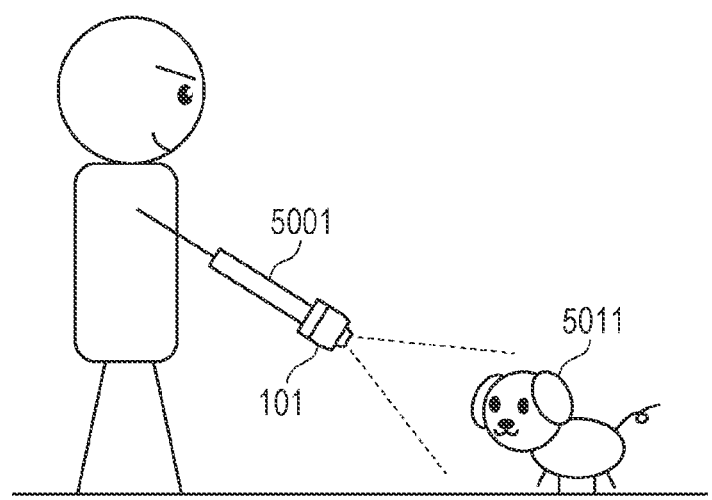
FIG. 31 is a view that illustrates a scene that a user shoots a selected subject 5011 by directing the image pickup apparatus toward the subject 5011.

As shown in FIG. 31, a user may want to shoot a selected subject 5011 by directing a camera toward the subject 5011. At this time, if the camera is automatically panned/tilted, this movement may interfere with the motion of the user to direct the camera toward the subject that the user wants to shoot. The hand-held control attachment 5001 may include a change switch 5005 that is able to change the mode between an auto setting mode relying on the camera and a mode in which the user can manually operate the camera. In this case, when the change switch 5005 is set to the camera's manual mode, the camera is panned/tilted for camera stabilization, but a large pan/tilt angle change is not performed for subject searching.

Alternatively, even when the change switch 5005 is not provided, an attachment detection part 5002 that is able to detect whether the attachment 5001 is connected to the image pickup apparatus 101 may be provided. In this case, when the attachment is connected, the camera is panned/tilted for camera stabilization, but a large pan/tilt angle change may be not performed for subject searching. Connection of the attachment may be detected with an existing method, such as a change in voltage and ID.

When the camera's manual mode is set by the change switch 5005 or the attachment detection part 5002, a large pan/tilt angle change for subject searching is not performed, but the camera is panned/tilted for camera stabilization. Such an inclination correction that the optical axis of the camera is maintained in a certain direction with respect to the gravitational direction can be performed, but it may interfere with a user's operation. Camera stabilization cuts lower frequencies (for example, a frequency range lower than or equal to 0.1 Hz) and corrects only a higher frequency component.

Even when the camera is not panned/tilted for subject searching, the user may want to manually change the pan/tilt direction. When the image pickup apparatus 101 is directed toward a subject 5101 and shoots the subject 5101 as shown in FIG. 31, the user may operate the tilt angle of the image pickup apparatus 101 such that the optical axis is directed upward of the image pickup apparatus 101, and shoot. In this case, an operating member 5003 that is able to change the pan/tilt direction may be provided in the hand-held control attachment 5001. A method in which the operating member 5003 can be freely translated in XY coordinates and the image pickup apparatus 101 is panned/tilted according to the operated direction may be employed. For example, when the operating member is moved upward, the camera is tilted upward of the camera; when the operating member is moved downward, the camera is tilted downward of the camera; when the operating member is moved rightward or leftward, the camera is panned according to the direction.

A shutter button 5004 with which the user can shoot at any timing may be provided. A switch 5006 that can change a shooting mode (for example, a still image shooting mode, a video shooting mode, a panoramic shooting mode, a time lapse shooting mode, or the like) may be provided.

A noncontact communication means may be used as a method of providing a control instruction from the hand-held control attachment 5001 to the image pickup apparatus 101.

A control instruction may be issued through connectors that connect electrical signals and that are respectively provided for the image pickup apparatus 101 and the hand-held control attachment 5001; however, when a battery is included in the image pickup apparatus 101, the hand-held control attachment does not need a connector for battery. Therefore, if a connector is provided for an operation, such as release, a drip-proof function needs to be added to a connection portion or some components are required, with the result of an increase in the size of the apparatus or an increase in cost.

The noncontact communication means may be Bluetooth Low Energy (BLE), may be Near Field Communication (NFC) BLE, or may be another method.

A radio wave generator of the hand-held control attachment 5001 may be a small one with a small capacity of power supply and may be a means of generating a slight amount of electric power with, for example, a button battery or a force pressing the shutter button 5004.

In this way, an attachment separate from the image pickup apparatus and having an operating member for providing a release instruction to the image pickup apparatus and an operating member for providing an instruction to drive the rotation mechanism of the image pickup apparatus may be configured to be attachable to the image pickup apparatus. An attachment having an operating member for providing a shooting mode changing instruction that can set two or more of a still image mode, video mode, panoramic mode, and time lapse mode of the shooting unit may be configured to be attachable to the image pickup apparatus. An operating instruction using the operating member is provided from the attachment to the image pickup apparatus through the non-contact communication means. The image pickup apparatus may detect information about an attachment that is connected to the image pickup apparatus and change the controlling frequency band of the stabilization means based on the information about the attachment. Through the detection of information about the attachment, whether to perform inclination correction to maintain the angle in a certain direction with reference to the gravitational direction may be changed. The lower frequency side of the stabilization controlling frequency band may be cut according to detected information about the attachment.

Figure 32:
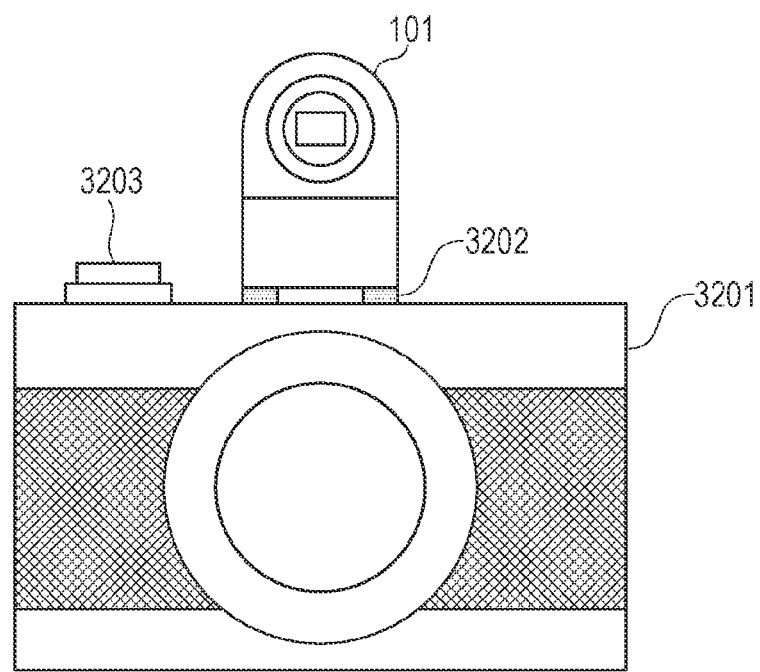
FIG. 32 is a diagram that shows an example of a configuration that is mechanically attachable to an accessory shoe 3202 of a camera 3201 different from the image pickup apparatus 101.

FIG. 32 is an example of the configuration of the image pickup apparatus 101 that is mechanically mountable on an accessory shoe 3202 of a camera 3201 different from the image pickup apparatus 101.

When the image pickup apparatus 101 is mounted on the accessory shoe as shown in FIG. 32, the orientation in which the image pickup apparatus 101 is mounted on the camera 3201 and the angular difference between the optical axis direction of the camera 3201 and the optical axis direction of the image pickup apparatus 101 are known. Therefore, the camera 3201 and the image pickup apparatus 101 are easily controlled in cooperation with each other.

Transfer of information between the image pickup apparatus 101 and the camera 3201 may be achieved by a mechanism in which electrical contacts are provided at a portion to be connected to the accessory shoe and information is transferred between the image pickup apparatus 101 and the camera 3201. The image pickup apparatus 101 and the camera 3201 may have a mechanism of transferring information via, for example, USB, or the like. Alternatively, wireless communication (BLE, NFC, or the like) may be used, or another method may be used.

Cooperation between the image pickup apparatus 101 and the camera 3201 will be described later.

Sequence of Image Pickup Operation

Figure 7:
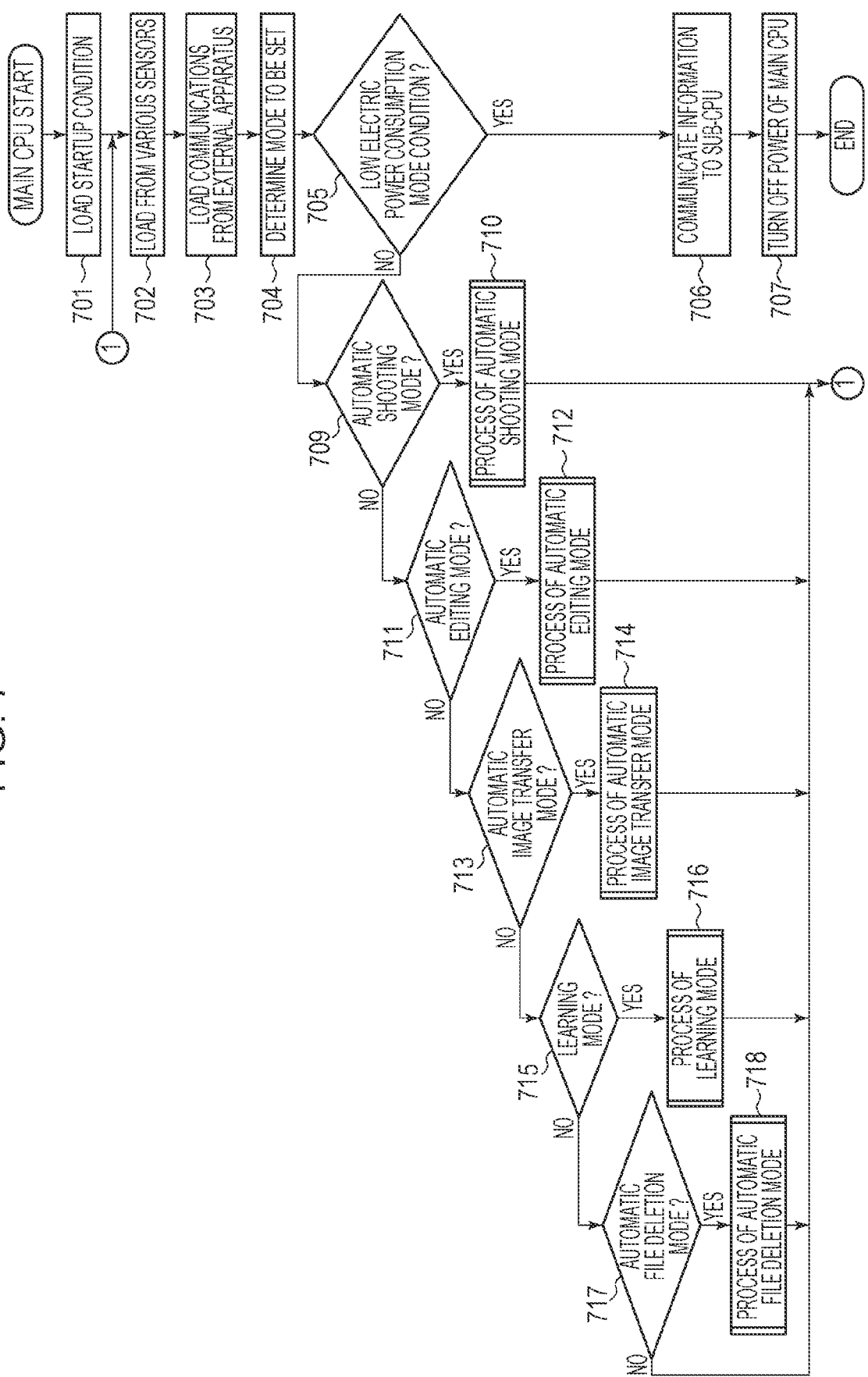
FIG. 7 is a flowchart that illustrates a first control unit.

FIG. 7 is a flowchart that illustrates an example of operations that the first control section 223 of the image pickup apparatus 101 handles in the present embodiment.

When a user operates the power button of the image pickup apparatus 101, the first power supply section 210 is caused to supply an electric power from the power supply section to the first control section 223 and the blocks of the image pickup apparatus 101.

Similarly, in the second control section 211 as well, the second power supply section 212 is caused to supply an electric power from the power supply section to the second control section. The details of the operations of the second control section will be described with reference to the flowchart of FIG. 8 (described later).

When an electric power is supplied, the process of FIG. 7 starts. In step 701, a startup condition is loaded. In the present embodiment, the startup condition is as follows.

(1) The power button is manually depressed, and the power is turned on.

(2) The power is turned on based on an instruction from an external apparatus (for example, 301) through external communication (for example, BLE communication).

(3) The power is turned on from a Sub-processor (second control section 211).

In the case of (3) the power is turned on from the Sub-processor, the startup condition computed in the Sub-processor is loaded, and the details will be described later with reference to FIG. 8.

The startup condition loaded here is used as one parameter element during subject searching or automatic shooting, and this will be described later. When the loading of the startup condition completes, the process proceeds to step 702.

In step 702, information is loaded from various sensors. The sensors from which loading is performed here may be sensors that detect a vibration such as the gyro sensor and the acceleration sensor of the apparatus shake detection section 209. The rotational positions of the tilt unit 104 and pan unit 105 may be loaded. The voice level, trigger for detecting specific voice recognition, or detected sound direction, which is detected by the voice processing section 214, may be loaded.

Although not shown in FIG. 1 to FIG. 6, sensors that detect environmental information also acquire information.

For example, there are a temperature sensor that detects the temperature of an area around the image pickup apparatus 101 at predetermined intervals and an atmospheric pressure sensor that detects a change in atmospheric pressure around the image pickup apparatus 101. An illuminance sensor that detects brightness around the image pickup apparatus 101, a humidity sensor that detects humidity around the image pickup apparatus 101, a UV sensor that detects the amount of ultraviolet light around the image pickup apparatus 101, and the like, may be provided. In addition to the detected temperature information, atmospheric pressure information, brightness information, humidity information, and UV information, a temperature variation, atmospheric pressure variation, brightness variation, humidity variation, ultraviolet light variation, and the like, obtained by calculating a rate of change at predetermined time intervals from the detected various pieces of information are used in determination for automatic shooting, and the like (described later).

When the loading of information from various sensors is performed in step 702, the process proceeds to step 703.

In step 703, whether there is a communication instruction from the external apparatus is detected, and, when there is a communication instruction, communication with the external apparatus is performed.

For example, a remote operation or data such as a voice signal, an image signal, a compressed voice signal, and a compressed image signal is sent or received from the smart device 301 via the wireless LAN or BLE. Whether there is an operating instruction for shooting, or the like, of the image pickup apparatus 101, sending of voice command registration data, predetermined position detection notification or place movement notification based on GPS position information, or an instruction to send or receive learning data from the smart device 301 is loaded.

In addition, for example, when there is updated information about the motion of the user, information about the action of the arm, or biological information such as heart rate, the information is loaded from the wearable device 501. Various sensors that detect the above-described environmental information may be mounted on the image pickup apparatus 101 or may be mounted on the smart device 301 or the wearable device 501. In the latter case, environmental information is also loaded via BLE. When communication and loading information from the external apparatus complete in step 703, the process proceeds to step S704.

In step 704, a mode to be set is determined. The mode to be set in step 704 is determined and selected from among the following modes.

(1) Automatic Shooting Mode

Mode Determination Condition

When it is determined to perform automatic shooting based on pieces of detected information (image, sound, time, vibration, place, change in body, change in environment) set through learning (described later), an elapsed time from when the mode shifts into the automatic shooting mode, previous shooting information, and the like, the mode is set to the automatic shooting mode.

Process in Mode

In the process of the automatic shooting mode (step 710), a search for a subject is automatically performed by panning/tilting or zooming based on the detected information (image, sound, time, vibration, place, a change in body, a change in environment). When it is determined that it is the timing to be able to perform shooting of a user's preference, a process of determining a shooting method from among various shooting methods such as a single shooting of a still image, a continuous shooting of still images, a video shooting, a panoramic shooting, and a time lapse shooting is performed, and shooting is automatically performed.

(2) Automatic Editing Mode

Mode Determination Condition

When it is determined to perform automatic editing based on an elapsed time from when last automatic editing is performed, and previous shot image information, the mode is set to the automatic editing mode.

Process in Mode

In the process of the automatic editing mode (step 712), a process of selecting a still image or a moving image is performed based on learning, and an automatic editing process of creating a highlight video that is a summarized one moving image is performed by using image effects, the duration of an edited moving image, and the like, based on learning.

(3) Image Transfer Mode

Mode Determination Condition

In the case where the mode is set to the automatic image transfer mode based on an instruction via the exclusive application installed in the smart device, when it is determined to perform image transfer based on an elapsed time from when last image transfer is performed and previous shooting information, the mode is set to the automatic image transfer mode.

Process in Mode

In the process of the automatic image transfer mode (step 714), the image pickup apparatus 101 automatically extracts images that can match a user's preference, and causes the smart device 301 to automatically extract the images of the user's preference and transfer the images. Extraction of images of the user's preference is performed based on scores assigned to the images and determined based on the user's preference.

(4) Learning Mode

Mode Determination Condition

When it is determined to perform automatic learning based on an elapsed time from when a last learning process is performed, information associated with images that can be used for learning, the number of learning data, and the like, the mode is set to the automatic learning mode. Alternatively, when there is an instruction to set learning data via communication from the smart device 301 as well, the mode is set to this mode.

Process in Mode

In the process of the automatic learning mode (step 716), the image pickup apparatus 101 performs learning adapted to the user's preference. Learning adapted to the user's preference is performed by using a neural network based on information about operations made on the smart device 301, learning information provided from the smart device 301, and the like. The information about the operations made on the smart device 301 includes, for example, image acquisition information from the image pickup apparatus, information that a manual editing instruction is provided via the exclusive application, and information about determination values input by the user for images in the image pickup apparatus.

Learning related to detection, of personal identification registration, voice registration, sound scene registration, general object recognition registration, and the like, and learning of the above-described conditions of the low electric power consumption mode, and the like, are performed at the same time.

(5) Automatic File Deletion Mode

Mode Determination Condition

When it is determined to perform automatic file deletion based on an elapsed time from when last automatic file deletion is performed and the remaining capacity of the non-volatile memory 216 on which images are recorded, the mode is set to the automatic file deletion mode.

Process in Mode

In the process of the automatic file deletion mode (step 718), files to be automatically deleted (three choices) are designated based on tag information, shot date and time, and the like, of each image from among the images in the non-volatile memory 216, and the files are deleted.

The details of the process of the automatic shooting mode, the process of the automatic editing mode, and the process of the learning mode will be described later.

In step 705, it is determined whether the mode set in step 704 is the low electric power consumption mode. In the low electric power consumption mode determination, when the determination condition of any mode of the "automatic shooting mode", "automatic editing mode", "automatic image transfer mode", "learning mode", and "automatic file deletion mode" (described later) is not satisfied, it is determined to set the mode to the low electric power consumption mode. When the determination process is performed, the process proceeds to step 705.

When it is determined in step 705 that the low electric power consumption mode condition is satisfied, the process proceeds to step 706.

In step 706, various parameters regarding startup factors (a parameter for shake detection determination, a parameter for sound detection, and an elapsed time detection parameter) that are subjected to a determination in the Sub-processor (second control section 211) are provided to the Sub-processor. The values of various parameters vary as a result of learning in the learning process (described later). When the process of step 706 completes, the process proceeds to step 707, the power of the Main processor (first control section 223) is turned off, and the process is ended.

On the other hand, when it is determined in step 705 that the mode is not the low electric power consumption mode, the process proceeds to step 709, and it is determined whether the mode to be set is the automatic shooting mode. When the mode is the automatic shooting mode, the process proceeds to step 710, and the process of the automatic shooting mode is performed. When the process completes, the process returns to step 702, and the process is repeated. When it is determined in step 709 that the mode is not the automatic shooting mode, the process proceeds to step 711.

It is determined in step 711 whether the mode to be set is the automatic editing mode. When the mode is the automatic editing mode, the process proceeds to step 712, and the automatic editing mode is performed. When the process completes, the process returns to step 702, and the process is repeated. When it is determined in step 711 that the mode is not the automatic editing mode, the process proceeds to step 713.

It is determined in step 713 whether the mode to be set is the automatic image transfer mode. When the mode is the automatic image transfer mode, the process proceeds to step 714, and the process of the automatic image transfer mode is performed. When the process completes, the process returns to step 702, and the process is repeated. When it is determined in step 713 that the mode is not the automatic image transfer mode, the process proceeds to step 715.

It is determined in step 715 whether the mode to be set is the learning mode. When the mode is the learning mode, the process proceeds to step 716, and the process of the learning mode is performed. When the process completes, the process returns to step 702, and the process is repeated. When it is determined in step 715 that the mode is not the learning mode, the process proceeds to step 717.

It is determined in step 717 whether the mode to be set is the automatic file deletion mode. When the mode is the automatic file deletion mode, the process proceeds to step 718, and the process of the automatic file deletion mode is performed. When the process completes, the process returns to step 702, and the process is repeated. When it is determined in step 717 that the mode to be set is not the automatic file deletion mode, the process returns to step 702, and the process is repeated.

Figure 8:
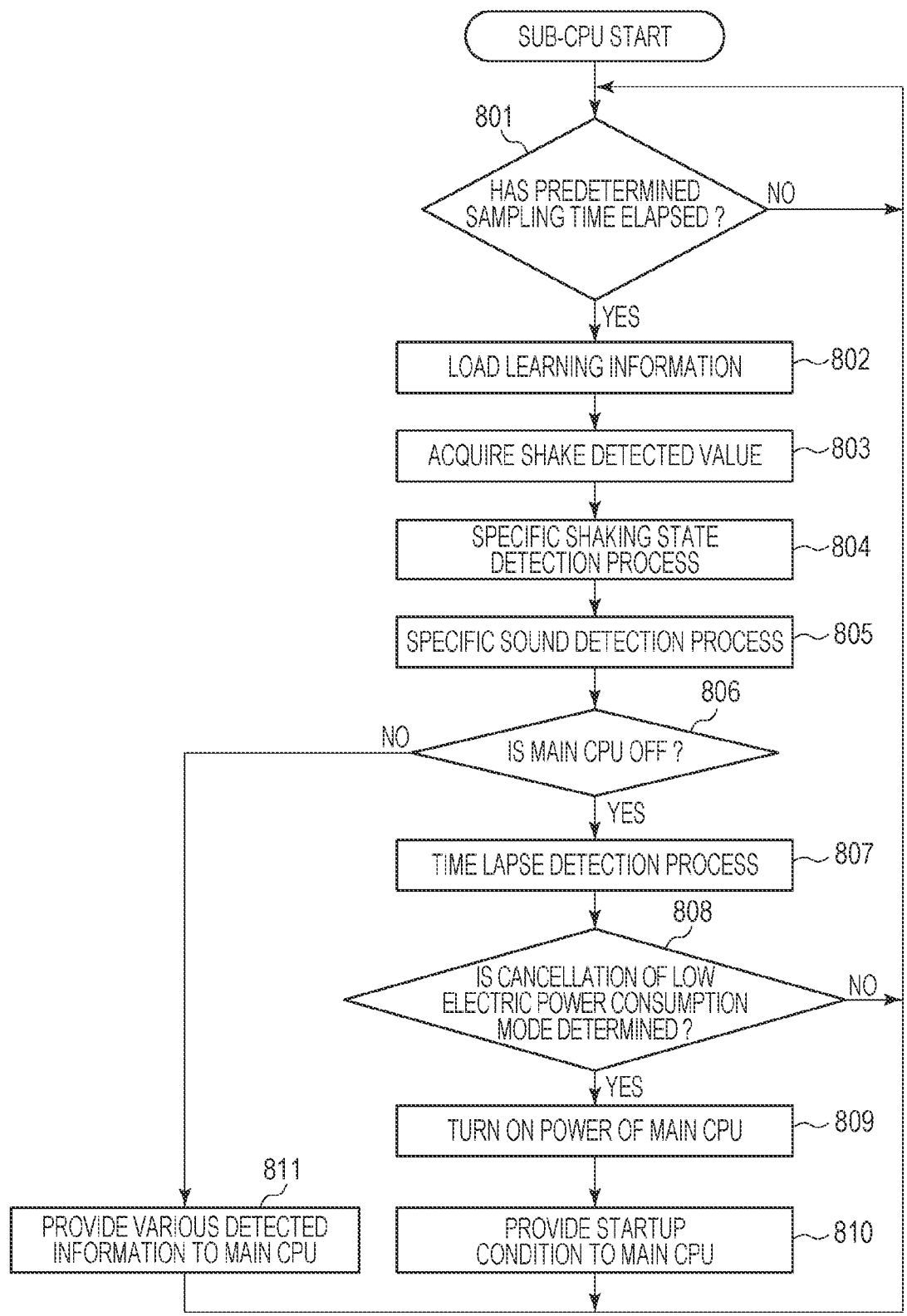
FIG. 8 is a flowchart that illustrates a second control unit.

FIG. 8 is a flowchart that illustrates an example of operations that the second control section 211 of the image pickup apparatus 101 handles in the present embodiment.

When the user operates the power button of the image pickup apparatus 101, as in the case where an electric power is supplied from the power supply section to the first control section 223 by the first power supply section 210, in the second control section 211 as well, an electric power is supplied from the power supply section to the second control section 211 by the second power supply section 212. When an electric power is supplied, the Sub-processor (second control section 211) is started up, and the process of FIG. 8 starts.

In step 801, it is determined whether a predetermined period that is a sampling interval has elapsed. For example, when the predetermined period is set to 10 msec, the process proceeds to step 802 at intervals of 10 msec. When it is determined that the predetermined period has not elapsed, the Sub-processor returns to step 801 without performing any process and waits until the predetermined period elapses.

In step 802, learning information is loaded. The learning information is information transferred at the time of communicating information to the Sub-processor in step 706 of FIG. 7, and, for example, the following information is loaded.

(1) A determination condition for specific shake detection
(2) A determination condition for specific sound detection
(3) A determination condition for lapse of time determination When the learning information is loaded in step 802, the process proceeds to step 803, and a shake detection value is acquired. A shake detection value is an output value from a sensor that detects a vibration, such as the gyro sensor and acceleration sensor of the apparatus shake detection section 209.

When the shake detection value is acquired in step 803, the process proceeds to step 804, and a process of detecting a preset shaking state is performed. Here, the determination process is changed based on the learning information loaded in step 802. Some examples will be described.

(1) Tap Detection

A state where the user taps the image pickup apparatus 101 with, for example, a fingertip, or the like, (tap state) can be detected through an output value of the acceleration sensor provided in the image pickup apparatus 101. By passing the outputs of the three-axis acceleration sensor to a bandpass filter (BPF) set in a predetermined frequency range at a predetermined sampling, the signal range of a change in acceleration based on a tap can be extracted. A tap is detected based on whether the count of times an acceleration signal having passed through the BPF exceeds a predetermined threshold ThreshA is a predetermined count CountA in a predetermined time TimeA. In the case of a double-tap, CountA is set to two. In the case of a triple-tap, CountA is set to three. TimeA or ThreshA may also be varied according to learning information.

(2) Detection of Shaking State

A shaking state of the image pickup apparatus 101 can be detected from an output value of the gyro sensor or acceleration sensor provided in the image pickup apparatus 101. A high-frequency component of the output of the gyro sensor or acceleration sensor is cut with an HPF, a low-frequency component is cut with an LPF, and then absolute value conversion is performed. A vibration is detected based on whether the count of times the calculated absolute value exceeds a predetermined threshold ThreshB is greater than or equal to a predetermined count CountB in a predetermined time TimeB. For example, it can be determined whether the shaking state is a small shaking state like the image pickup apparatus 101 is placed on a desk, or the like, or a large shaking state like the user is walking with the wearable image pickup apparatus 101. When a plurality of conditions for the determination threshold and a plurality of conditions for the determination count number are provided, a minute shaking status for a shaking level can be detected.

TimeB, ThreshB, or CountB may also be varied according to learning information.

The method of detecting a specific shaking state based on a condition determination of the shake detection sensor is described above. However, when data of the shake detection sensor, sampled within a predetermined time, is input to a shaking state determination device using a neural network, and the trained neutral network is able to detect the specific shaking state registered in advance. In this case, loading of learning information in step 802 is to load weight parameters of the neural network.

When the specific shaking state detection process is performed in step 804, the process proceeds to step 805, and the preset specific sound detection process is performed. Here, the detection determination process is changed according to the learning information loaded in step 802. Some examples will be described.

(1) Specific Voice Command Detection

A specific voice command is detected. Voice commands may be some commands registered in advance, and the user can register a specific voice in the image pickup apparatus.

(2) Specific Sound Scene Recognition

A sound scene determination is performed with a network trained in advance with machine learning based on a large amount of voice data. For example, a specific scene, such as "a cheer rose", "clapping", and "speaking", is detected. A scene to be detected varies according to learning.

(3) Sound Level Determination

Detection based on a sound level determination is performed with a method of, for example, adding a period of time the magnitude of sound level exceeds a predetermined level within a predetermined time. The predetermined time, the magnitude of the predetermined level, and the like, vary according to learning.

(4) Sound Direction Determination

The direction of a sound in a plane in which the plurality of microphones is installed can be detected, and the direction of a sound is detected for a sound level of a predetermined magnitude.

It is determined in step 805 whether the above-escribed determination process has been performed in the voice processing section 214 and specific sound detection has been performed under the settings learned in advance.

When the specific sound detection process is performed in step 805, the process proceeds to step 806. It is determined in step 806 whether the Main processor (first control section 223) is in an off state. When the Main processor is in the off state, the process proceeds to step 807, and a preset time lapse detection process is performed. Here, the detection determination process is changed according to the learning information loaded in step 802. The learning information is information transferred at the time of communicating information to the Sub-processor (second control section 211) in step 706 described with reference to FIG. 7. An elapsed time from when the Main processor switches from an on state to the off state is measured. When the elapsed time is longer than or equal to a parameter TimeC, it is determined that the time has elapsed; whereas, when the elapsed time is shorter than TimeC, it is not determined that the time has elapsed. TimeC is a parameter that varies according to learning information.

When the time lapse detection process is performed in step 807, the process proceeds to step 808, and it is determined whether a cancellation of the low electric power consumption mode is determined. The following low electric power consumption mode cancellation condition is used for determination.

(1) A determination condition for specific shake detection
(2) A determination condition for specific sound detection
(3) A determination condition for lapse of time determination It can be determined whether the determination condition for specific shake detection is satisfied through the specific shaking state detection process in step 804. It can be determined whether the determination condition for specific sound detection is satisfied through the specific sound detection process in step 805. It can be determined whether the determination condition for lapse of time detection is satisfied through the time lapse detection process in step 807. Therefore, any one or more of the conditions are satisfied, a determination to cancel the low electric power consumption mode is made.

When it is determined in step 808 that the cancellation condition is satisfied, the process proceeds to step 809, and the power of the Main processor is turned on. In step 810, the condition (shake, sound, time) based on which it is determined that the low electric power consumption mode is cancelled is provided to the Main processor. The process returns to step 801, and the process is looped.

When none of the cancellation conditions is satisfied in step 808 and it is determined that the low electric power consumption mode is not cancelled, the process returns to step 801, and the process is looped.

When it is determined in step 806 that the Main processor is in the on state, the information acquired from step 803 to step 805 is provided to the Main processor. The process returns to step 801, and the process is looped.

In the present embodiment, even when the Main processor is in the on state, shake detection or specific sound detection is performed by the Sub-processor, and the detected result is provided to the Main processor. However, when the Main processor is on, the processes of step 803 to step 805 may be not performed, and shake detection or specific sound detection may be detected in a process (step 702 of FIG. 7) in the Main processor.

As described above, by performing step 704 to step 707 of FIG. 7 and the process of FIG. 8, the conditions for shifting into the low electric power consumption mode and the conditions for cancelling the low electric power consumption mode are learned based on user's operation. Thus, an image pickup operation adapted to the usability of the user who owns the image pickup apparatus 101 can be performed. A method of learning will be described later.

The method of cancelling the low electric power consumption mode based on shake detection, sound detection, or time lapse is described in detail above. Alternatively, the low electric power consumption mode may be cancelled based on environmental information. Environmental information can be determined based on whether temperature, atmospheric pressure, brightness, humidity, the absolute amount or variation of ultraviolet light exceeds a predetermined threshold, and the threshold can be varied according to learning (described later).

It can be determined whether the low electric power consumption mode is cancelled as a result of a determination as to information on shake detection, sound detection, or time lapse, or the absolute value or variation of each piece of environmental information based on a neural network, and, in this determination process, a determination condition can be changed according to learning (described later).

Process of Automatic Shooting Mode

The details of the process of the automatic shooting mode will be described with reference to FIG. 9. As described above, the first control section 223 of the image pickup apparatus 101 in the present embodiment handles control over the following process.

In S901, the image processing section 207 is caused to perform image processing on signals captured by the imaging section 206 and to generate an image for subject recognition.

A subject, such as a person and an object, is recognized from the generated image.

When a person is recognized, the face or body of a subject is detected. In a face detection process, a pattern for determining the face of a person is set in advance, and a portion that is included in a shot image and that matches the pattern can be detected as a face image of the person.

A degree of confidence that indicates the likelihood as the face of the subject is also calculated at the same time. A degree of coincidence is calculated from, for example, the size of a face area in the image, the degree of coincidence with a face pattern, and the like.

As for object recognition as well, similarly, an object that matches a pattern registered in advance can be recognized.

There is also, for example, a method of extracting a characteristic subject with a method of using the histogram of a hue, chroma, or the like, in a shot image. In this case, regarding the image of a subject captured within a shooting angle of view, a process of dividing a distribution derived from the histogram of the hue, chroma, or the like, of the image into a plurality of sections and classifying a shot image for each section is executed.

For example, the histograms of a plurality of color components are created for a shot image, each are divided with the mountain-like distribution range, a shot image is classified in an area belonging to a combination of the same sections, and the image area of the subject is recognized.

When an evaluation value is calculated for each image area of a recognized subject, the image area of a subject having the highest evaluation value can be determined as a main subject area.

With the above method, each piece of subject information can be obtained from shooting information.

In S902, an image stabilization amount is calculated. Specifically, first, the absolute angle of the image pickup apparatus is calculated based on the information about the angular velocity and acceleration acquired by the apparatus shake detection section 209. Then, a vibration control angle for actuating the tilt unit 104 and the pan unit 105 in a direction to cancel the absolute angle is found, and is set for the image stabilization amount. In the process of calculating an image stabilization amount here, a computing method may be changed according to a learning process (described later).

In S903, the status of the image pickup apparatus is determined. What vibration/motion status the image pickup apparatus is placed is determined based on, for example, an angle and amount of movement detected from angular velocity information, acceleration information, GPS position information, and the like.

For example, when image pickup apparatus 101 is mounted on a vehicle and captures an image, subject information, such as a surrounding landscape, significantly varies depending on a moved distance.

Therefore, it is determined whether the image pickup apparatus 101 is placed in "vehicle moving state" where the image pickup apparatus 101 is mounted on a vehicle, or the like, and is moving at a high speed, and can be used for automatic subject searching that will be described later.

It is also determined whether a change in angle is large, and it is determined whether the image pickup apparatus 101 is placed in a "stationary capture state" where there is almost no shake angle.

In the case of the "stationary capture state", it may be regarded that there is no change in the angle of the image pickup apparatus 101 itself, so subject searching for stationary capture can be performed.

When a change in angle is relatively large, it is determined that the image pickup apparatus 101 is placed in a "hand-held state", so subject searching for a hand-held state can be performed.

In S904, a subject searching process is performed. Subject searching is made up of the following processes.

(1) Area Dividing

Figure 13A:
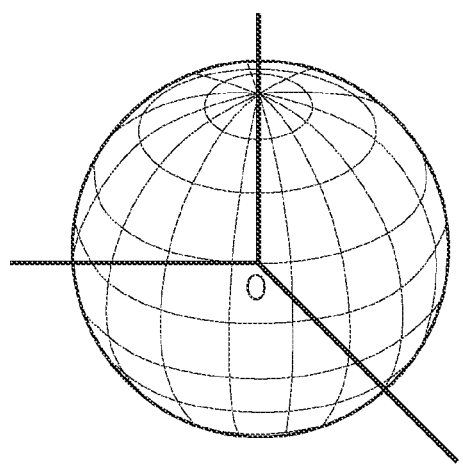
FIG. 13A is a view for illustrating an example in which area division is performed all around the position of the image pickup apparatus (when a tilt direction and a pan direction each are 22.5 degrees).
Figure 13B:
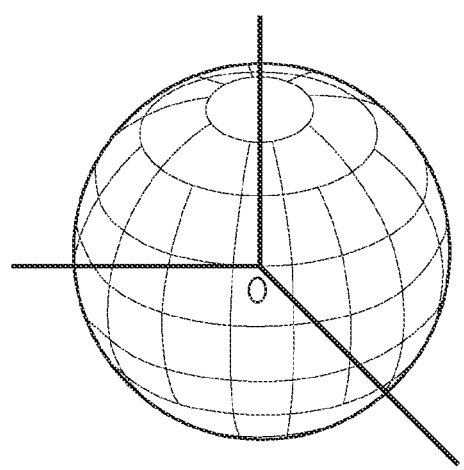
FIG. 13B is a view for illustrating an example in which area division is performed all around the position of the image pickup apparatus (when a tilt angle is greater than or equal to 45 degrees).
Figure 13C:
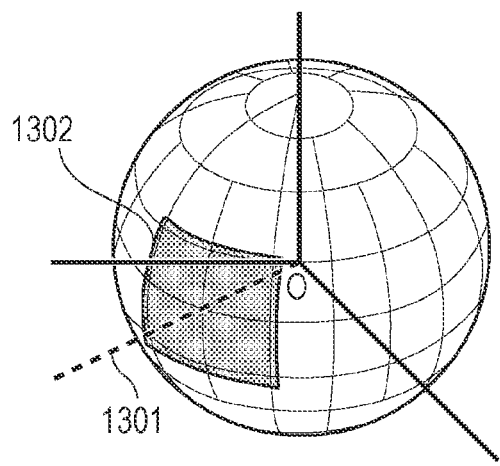
FIG. 13C is a view for illustrating an example in which area division is performed in a shooting angle of view.
Figure 13D:
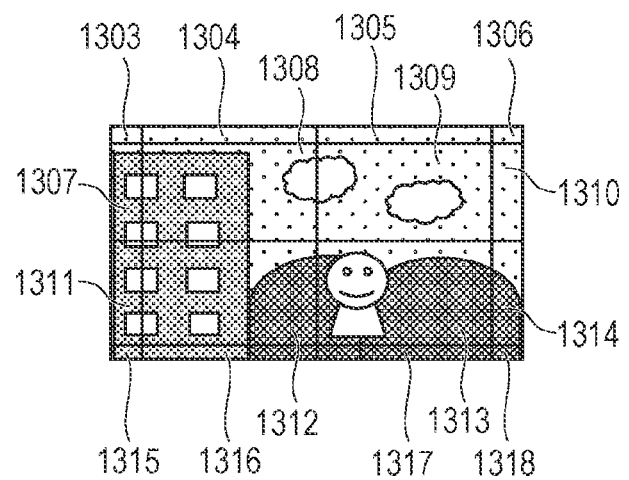
FIG. 13D is a view for illustrating an image example of an angle of view area of an image that is being imaged.

Area dividing will be described with reference to FIG. 13. Area dividing is performed all around the position of the image pickup apparatus (the origin O is defined as the position of the image pickup apparatus) as shown in FIG. 13A. In the example of FIG. 13A, area dividing is performed every 22.5 degrees in each of tilt direction and the pan direction. When area dividing is performed as shown in FIG. 13A, as the angle in the tilt direction leaves from zero degrees, the perimeter in a horizontal direction reduces, and the area reduces. Thus, as shown in FIG. 13B, when the tilt angle is greater than or equal to 45 degrees, the area range in the horizontal direction is set so as to be greater than 22.5 degrees. FIG. 13C and FIG. 13D show examples in which the area is divided within a shooting angle of view. An axis 1301 is the direction of the image pickup apparatus 101 at the time of initialization, and the area is divided with this angle of direction set to a reference position. 1302 indicates an angle of view area of an image being captured, and an example of the image at this time is shown in FIG. 13D. In the image appearing in the angle of view, the image is divided as in the case of 1303 to 1318 of FIG. 13D based on area dividing.

(2) Calculation of Importance Level of Each Area

For each of the areas divided as described above, an importance level that indicates the order of priority for searching is calculated according to a subject present in the area and the scene condition of the area. An importance level based on the condition of a subject is calculated based on, for example, the number of persons present in an area, the size of the face of each person, a face orientation, a likelihood of face detection, the facial expression of each person, and a personal authentication result of each person. An importance level based on the condition of a scene is, for example, a general object recognition result, a scene identification result (blue sky, backlight, evening view, or the like), the level and voice recognition result of a sound coming from an area, movement sensing information in an area, or the like. The vibration status of the image pickup apparatus has been detected in determining the status of the image pickup apparatus (S903), and the importance level may also be configured to vary according to the vibration status. For example, when it is determined as the "static shooting state", the importance level is determined to be high when the face identification of a specific person is detected so that subject searching is performed by focusing on a subject having a higher priority among those registered with face identification (for example, the user of the image pickup apparatus). Automatic shooting (described later) is also performed preferentially on the above-described face. Even when a period of time during which the user of the image pickup apparatus is shooting with the image pickup apparatus worn on the body is long, but when the image pickup apparatus is removed and put on a desk, or the like, many images containing the user can be recorded. At this time, searching is possible by means of panning/tilting, so, even when the placement angle, or the like, of the image pickup apparatus is not considered, an image containing the user and a group photo, or the like, containing many faces can be recorded only by roughly placing the image pickup apparatus. Only with the above-described conditions, the area having the highest importance level is the same unless there are changes in the areas, with the result that the found area constantly remains unchanged. Hence, the importance level is changed according to previous shooting information. Specifically, the importance level of the area that has been continuously designated as a searching area for a predetermined time may be lowered, or the importance level of the area in which shooting is performed in S910 (described later) may be lowered for a predetermined time.

(3) Decision of Searching Target Area

When the importance level of each area is calculated as described above, the area having a high importance level is decided as a searching target area. A target pan/tilt searching angle required to capture the searching target area into an angle of view is calculated.

In S905, the camera is panned/tilted. Specifically, a panning/tilting amount is calculated by adding a driving angle at a control sampling based on an image stabilization amount and the target pan/tilt searching angle, and the tilt unit 104 and the pan unit 105 each are controlled to be driven by the lens-barrel rotation drive section 205.

In S906, the zoom unit 201 is controlled, and the camera is zoomed. Specifically, the camera is zoomed according to the status of the searching target subject set in S904. For example, when the searching target subject is the face of a person, a too-small face on an image cannot be detected because the size is less than a detectable minimum size, and may be lost. In such a case, the zoom unit 201 is controlled to zoom to a telephoto side such that the size of the face on the image increases. On the other hand, when a face on an image is too large, the subject may fall outside the angle of view depending on the movement of the subject or the image pickup apparatus itself. In such a case, the zoom unit 201 is controlled to zoom to a wide-angle side such that the size of the face in the frame reduces. By executing zoom control in this way, a state suitable for tracking a subject can be maintained.

In S904 to S906, a method for subject searching by panning/tilting or zooming is described. Alternatively, subject searching may be performed with an image pickup system that shoots all the directions at a time using a plurality of wide-angle lenses. In the case of an omnidirectional camera, if image processing, such as subject detection, is performed on all the signals that are obtained through shooting as input images, enormous processing is required. Hence, part of an image is cropped, and a process of searching for a subject is performed within the range of the cropped image. The importance level of each area is calculated as in the case of the above-described method, a cropping position is changed based on the importance level, and a determination as to automatic shooting (described later) is performed. Thus, a reduction in electric power consumption and high-speed subject searching through image processing are possible.

It is determined in S907 whether there is a user's (manual) shooting instruction. When there is a shooting instruction, the process proceeds to S910. At this time, the user's (manual) shooting instruction may be depressing the shutter button of the image pickup apparatus 101 or depressing the shutter button of the hand-held control attachment 5001. Alternatively, the user's (manual) shooting instruction may be tapping the housing of the image pickup apparatus with a finger, or the like, voice command input, an instruction from the external apparatus, or the like. A shooting instruction provided by tapping is a shooting instruction method of, when the user taps the housing of the image pickup apparatus, sensing successive high-frequency accelerations in a short period with the apparatus shake detection section 209 and triggering shooting. Voice command input is a shooting instruction method of, when the user speaks a password (for example, "Take a picture", or the like) for providing an instruction for predetermined shooting, recognizing a voice with the voice processing section 214 and triggering shooting. An instruction from the external apparatus is a shooting method that uses a shutter instruction signal sent via the exclusive application from, for example, a smartphone, or the like, Bluetooth-connected to the image pickup apparatus as a trigger.

In S908, an automatic shooting determination is performed. In automatic shooting determination, a determination as to whether automatic shooting is performed and a determination as to the shooting method (a determination as to which one of single shooting of a still image, continuous shooting (continuous exposure) of still images, video shooting, panoramic shooting, time lapse shooting, and the like, is performed) are performed.

To shoot an object right in front of user's eyes, such a scene that the user shoots while pushing the image pickup apparatus slightly forward with the image pickup apparatus worn on the user is conceivable. In such a scene, for example, it is desired to usually shoot a still image quickly. To shoot a scenic area, such a scene that the user holds the image pickup apparatus hanging from the neck and shoots while raising the image pickup apparatus to the upper side forward is conceivable. In such a scene, for example, even when panoramic shooting is expected or not, the user learns such a shooting method when an image obtained by panoramic shooting is provided to the user, and this experience can be used for future shooting. Hence, to identify these scenes, scenes are identified by, for example, detecting a moving distance of the image pickup apparatus from a held state to shooting. In this way, a preferred shooting method may vary depending on the way of setting the image pickup apparatus, so the shooting method can be changed according to the status of the image pickup apparatus at the time of shifting into shooting. As for the purpose of the user in the case of a scene that a subject is placed slightly upward and the image pickup apparatus is raised upward to shoot the subject, it is desirable to shoot a normal still image quickly. Hence, to perform these identifications, for example, a subject distance is detected. Thus, a scene can be identified. In this way, since a preferred shooting method can vary depending on the status of a subject, the shooting method can be changed according to the status of the image pickup apparatus at the time of shifting into shooting and the status of a subject being seen. To shoot a vertically long subject in front of user's eyes, a state where the user holds the image pickup apparatus hanging from the neck and is shooting while holding the image pickup apparatus oriented upward is suggested. Such a scene that the image of a loft building is shot in, for example, a sightseeing place is conceivable. In such a scene, for example, even when vertically panoramic shooting is expected or not, the user learns such a shooting method when an image obtained by vertically panoramic shooting is provided to the user, and this experience can be used for further shooting. Hence, in such a case, a holding angle is detected. Thus, a scene can be identified. The accuracy of determining whether a vertical panorama or a horizontal panorama is preferred can be improved by further determining, for example, a distance to a subject, and distances to the subject in top, bottom, right, and left areas as the status of the subject at this time. In other words, when the distance to a subject and distances to the top and bottom areas of the subject are equivalent distances, it can be determined to perform vertically panoramic shooting. For 360-degree shooting, such a scene that the user holds the image pickup apparatus hanging from the neck and is shooting while holding the image pickup apparatus oriented directly above is conceivable. Such a scene that, for example, an image showing a state of looking around at the top of a mountain is shot is conceivable. At this time, it is conceivable that, for example, the user sets the mode to a 360-degree shooting mode with the external apparatus and provides a shooting instruction. Hence, for example, in such a case, when a user interface for asking whether to shift into 360-degree shooting is provided at the time when the user operates the external apparatus, time and effort for user's operation can be reduced. Furthermore, while such an operation is repeated several times, the user expects to be able to perform 360-degree shooting only by depressing the shutter button with the external apparatus oriented directly above without operating the external apparatus. Hence, in such a case, for example, 360-degree shooting is performed when the moving direction of the image pickup apparatus from the held state to shooting is the directly upward direction, time and effort for user's shooting can be reduced.

In this way, by changing the shooting method based on the status of the image pickup apparatus and the status of a subject, time and effort of the user during shooting and during checking a shot image can be reduced.

In such a determination of a shooting method to be expected based on the status of the image pickup apparatus and the status of a subject, as well as the determination method in <Determination as to Whether Automatic Shooting Is Performed>, the shooting method can be determined through a determination based on a neural network. In this determination process, a determination condition can be changed user by user through the learning process (described later). In such a case, a plurality of images is recorded with a plurality of shooting methods at the initial stage of learning and, in the learning process (described later), the determination condition can be changed according to the image of which shooting method the user prefers.

In this way, a determination of a shooting method appropriate for user's intention in the case where there is a user's manual shooting instruction is described. Such a process is applicable in an automatic shooting determination process in the case where there is no manual shooting instruction as well like S908b. In other words, when it is determined that the image pickup apparatus is set, a shooting method that reflects user's intention can be similarly determined by detecting the way of setting the image pickup apparatus.

By monitoring the acceleration of the image pickup apparatus, even during automatic shooting, the way of setting the image pickup apparatus may be detected, and the shooting method that reflects user's intension may be determined.

(1) Determination as to Whether to Perform Automatic Shooting

Figure 12:
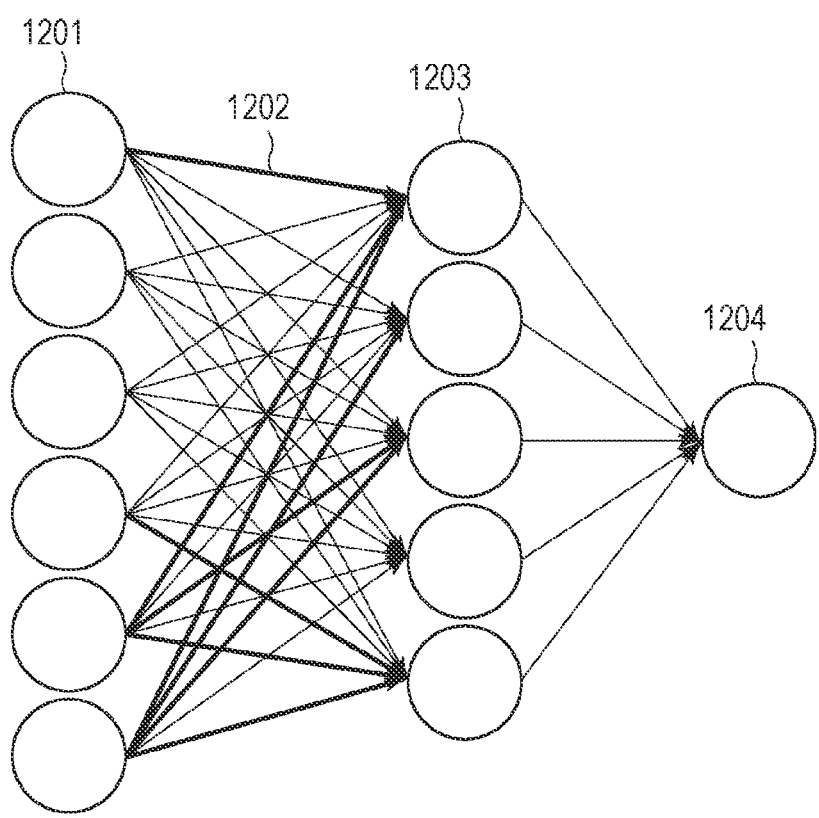
FIG. 12 is a view that illustrates a neural network.

A determination as to whether to perform automatic shooting is performed based on the following two determinations. One is that, when the importance level exceeds a predetermined value based on the importance level for each of the areas, obtained in S904, a determination to perform automatic shooting is made. The second one is a determination based on the neural network. As an example of the neural network, an example of a network with a multilayer perceptron is shown in FIG. 12. A neural network is used to predict an output value from input values and, when the neural network learns input values and a model output value for the inputs in advance, is able to estimate an output value following the learned model for new input values. A method of learning will be described later. In FIG. 12, 1201 and the following circles arranged in column are neurons of an input layer, 1203 and the following circles arranged in column are neurons of an intermediate layer, and 1204 is a neuron of an output layer. Arrows like 1202 represent bindings connecting the neurons. In a determination based on a neural network, a subject appearing in a current angle of view or feature amounts based on the status of a scene or image pickup apparatus is given to the neurons of the input layer as inputs, and a value output from the output layer through computation based on the forward propagation rule of the multilayer perceptron. When the output value is greater than or equal to a threshold, a determination to perform automatic shooting is made. The features of a subject are the current zoom scale factor, a general object recognition result in the current angle of view, a face detection result, the number of faces contained in the current angle of view, the degree of smile and degree of eye closing of each face, a face angle, face identification ID number, the line-of-sight angle of a subject person, a scene identification result, a detected result of a specific composition, and the like. An elapsed time from last shooting, current time, GPS position information, a variation from a last shooting position, a current voice level, a speaking person, whether a clap or cheer arouse, or the like, may be used. Vibration information (acceleration information, the status of the image pickup apparatus), environmental information (temperature, atmospheric pressure, illuminance, humidity, the amount of ultraviolet light), or the like, may be used. Furthermore, when information is provided from the wearable device 501, the provided information (user's motion information, information about the action of the arm, biological information such as heart rate, and the like) may be used as features. These features are converted to numeric values within a predetermined range, and given to the neurons of the input layer as feature amounts. Therefore, the neurons of the input layer are required by the same number as the number of the feature amounts to be used.

In a determination based on the neural network, the output value varies by changing the binding weights between the neurons through the learning process (described later), and the result of the determination can be adapted to the learning result.

A determination for automatic shooting also varies depending on the startup condition of the Main processor, loaded in step 702 of FIG. 7. For example, in the case of startup based on tap detection or startup based on the specific voice command, there is a considerably high possibility that it is an operation that the user wants to shoot currently. Hence, the frequency of shooting is set so as to be increased.

(2) Determination of Shooting Method

In determining a shooting method, a determination as to which one of still image shooting, video shooting, continuous shooting, panoramic shooting, and the like, is performed based on the status of the image pickup apparatus and the status of a surrounding subject, detected in S901 to S904. For example, still image shooting is performed when a subject (person) is static, and video shooting or continuous shooting is performed when a subject is moving. When a plurality of subjects is present around the image pickup apparatus or it is determined to be in a scenic area based on the above-described GPS information, a panoramic shooting process of generating a panoramic image by combining sequentially shot images while panning/tilting may be executed. As in the case of the determination method in <Determination as to Whether to Perform Automatic Shooting>, a shooting method can be determined through a determination based on a neural network using various pieces of information detected before shooting, and, in the determination process, the determination condition may be changed through the learning process (described later).

When it is determined in S909 to shoot resulting from the automatic shooting determination of S908, the process proceeds to S910; otherwise, the process proceeds to the end of the process of the shooting mode.

In S910, automatic shooting is started. At this time, shooting using the shooting method determined in S908 is started. At this time, auto-focus control is executed by the focus control section 204. Exposure control for setting a subject to an appropriate brightness is executed by using an exposure control section, sensor gain control section, and shutter control section (not shown). In addition, after shooting, the image processing section 207 generates an image by performing various image processing, such as auto white balancing, noise reduction, and gamma correction.

At the time of the shooting, a method of, when a predetermined condition is satisfied, executing a process of notifying a person to be shot that the image pickup apparatus shoots and then shooting may be employed. A notification method may, for example, use a voice from the voice output section 218 or LED blinking light generated by the LED control section 224 or perform a motion to visually guide the line of sight of a subject by panning/tilting. The predetermined condition is, for example, the number of faces in the angle of view, the degree of smile and degree of eye closing of each face, the line-of-sight angle or face angle of a subject person, face identification ID number, the number of persons with registered personal identification, and the like. The predetermined condition is also a general object recognition result during shooting, a scene identification result, an elapsed time from last shooting, shooting time, whether a current position based on GPS information is a scenic area, a voice level during shooting, whether there is a speaking person, whether a clap or sheer arouse, or the like. The predetermined condition is also vibration information (acceleration information, the status of the image pickup apparatus), environmental information (temperature, atmospheric pressure, illuminance, humidity, the amount of ultraviolet light), or the like. When notified shooting is performed based on these conditions, an image having preferred eyes to the camera can be recorded in a highly important scene.

Alternatively, a plurality of predetermined conditions may be provided, and, according to the conditions, a voice may be changed, an LED lighting method (such as color and blinking time) may be changed, or a pan/tilt motion method (the way of motion and driving speed) may be changed.

For such a notification before shooting as well, the method or timing of notification may be determined through information about a shot image or a determination based on a neural network using various pieces of information detected before shooting. In this determination process, a determination condition can be changed through the learning process (described later).

In S911, an editing process in which the image generated in S910 is processed or added to a moving image is performed. Image processing is specifically cropping based on the face of a person or a focal position, rotation of an image, HDR (high dynamic range) effect, blur effect, color conversion filter effect, or the like. In image processing, a plurality of images may be generated based on the image generated in S910 by using combinations of the above-described processes, and the generated images may be saved separately from the image generated in S910. In moving image processing, a process of adding a shot moving image or still image to a generated edited moving image while applying special effects of slide, zoom, and fade may be performed. In editing in S911 as well, a method of image processing can be determined through information about a shot image or a determination based on a neural network using various pieces of information detected before shooting, and, in this determination process, the determination condition can be changed through the learning process (described later).

In S912, a process of generating learning information of a shot image is performed. Here, information that is used in the learning process (described later) is generated and recorded. Specifically, the information is a zoom scale factor during shooting, a general object recognition result during shooting, a face detection result, the number of faces contained in a shot image, the degree of smile and eye closing of each face, a face angle, face identification ID number, the line-of-sight angle of a subject person, or the like, in the currently shot image. The information is also a scene identification result, an elapsed time from last shooting, shooting time, GPS position information, a variation from a last shooting position, a voice level during shooting, a speaking person, whether a clap or cheer arouse, or the like. The information is also vibration information (acceleration information, the status of the image pickup apparatus), environmental information (temperature, atmospheric pressure, illuminance, humidity, the amount of ultraviolet light), a video shooting time, whether it is based on a manual shooting instruction, or the like. In addition, a score that is an output of a neural network and that is digitized from a user's preference of image is also computed.

These pieces of information are generated and recorded in a shot image file as tag information. Alternatively, pieces of information about shot images may be written in the non-volatile memory 216 or saved in the recording medium 221 in a list format as so-called catalogue data.

In S913, the previous shooting information is updated. Specifically, the number of images shot for each area, the number of images shot for each person with registered personal identification, the number of images for each subject recognized through general object recognition, or the number of images shot for each scene in scene identification, described in S908, associated with the currently shot image is increased by one count.

Example of Manual Shooting Through Voice Recognition

Figure 9:
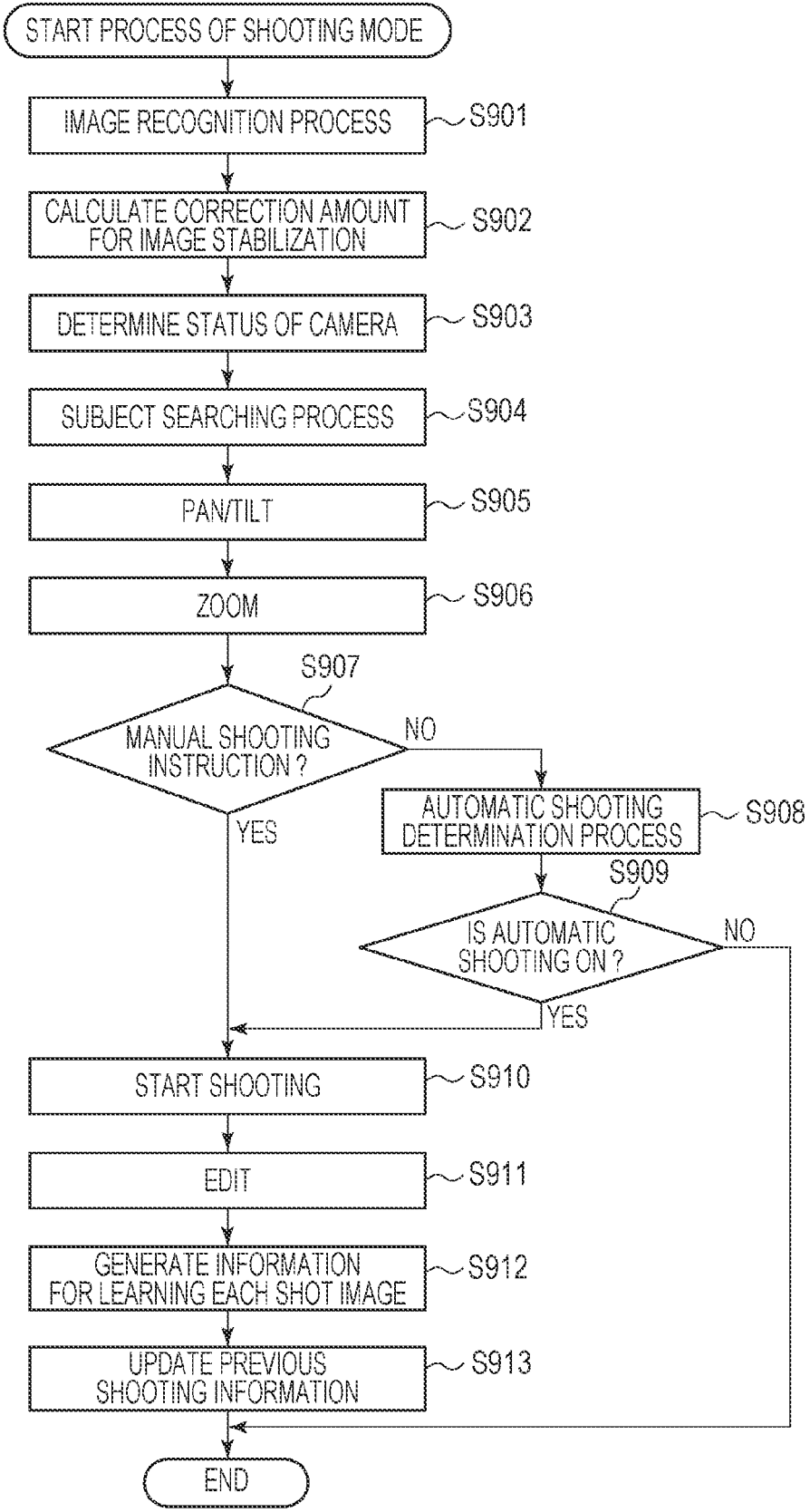
FIG. 9 is a flowchart that illustrates the process of a shooting mode.

As described in S907 of FIG. 9, a user's (manual) shooting instruction also includes an instruction based on voice command input. Voice command input includes voice command input in the case where the user wants to shoot an image containing the user him or herself (for example, "Take my picture", or the like). Then, in the searching process using panning/tilting or zooming, a search is made for a speaking subject, an image in which the subject who spoke a voice command is included in a shooting angle of view is shot.

Figure 24:
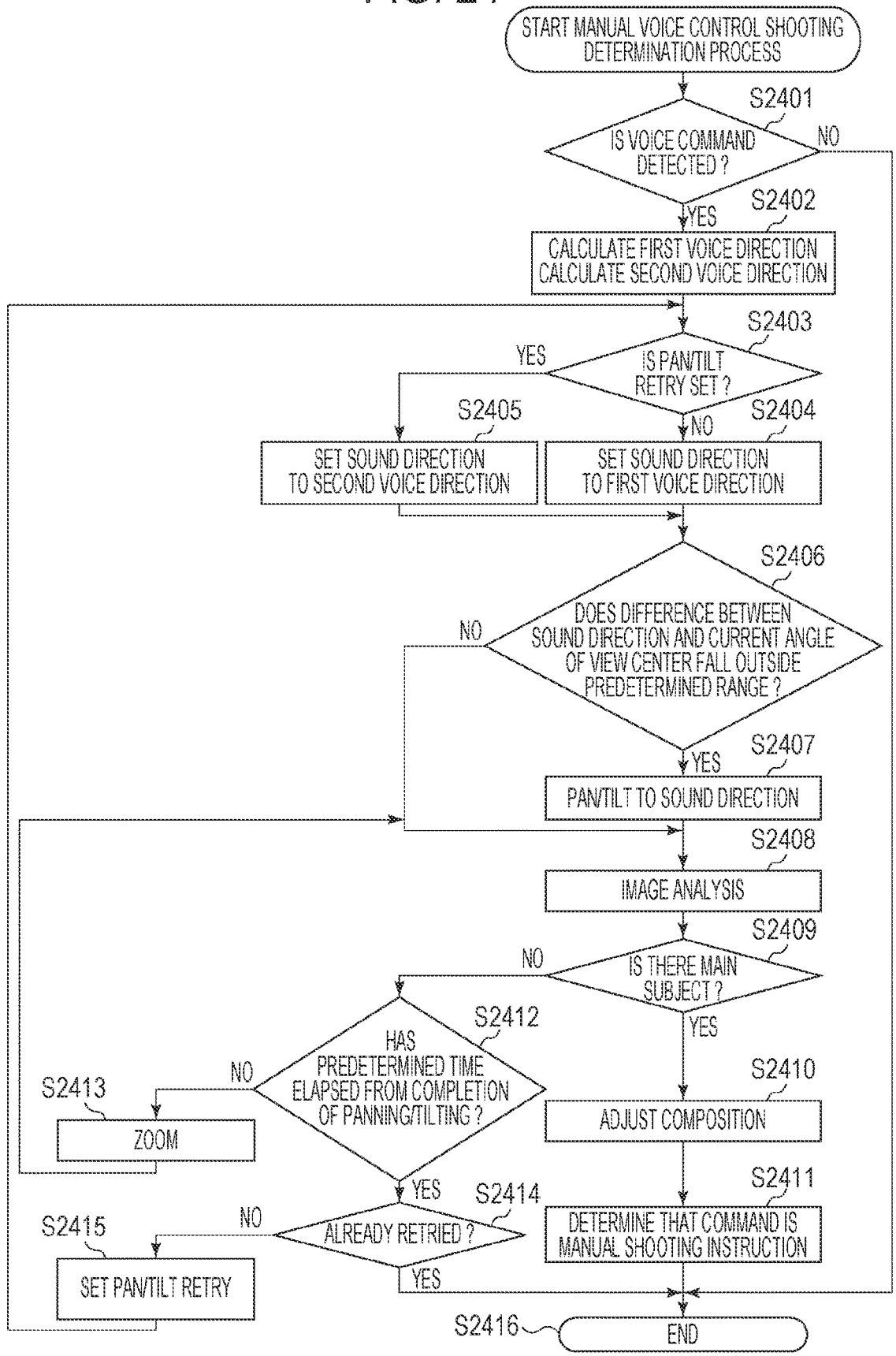
FIG. 24 is a flowchart that illustrates a manual voice control shooting determination process.

Shooting of the user him or herself using a voice command will be described with reference to the flowchart shown in FIG. 24. FIG. 24 is a process that performs a determination within the process of S907 of FIG. 9.

Within the manual shooting instruction process of S907, it is determined whether shooting is based on voice command input. In S2401, it is determined whether specific voice command input (for example, "Take my picture", or the like) is detected by the voice processing section 214. When no voice command is detected, the process proceeds to S2416, and the manual voice control shooting determination process is ended without making a manual shooting determination. When a voice command is detected in S2401, the process proceeds to S2402.

In S2402, the direction of the sound from which the voice command is detected is calculated, and a first sound direction, a second sound direction, a third sound direction, or a fourth sound direction in descending order of the degree of confidence of the sound direction is calculated as a candidate. When the accuracy of detecting a sound direction is considerably high, a plurality of candidates need not be calculated or a subsequent searching process, or the like, need not be performed. However, noise may be included in a detected sound direction because of the status of ambient noise at the time of detecting a voice command, the influence of an object environment, such as sound reflection, or the like, so a plurality of candidates is calculated.

Figure 25:
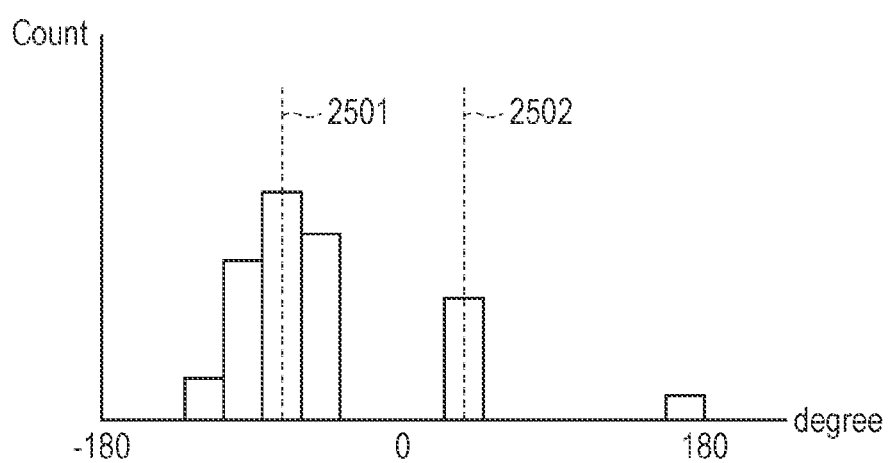
FIG. 25 is a graph that shows results obtained by applying sound direction detected values to histogram processing.

Specifically, candidates are calculated from all the detected sound direction values detected by the time a predetermined time before from the time point at which the voice command is detected. A time for speaking a voice command registered in advance can be predicted to a certain degree (for example, when "Take my picture" is a command, a time that is taken to speak the command is set in advance as a parameter). A first peak 2501 is set as the first sound direction and a second peak 2502 is set as the second sound direction in the histogram process as shown in FIG. 25 from all the detected sound direction values detected within the predetermined time. The first sound direction and the second sound direction each are calculated, and the process proceeds to S2405.

In S2403, it is determined whether pan/tilt retry is set. For pan/tilt retry setting, pan/tilt retry is set in S2415 later, and a pan/tilt retry determination is not performed at the time point at which the manual voice control shooting determination process of this flow is started. When pan/tilt retry is not set in S2403, the process proceeds to S2404, the first sound direction calculated in S2402 is set as the sound direction. When it is determined in S2403 that pan/tilt retry is set, the process proceeds to S2405, and the second sound direction calculated in S2404 is set as the sound direction. When the processes of S2404 and S2405 end, the process proceeds to S2406.

In S2406, it is determined whether the difference between the set sound direction and the current pan/tilt angle falls outside a predetermined range, that is, whether the difference between the sound direction and the current angle of view center falls outside the predetermined range. When the difference falls outside the predetermined range, the process proceeds to S2407, the camera is panned/tilted to adjust the pan/tilt angle such that the detected sound direction comes to the angle of view center, and the process proceeds to S2408. When the difference between the sound direction and the current angle of view center falls within the predetermined range in S2406, the sound direction is located near the center within the angle of view, so the process proceeds to S2408 without panning or tilting.

In S2408, it is determined whether a main subject falls within the current angle of view through image processing and analysis on the shot image. A specific determination method is described as follows.

(1) Detection of Main Subject Through Convolutional Neural Network

Detection of a main subject through a convolutional neural network is known as a general machine learning method of an image recognition process. Through a convolutional neural network, the presence or absence of a detected main subject (speaking subject) is obtained, and, when the main subject is present, position information on the image is also obtained. Alternatively, a main subject determination may be performed through a convolutional neural network for each image cropping the area of each person based on the results of face detection and body detection, and a main subject may be estimated. This convolutional neural network is prepared as the one trained in advance based on the images of persons who spoke voice commands; however, the convolutional neural network can be trained while being used in a method that will be described later.

(2) Detection of Main Subject Through Neural Network

There is a method of performing a main subject determination on each person by using the feature amounts of a subject as inputs for each person contained in the current angle of view. In this case, not only facial features such as a facial expression determination result, the degree of eye closing, a face angle, face identification ID number, and the line-of-sight angle of a subject person but also a gesture determination result, an image scene determination result, a current sound level, a sound scene determination result, or the like, may be used as a feature to be input. This neural network is also the one trained based on subject feature amounts based on the images of persons who spoke voice commands; however, the neural network can be trained while being used in a method that will be described later.

(3) Detection of Subject Through Determination of Features of Each Person

Since a subject has just spoken a voice toward the image pickup apparatus 101, there is a considerably high possibility that the subject is facing toward the camera. Hence, weight coefficients may be assigned to detected results of the face identification ID number, facial expression result, face angle, line-of-sight direction, and gesture determination result, and a determination may be simply performed. When the face identification ID is already registered, there is a high possibility that the person is a main subject. When the degree of smile of the facial expression is high, there is a high possibility that the person is a main subject. When the face angle or the line-of-sight direction is directed toward the camera, there is a high possibility that the person is a main subject. When a gesture (for example, handwaving to the camera, or the like) is being performed, there is a high possibility that the person is a main subject. A main subject may be estimated by using any one or more of pieces of information.

Whether a main subject is present within the current angle of view can be determined by using any one of methods or may be determined by using a combination of two or more of (1) to (3).

After image analysis is performed in S2408, the process proceeds to S2409, and it is determined whether a main subject is found in the process of S2408. When it is determined in S2409 that a main subject is present, the process proceeds to S2410. In S2410, composition adjustment is performed by zooming or panning/tilting, and the process proceeds to S2411. A determination of a composition suitable for shooting an image containing the main subject may be performed through a determination using a neural network. An output value varies by changing the binding weights between the neurons through the learning process (described later), and the result of the determination can be adapted to the learning result.

In S2411, it is determined that there is a manual shooting instruction, and the process proceeds to S2416. The manual voice control shooting process is ended, and the process proceeds to S910 in FIG. 9, and then shooting is started.

When it is determined in S2409 that there is no main subject within the current angle of view, the process proceeds to S2412.

In S2412, it is determined whether a predetermined time has elapsed from when panning/tilting complete in S2407. When it is already determined in S2406 that the difference between the sound direction and the current angle of view center fall within the predetermined range, it is determined based on a lapsed of time from the determined time point. Here, when the predetermined time has not elapsed, the process proceeds to S2413, and a search using zooming is performed. When a subject that spoke a voice command is considerably small within the angle of view, the size of a face is small and the resolution of the face is also low, so this may affect the detection accuracy based on image analysis. Hence, in this case, the camera zooms in to narrow the angle of view, and the process from S2408 is executed again. When a subject who spoke a voice command is too large within the angle of view, the overall image of a person cannot be seen, and it cannot be determined in consideration of, for example, doing a gesture, or the like. Hence, the camera zooms out to widen the angle of view, and the process from S2408 is executed again.

When it is determined in S2412 that the predetermined time has elapsed from the completion of panning/tilting, it is determined that there is no subject who spoke a voice command in the set sound direction. Then, to search for the next sound direction candidate, the process proceeds to S2414, and it is determined whether a pan/tilt retry operation has been performed before. When no retry has been performed, the process proceeds to S2415, and pan/tilt retry is set, and then the process returns to S2403. At this time, since pan/tilt retry is set, the angle of view is set to the sound direction that is the second sound direction of S2405 through the determination of S2403, and a process of searching for a main subject is performed again. In the example of FIG. 24, a method of searching for two candidates, that is, the first sound direction and the second direction, is shown; however, the third or fourth direction may be detected and retry may be repeated.

When it is determined in S2414 that pan/tilt retry has been already performed, the process proceeds to S2416, and the manual voice control shooting determination process is ended without making a manual shooting determination. At this time, to inform the user that shooting is not performed although a voice command is detected, a method of performing the notification process may be taken. A notification method may, for example, use a voice from the voice output section 218 or LED blinking light generated by the LED control section 224. A notification method may be performing a motion to visually guide the line of sight of a subject by panning/tilting or may be a method of providing communication and notification to the smart device 301 or the wearable device 501.

In FIG. 24, shooting resulting from the user performing voice command input in the case where the user wants to shoot an image containing the user him or herself is described. However, voice command input may be voice command input in the case where the user wants to register the user him or herself as a main subject (for example, "Register me", "Track me", or the like). In this case, in the above-described searching process, a search is made for a subject who spoke a voice, and the subject is registered. When the subject is registered, automatic shooting is performed by focusing on the registered subject thereafter. Shooting can be performed while the registered subject is constantly maintained within the angle of view by panning/tilting or zooming.

When a voice command for subject registration is input, subject registration can be implemented by changing the process of S2411 to a process of registering a subject within the process of FIG. 24.

When a subject is registered as well, a detection and registration process is performed by panning/tilting or zooming so that the angle of view allows easy face identification registration and registration of detected color of clothing being worn, or the like, is easily performed.

When the image pickup apparatus 101 has no monitor, a registered subject cannot be checked. Hence, as shown in FIG. 26, the fact that a subject is registered may be informed to the smart device 301, or image data of a registered subject may be sent to allow the user to check.

When a subject is registered, data providing a notification 2602 that the registration can be seen is sent by a communication means 222 to the smart device 301 through communication 2601. When the user checks the subject by operating the smart device 301, the image pickup apparatus 101 sends 2603 the image data, and causes the smart device to display a subject 2604 registered in the smart device so that the user can check. The display that the user can check may be such display that an image related to the registered subject 2604 is superposed at a face frame or near (under) the face frame in order to indicate that the image pickup apparatus 101 has identified the face. The related image may be displayed during video shooting or may be displayed during video playback.

By providing the registered subject so that the user can check in this way, even if a registered subject is wrong, the user can be prompted to register a subject again. Since it can be determined whether it is correct or incorrect, a registered subject can be learned and varied through the learning process that will be described later.

In the present embodiment, shooting in a sound direction and subject registration through voice command input using both panning/tilting and zooming are described; however, shooting and subject registration may be performed by using only panning/tilting or shooting and subject registration may be performed by using only zooming.

When only panning/tilting is used, S2412 and S2413 are not performed in FIG. 24.

When only zooming is used, after the sound direction is detected, zooming is set such that the sound direction falls within the angle of view, and a search is made for a main subject with zooming. Thus, shooting and subject registration are performed.

Process of Automatic Editing Mode (Highlight Video)

Next, the process of the automatic editing mode (highlight video) in the present embodiment will be described.

In determining a mode to be set in step 704 of FIG. 7, it is determined whether to perform the automatic editing process (highlight video). When it is determined to perform the automatic editing process, the process of the automatic editing mode of step 712 is performed.

A determination condition for the automatic editing mode will be described. Whether to shift into the automatic editing mode is determined based on an elapsed time from a last editing process or tag information (such as learning information and a score digitizing the user's preference of image) of each image shot after the time point at which the last editing process is performed. A determination process flow as to whether to shift into the automatic editing mode, which is determined in the mode setting determination process of step 704, is shown in FIG. 10.

Figure 10:
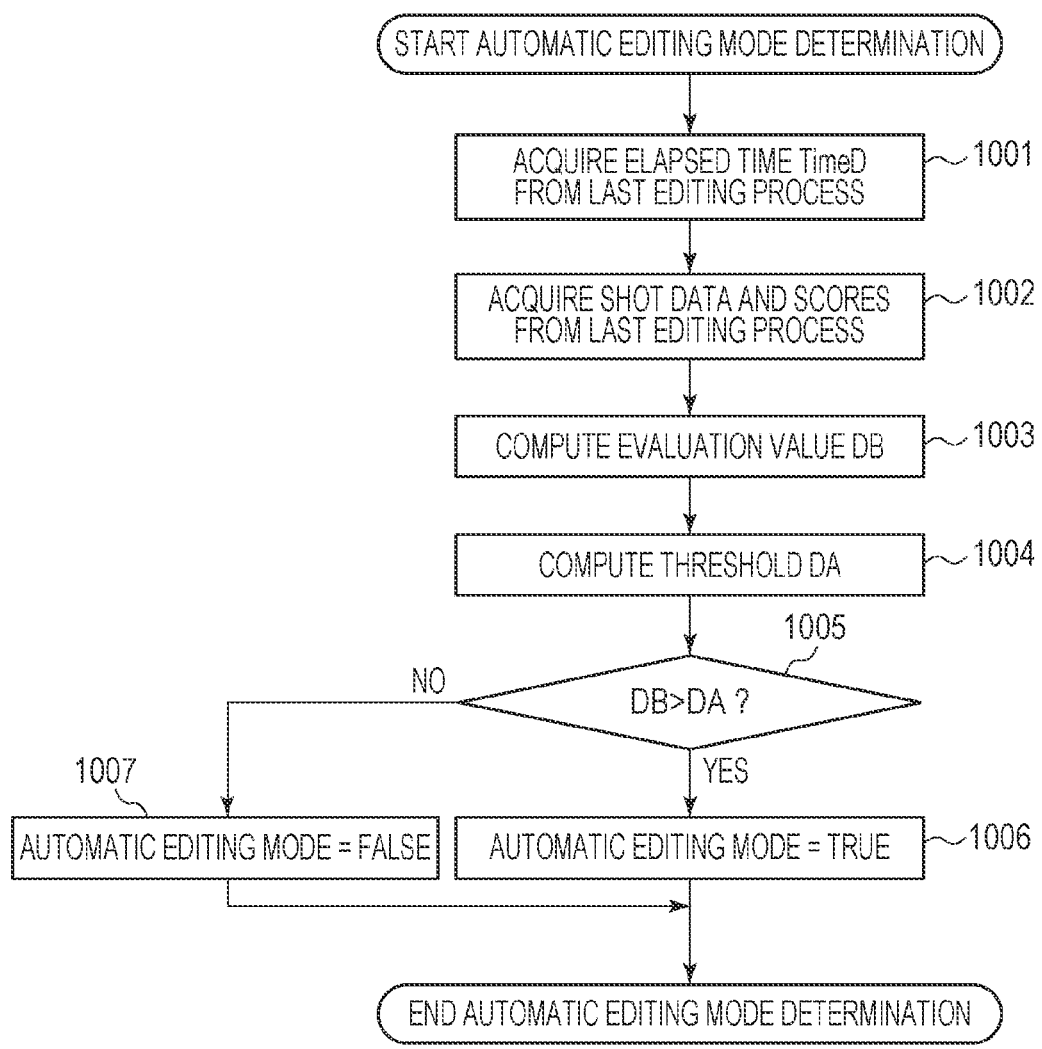
FIG. 10 is a flowchart that illustrates automatic editing mode determination.

When an instruction to start the automatic editing mode determination is issued in the mode setting determination process of step 704, the process of FIG. 10 starts. In step 1001, an elapsed time TimeD from when the last automatic editing process is performed is acquired, and the process proceeds to step 1002. In step 1002, learning information, score, and the like, associated with each image shot after the time point at which the last editing process is performed, are acquired, and the process proceeds to step 1003. In step 1003, an evaluation value DB for determining whether to perform automatic editing is computed from the data acquired in step 1002. A method of computing an evaluation value is to, for example, extract features of an image from each piece of image information and, when there are many types of features, assign higher points. As described in the above automatic shooting, a score determined for the user's preference is computed for each image, and higher points is assigned to an image having a higher score. Higher points are calculated as the number of shot images increases. Thus, an evaluation value depends on how high the points of the score is, depends on the number of images, and depends on the types of features. The process proceeds to step 1004. In step 1004, a threshold DA is computed from TimeD. For example, a threshold DAa in the case where TimeD is shorter than a predetermined value is set so as to be greater than a threshold DAb in the case where TimeD is longer than the predetermined value, and the threshold is set so as to reduce with time. Thus, even in the case where shot image data is small, the automatic editing process is performed when an elapsed time is long, with the result that the image pickup apparatus is configured to automatically create a highlight video according to a usage time.

When the process of step 1004 completes, the process proceeds to step 1005. When the evaluation value DB is greater than the threshold DA, the process proceeds to step 1006. Since it is the case where, after the time point at which the last automatic editing is performed, data to be automatically edited is obtained or it is determined to perform automatic editing because of a long elapsed time, the automatic editing mode is set to TRUE, and the automatic editing mode determination is ended. When the evaluation value DB is less than or equal to the threshold DA in step 1005, it is determined that data to be automatically edited is not available, so the automatic editing mode determination is set to FALSE such that the automatic editing process is not performed, and the automatic editing mode determination process is ended.

Figure 11:
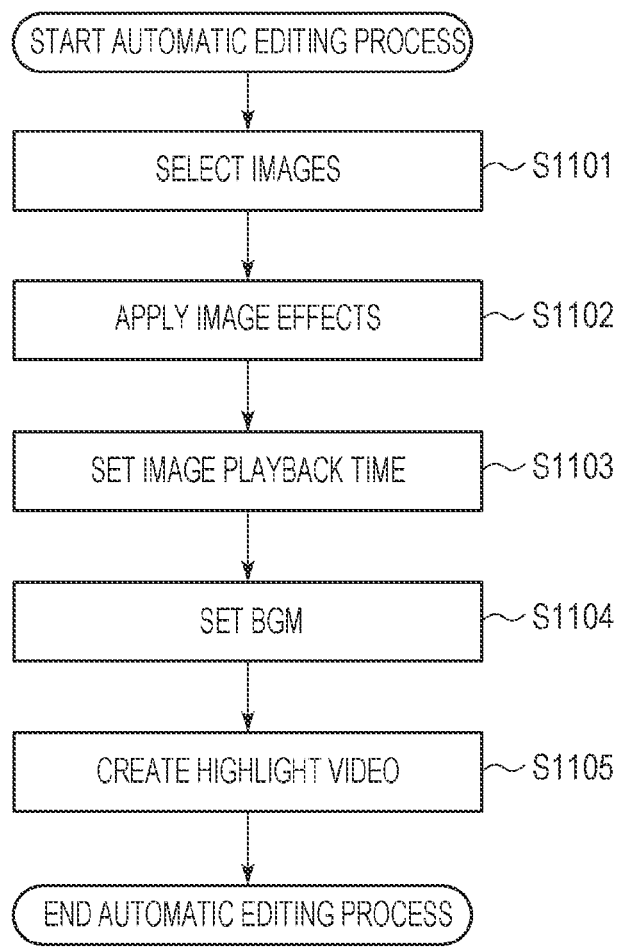
FIG. 11 is a flowchart that illustrates an automatic editing process.

Next, a process in the process of the automatic editing mode (step 712) will be described. The detailed flow of the process of the automatic editing mode is shown in FIG. 11.

In S1101, a process of selecting from among still images and moving images saved in the recording medium 221 is executed in the first control section 223 to select images to be used in editing, and the process proceeds to S1102.

The image selecting process here is to extract metadata, such as the number of faces, the size of each face, and color groups, in a shot still or moving image for each image, convert the metadata to an evaluation value, and list the images having an evaluation value greater than or equal to a set threshold. The selection ratio between a still image and a moving image is decided through learning (described later), and selection is preferentially performed in view of settings of the user, the frequency of shooting, and settings.

In S1102, image effects are applied by the first control section 223 and the image processing section 207 to the images selected in S1101, and the process proceeds to S1103.

The application of image effects here is cropping on the face of a person or the center of a focal position, rotation of an image, HDR (high dynamic range) effect, blur effect, special effects of slide, zoom, and fade, color filter effect, or the like, in a still image.

In a moving image as well, color filter is applied similarly.

In S1103, an image playback time is set in the first control section 223, and the process proceeds to S1104. An appropriate image playback time is set based on learning (described later) for creating a highlight video that will be described in S1105 by using the images selected in S1101.

In S1104, a music (BGM) to be applied to the highlight video that will be described in S1105 is set in the first control section 223, and the process proceeds to S1105. For setting a music (BGM) as well, the most appropriate one to be provided to the user is set based on the result of learning (described later).

In S1105, a series of highlight video creation is performed using the results of S1101 to S1104 performed in the first control section 223. The created highlight video is saved in the recording medium 221.

The above-described selection of images, application of image effects, playback time, and BGM selection can be determined through a determination based on a neural network by using the tag information (information about a shot image, or various pieces of information detected before shooting) added to each image. In this determination process, a determination condition can be changed through the learning process (described later).

Process of Automatic File Deletion Mode

Next, the process of the automatic file deletion mode in the present embodiment will be described.

In the present embodiment, when there is no available capacity in the recording medium, shooting cannot be performed, and there are concerns that shooting cannot be performed in response to user's intention or an intended scene cannot be shot in automatic shooting. Images can be deleted through a user's operation; however, it is complicated. Hence, a shot image that meets a condition needs to be automatically deleted in the process that will be described below. On the other hand, the user may delete images that are needed later, so appropriate images need to be selected and deleted.

Figure 29:
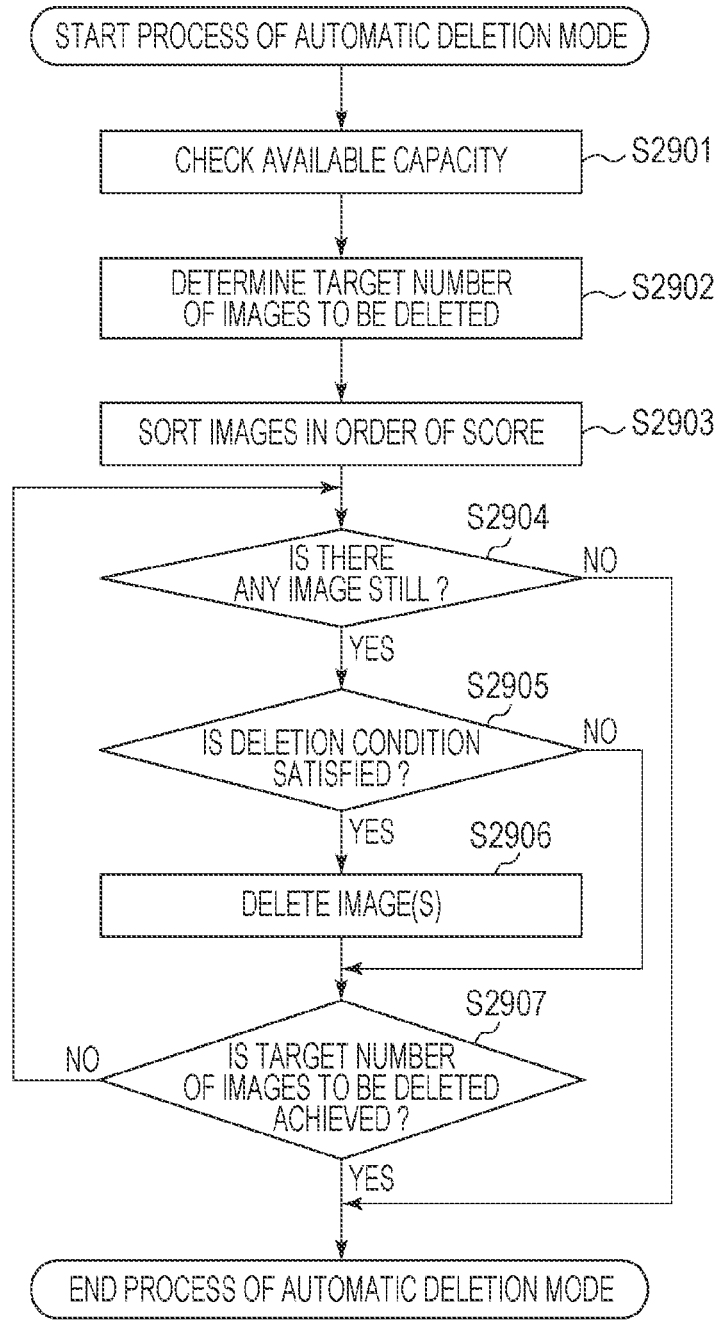
FIG. 29 is a flowchart that illustrates a process of an automatic file deletion mode.

The process will be described by way of an example of the process flow of the automatic file deletion mode of FIG. 29.

In S2901, the available capacity in the recording medium is checked. In S2902, a target number of images to be deleted is decided according to the available capacity in the recording medium. For example, a target number of images to be deleted is set so as to increase as the available capacity reduces, and is set so as to increase as the set frequency of shooting increases. The target number of images to be deleted may be varied according to learning (described later). In S2903, a list of shot images saved in the recording medium and sorted in descending order of score digitizing the user's preference of image (described later) is created. From S2904, it is determined whether an image is deleted one by one from the top of the sorted list to the bottom, and a deleting process is executed. In S2905, it is determined whether an intended image on the list meets a deletion condition.

The deletion condition may be, for example, the fact that an image is not the one manually shot by the user or the fact that an image is not the one highly valued by the user. These are images that the user likes or may be needed later, so these are desirably excluded from the deletion condition.

The fact that an image has been already transferred to an external communication apparatus, such as the smart device, in the automatic transfer mode, the fact that the user has not browsed an image from the external communication apparatus, or the like, may be used. When an image is already transferred, the transferred image is usable, so deletion of the image is less likely to lead to user's disadvantage. An automatically shot image that the user has not browsed even once is not recognized by the user, so it is presumable that the user does not feel disadvantageous even when the image is deleted. When an image meets the deletion condition, the process proceeds to S2906, the image is deleted, and the process proceeds to S2907. When the image does not meet the condition, the process proceeds to S2907 without deleting the image. In S2907, it is determined whether the target number of images to be deleted is achieved. When the target number is achieved, the process of the automatic deletion mode is ended. When the target number is not achieved, the process returns to S2904, and the process is sequentially repeated on the next image in the list. When there is no image to be processed in the list in S2904, the process is ended.

Process of Learning Mode

Next, learning adapted to the user's preference in the present embodiment will be described.

In the present embodiment, the neural network as shown in FIG. 12 is used, and learning adapted to the user's preference is performed in the learning processing section 219 using a machine learning algorithm. The neural network is used to predict an output value from input values. When the neural network learns historical values of the input values and historical values of the output value in advance, the neural network is able to estimate an output value for new input values. By using the neural network, learning adapted to the user's preference is performed for the above-described automatic shooting, automatic editing, and subject searching.

Subject registration (face identification, general object recognition, or the like) that is feature data to be input to the neural network is registered, and shooting notification control, low electric power consumption mode control, and automatic file deletion are changed through learning.

In the present embodiment, elements to be learned through the learning process are as follows.

(1) Automatic Shooting

Learning for automatic shooting will be described. In automatic shooting, learning for automatically shooting an image that matches the user's preference is performed. As described with reference to the flow of FIG. 9, the process of generating learning information is performed after shooting (step S912). Images to be learned through a method (described later) are selected, and learning is performed by changing the weights of the neural network based on learning information included in the images. Learning is performed by changing the neural network that determines automatic shooting timing and changing the neural network that determines a shooting method (still image shooting, video shooting, continuous shooting, panoramic shooting, or the like).

(2) Automatic Editing

Learning for automatic editing will be described. For automatic editing, learning is performed on each of editing just after shooting in step 911 of FIG. 9 and editing of a highlight video, described in FIG. 11. Editing just after shooting will be described. Images to be learned through a method (described later) are selected, and learning is performed by changing the weights of the neural network based on learning information included in the images. Various pieces of detected information obtained from information in shooting or just before shooting are input to the neural network, and an editing method (cropping, rotation of an image, HDR (high dynamic range) effect, blur effect, color conversion filter effect, or the like) is determined. Editing of a highlight video will be described. For a highlight video, learning for automatically creating a video album that matches the user's preference is performed. Images to be learned through a method (described later) are selected, and learning is performed by changing the weights of the neural network based on learning information included in the images. Various pieces of detected information obtained from information in shooting or just before shooting are input to the neural network, and application of image effect (cropping, rotation, HDR effect, blur effect, slide, zoom, fade, color conversion filter effect, BGM, time, still image-moving image ratio) is determined.

(3) Subject Searching

Learning for subject searching will be described. For subject searching, learning for automatically searching for a subject that matches the user's preference is performed. As described with reference to the flow of FIG. 9, in the subject searching process (step S904), the importance level of each area is calculated, the camera is panned/tilted or zoomed, and subject searching is performed. Learning is performed based on a shot image and detected information during searching, and learning is performed by changing the weights of the neural network. Subject searching that reflects learning is performed by inputting various pieces of detected information during searching operation to the neural network, calculating the importance level, and setting the pan/tilt angle based on the importance level. Other than setting of the pan/tilt angle based on the importance level, for example, learning of panning/tilting (speed, acceleration, the frequency of motion) is also performed.

(4) Subject Registration

Learning for subject registration will be described. In subject registration, learning for automatically registering and ranking a subject that matches the user's preference is performed. For learning, for example, face identification registration, registration of general object recognition, and registration of a gesture, voice recognition, and scene recognition based on a sound are performed. For identification registration, the identifications of persons and objects are registered, and a rank is set based on the number of times of frequency an image is acquired, the number of times or frequency an image is manually shot, and the frequency of appearance of a subject being searched. The registered information will be registered as inputs of determinations using the neural networks.

(5) Shooting Notification Control

Learning for shooting notification will be described. As described with reference to S910 of FIG. 9, when a predetermined condition is satisfied just before shooting, the image pickup apparatus notifies a person to be shot that the image of the person is shot, and then shoots the person. For example, a motion to visually guide the line of sight of a subject by panning/tilting, a speaker sound that is emitted from the voice output section 218, and LED blinking light generated by the LED control section 224 are used. It is determined whether to use detected information of a subject in learning based on whether the detected information (for example, the degree of smile, line of sight detection, gesture) is obtained just after the notification, and learning is performed by varying the weights of the neural network. Alternatively, images to be learned through a method (described later) are selected, and learning is performed by changing the weights of the neural network based on learning information included in the images. Information that describes how the notification motion is performed just before shooting is embedded in an image, and detected information added to the selected image and the information about the notification motion just before shooting are learned as training data. The detected information just before shooting is input to the neural network, and it is determined whether to provide notification or each notification operation (sound (sound level/sound type/timing), LED light (color, lighting time, blinking interval), and pan/tilt motion (the way of motion, driving speed)). For learning of notification operations, a method of learning which one of notifications is selected from among prepared notification methods (combined operations of sound, LED light, and pan/tilt motion) may be used. A method in which separate neural networks are provided respectively for the notification operations of sound, LED light, and pan/tilt motion and the operations are learned may be used.

(6) Low Electric Power Consumption Mode Control

As described with reference to FIG. 7 and FIG. 8, control for starting or stopping an electric power supplied to the Main processor (first control section 223) is executed, and a return condition from the low electric power consumption mode and a transition condition into the low electric power consumption state are learned.

First, learning of a condition for cancelling the low electric power consumption mode will be described.

Tap Detection

As described above, the predetermined time TimeA or the predetermined threshold ThreshA is varied through learning. Temporary tap detection is performed in a state where the above-described threshold for tap detection is reduced, and the parameters of TimeA and ThreshA are set such that a tap is easily detected depending on whether the temporary tap detection is determined before tap detection. When it is determined that it is not a startup factor based on detected information after tap detection (there is no target to be shot as a result of the above-described subject searching or automatic shooting determination), the parameters of TimeA and ThreshA are set such that a tap is difficult to be detected. A determination as to whether there is a target to be shot at the time of startup varies depending on detected information on a subject, embedded in each image learned through the learning method (described later).

Detection of Shaking State

As described above, the predetermined time TimeB, the predetermined threshold ThreshB, or the predetermined count CountB is varied through learning. When the startup condition is satisfied based on the shaking state, startup is performed; however, when it is determined that it is not a startup factor based on detected information in a period of a predetermined time after startup (there is no target to be shot as a result of the above-described subject searching or automatic shooting determination), learning is performed such that startup becomes difficult by changing the parameter of the shaking state determination. When it is determined that the frequency of shooting in a large shaking state is high, the parameter is set such that startup becomes easy through a shaking state determination. A determination as to whether there is a target to be shot at the time of startup or a determination as to whether the frequency of shooting in a large shaking state is high varies depending on detected information on a subject, embedded in each image learned through the learning method (described later), shake information during shooting, or the like.

Sound Detection

Learning can be performed by manually setting a specific voice, specific sound scene, or specific sound level that the user wants to detect, via, for example, communication with the exclusive application of the external apparatus 301. In addition, a plurality of detected sounds is set in advance in the voice processing section, images to be learned through a method (described later) are selected, and learning is performed based on learning information such as sound information before and after shooting, included in the images. Thus, a sound determination to be used as a startup factor (a specific voice command or a sound scene, such as "cheer" and "clap") can be set, and startup based on sound detection can be learned.

Detection of Environmental Information

Learning can be performed by manually setting the condition of a change in environmental information, which the user wants to start up the image pickup apparatus, via, for example, communication with the exclusive application of the external apparatus 301. For example, the image pickup apparatus can be caused to start up depending on a specific condition of temperature, atmospheric pressure, brightness, humidity, the absolute amount or variation of ultraviolet light amount. Determination thresholds based on the pieces of environmental information can be learned. When it is determined that it is not a startup factor based on detected information after startup, of the pieces of environmental information (there is no target to be shot as a result of the above-described subject searching or automatic shooting determination), the parameters of the determination thresholds are set such that the startup condition is difficult to be detected. Alternatively, by learning from environmental information embedded in images learned through the learning method (described later), startup based on environmental information can be learned. For example, when many images shot at the time of a temperature increase are learned, learning is performed such that the image pickup apparatus is more easily driven at the time of a temperature increase. The parameters also vary depending on the remaining level of a battery. For example, when the battery level is low, it becomes difficult to shift into various determinations, and, when the battery level is high, it becomes easy to shift into various determinations. Specifically, for a shaking state detection result or sound scene detection of sound detection that is a condition and not a factor that the user definitely wants to start up the image pickup apparatus, easiness of each detection determination varies depending on the battery level.

Next, learning of a condition to shift into the low electric power consumption state will be described.

As shown in FIG. 7, when the determination condition of none of the "automatic shooting mode", "automatic editing mode", "automatic image transfer mode", "learning mode", and "automatic file deletion mode" is satisfied in the mode setting determination 704, the mode shifts into the low electric power consumption mode. The determination condition of each mode is as described above, and the condition for determining each mode also varies through learning. For the automatic shooting mode, as described above, the importance level of each area is determined, and automatic shooting is performed while subject searching is performed by panning/tilting. Since the importance level of each area is calculated based on the number or size of subjects, such as persons and objects, in the area, the importance levels of all the areas are low in a situation in which there is no surrounding subject. Hence, for example, the automatic shooting mode may be cancelled based on a condition as to whether the importance levels of all the areas or a value obtained by adding the importance levels of the areas is less than or equal to a predetermined threshold. Thus, in such a situation that there is no subject around and the necessity of shooting is low, the automatic shooting mode can be cancelled and shifted into the low electric power consumption state. At this time, the predetermined threshold may be lowered according to an elapsed time from when the mode shifts into the automatic shooting mode. The mode can be more easily shifted into the low electric power consumption mode as an elapsed time from when the mode shifts into the automatic shooting mode extends. Also, by varying the predetermined threshold depending on the remaining level of the battery, low electric power consumption mode control that takes battery depletion into consideration can be executed. For example, the threshold reduces when the battery level is low, and the threshold increases when the battery level is high. Here, based on an elapsed time from when the mode shifts into the automatic shooting mode last time and the number of images shot, a parameter (elapsed time threshold TimeC) for a next low electric power consumption mode cancellation condition is set in the Sub-processor.

The above-described thresholds vary through learning. Learning can be performed by manually setting a shooting frequency, startup frequency, and the like, via, for example, communication with the exclusive application of the external apparatus 301. Alternatively, the parameters may be learned by storing an average value or distribution data for each time period of an elapsed time from turning on of the power button of the image pickup apparatus 101 to turning off of the power button. In this case, learning is performed such that a time interval to return from the low electric power consumption mode or shift into the low electric power consumption state reduces for a user of which a time from power on to power off is short and the time interval extends for a user of which a time from power on to power off is long. Learning is also performed based on detected information during searching. Learning is performed such that a time interval to return from the low electric power consumption mode or shift into the low electric power consumption state reduces while it is determined that the number of important subjects set through learning is large and the time interval extends while the number of important subjects is small.

(7) Automatic File Deletion

Learning for automatic file deletion will be described. For automatic file deletion, the available capacity of a file, selection of images to be preferentially deleted, and the like, are learned. Images to be learned through a method (described later) are selected, and learning can be performed by changing the weights of a neural network based on learning information included in the images. As described above, as described in the automatic shooting, a score determined for the user's preference is computed for each image, and the image having a lower score is preferentially deleted from the recording medium 221. Learning is performed based on not only the points of the score but also a shot date and time embedded in each image in the recording medium 221 or the details of editing of a selected highlight video (automatically edited moving image) with a method (described later). Learning is, for example, performed such that a file of an older shot date and time is preferentially deleted when the acquired highlight video contains many images shot at short time intervals and a file having a higher score even with an older date and time is not deleted when the acquired highlight video contains images shot at long time intervals. Alternatively, the score of each image in the recording medium 221 is sequentially re-calculated at predetermined time intervals. Shot date and time information is also input to a neural network at the time of score calculation, and learning is performed such that a file of an older shot date and time has a lower score when many images are shot at short time intervals. Thus, such a file is preferentially deleted, and learning is performed such that, when an image shot at a long time intervals is included, the score does not decrease even when the date and time is old, with the result that learning is performed such that a file having a higher score even with an older date and time is not deleted. In another example, images to be learned are selected in a method (described later); however, when the selected images of a relatively newer date and time are often intensively selected, a file of an older shot date and time is preferentially deleted. However, learning is performed such that, when the selected images of a relatively older date and time are often selected, a file having a higher score even with an older date and time is not deleted. In another example, when learning is performed such that shooting frequency increases, files are automatically deleted such that the available area for files are increased; whereas, when learning is performed such that shooting frequency decreases, files are automatically deleted such that the available area for files may be small. In another example, when learning is performed such that shooting frequency for a moving image increases, files are automatically deleted such that the available area for files are increased; whereas, when learning is performed such that shooting frequency for a still image increases, files are automatically deleted such that the available area for files reduces.

(8) Image Stabilization

Learning for image stabilization will be described. For image stabilization, image stabilization is performed by calculating a stabilization amount in S902 of FIG. 9 and driving pan/tilt in S905 based on the stabilization amount. In image stabilization, learning for making a correction adapted to the characteristics of user's shake is performed. The direction and magnitude of blurring can be estimated by, for example, estimating PSF (Point Spread Function) for a shot image. In generation of learning information in S912 of FIG. 9, the estimated direction and magnitude of blurring are added to the image as information. Within the process of the learning mode in step 716 of FIG. 7, the weights of a neural network for stabilization are learned by using the estimated direction and magnitude of blurring as an output and pieces of detected information during shooting as inputs. Pieces of detected information during shooting are motion vector information of an image in a predetermined time before shooting, information about the motion of a detected subject (person or object), vibration information (gyro output, acceleration output, the status of the image pickup apparatus), and the like. Other than the above, a determination may be performed by adding environmental information (temperature, atmospheric pressure, illuminance, humidity), sound information (sound scene determination, specific voice detection, sound level change), time information (an elapsed time from startup, an elapsed time from last shooting), place information (GPS position information, a variation in position movement), or the like, as inputs. By inputting the pieces of detected information to the neural network at the time of calculating a stabilization amount in S902, the magnitude of blurring at the time of instantaneous shooting can be estimated, and control, such as decreasing the shutter speed, is possible when the estimated magnitude of blurring is large. When the estimated magnitude of blurring is large, the image can be blurred, so a method, such as prohibiting shooting, may be employed. Since there are limits in panning/tilting angles, when a driving end is reached, a further correction cannot be made; however, by estimating the magnitude and direction of blurring during shooting as described above, a range required to panning/tilting for stabilization during exposure can be estimated. When there is no margin for the movable range during exposure, large blurring can be suppressed by increasing the set cut-off frequency of a filter that calculates a stabilization amount such that the range does not exceed the movable range. When the range is likely to exceed the movable range, the panning/tilting angle is turned in a direction opposite to the direction in which the panning/tilting angle is likely to exceed the movable range just before exposure, and then exposure is started. Thus, shooting without blurring can be performed while the movable range is ensured. Thus, stabilization can be learned in conformity with the characteristics and the way of use of the user during shooting, so an image without blurring can be shot. In the above-described "determination of a shooting method", it is determined whether to perform panning shooting, and subject blurring correction may be performed by estimating a pan/tilt driving speed from detected information until before shooting. Here, panning shooting is shooting in which a moving subject is not blurred and a static background flows. In this case, by inputting the pieces of detected information to a neural network, the driving speed during still image shooting is estimated. For learning, the direction and magnitude of blurring in a block in which a main subject is located are estimated by dividing an image into blocks and estimating the PSF of each block, and learning can be performed based on the information. The amount of flow of background can be learned based on the amount of flow of background of the selected image through a learning method (described later). In this case, the magnitudes of blurring in the blocks in which the main subject is not located within the selected image are estimated, and the user's preference can be learned based on the information. By setting the shutter speed during shooting based on the background flow amount of the learned preference, shooting that can provide panning effect adapted to the user's preference can be automatically performed.

(9) Automatic Image Transfer

Learning for automatic image transfer will be described. For automatic image transfer, learning is performed on the process of selecting images to be preferentially transferred from among the images recorded on the recording medium 221, the transfer frequency, and the like. Images to be learned through a method (described later) are selected, and learning can be performed by changing the weights of a neural network based on learning information included in the images. As described above, as described in the automatic shooting, a score determined for the user's preference is computed for each image, and the image having a higher score is preferentially transferred. Learning information associated with images previously transferred is also used in image transfer determination. When images to be learned are selected in a method (described later), which one of the pieces of learning information (feature amounts) including in the image, on which importance is placed, is set, and, when many images previously transferred include similar feature amounts, images having a higher score and including other feature amounts are set so as to be transferred. Image transfer frequency also varies according to the statuses of the image pickup apparatus. The image transfer frequency varies depending on the remaining level of the battery. For example, the image transfer frequency is set such that images are more difficult to be transferred when the battery level is low and images are easier to be transferred when the battery level is high. Specifically, for example, image transfer frequency may also vary by employing a configuration that an elapsed time from when images are automatically transferred last time is multiplied by the highest score among images shot during the elapsed time, images are configured to be transferred when the multiplied value exceeds a threshold, and a threshold is varied depending on the battery level. In another example, the frequency of automatic image transfer is changed according to the shooting frequency set by the image pickup apparatus 101. When learning is performed such that shooting frequency increases, the frequency of automatic image transfer is also set so as to increase. When learning is performed such that shooting frequency reduces, the frequency of automatic image transfer is also set so as to reduce. At this time, image transfer frequency commensurate with the set shooting frequency can be changed by varying the threshold according to shooting frequency. In another example, the frequency of automatic image transfer is also changed according to the available capacity in the file (recording medium 221). When the available capacity in the file is large, the frequency of automatic image transfer is set so as to reduce. When the available capacity in the file is small, automatic image transfer frequency is set so as to increase. By varying the threshold depending on the available capacity in the file at this time, image transfer frequency commensurate with the available capacity in the file can be changed.

Next, learning methods will be described.

The learning methods include "learning in the image pickup apparatus" and "learning in cooperation with the communication apparatus".

The method for learning in the image pickup apparatus will be described below.

(1) Learning Using Information Detected when Shooting Instruction is Issued by User As described in step S907 to step S913 of FIG. 9, in the present embodiment, the image pickup apparatus 101 is able to perform two types of shooting, that is, manual shooting and automatic shooting. When a shooting instruction (which is performed based on three determinations as described above) based on a manual operation is issued in step S907, information that the shot image is a manually shot image is added in step S912. When it is determined in step S909 that automatic shooting is on and an image is shot, information that the shot image is an automatically shot image is added in step S912.

When manual shooting is performed here, there is a considerably high possibility that shooting is performed based on a subject of the user's preference, a scene of the user's preference, and a place and time interval of the user's preference. Thus, learning is performed based on learning information of gesture data and shot image obtained during manual shooting.

Learning is also performed on extraction of feature amounts in shot image, registration of personal identification, registration of facial expression of each person, and registration of a combination of persons based on information detected during manual shooting. Learning is also performed to change the degrees of importance of nearby persons and objects based on, for example, the facial expression of each subject personally registered by using information detected during subject searching. When "a user manually turns to pan/tilt" (described later with reference to FIG. 17 to FIG. 22) as well, a subject present within the angle of view after turning is learned when an instruction to change the angle of view is issued. This is also part of learning based on detected information of manual operation.

(2) Learning Using Information Detected During Subject Searching

During subject searching operation, it is determined who, what, and which scene a subject registered with personal identification is in an image shot at the same time, and the ratios of times during which the subject, object, or scene with which the subject appears within the angle of view at the same time, are computed.

For example, it can be determined that the degree of importance is high when the ratio of time that a person A of a subject registered with personal identification and a person B of a subject registered with personal identification appear at the same time is higher than a predetermined threshold. Therefore, when the person A and the person B are included in the angle of view, various pieces of detected information are saved as learning data such that points for automatic shooting determination increases, and are learned in the process 716 of the learning mode.

In another example, when the ratio of time that the person A of the subject registered with personal identification appears at the same time with subject "cat" determined through general object recognition is higher than the predetermined threshold, it may be determined that the degree of importance is high. Therefore, when the person A and the "cat" are included in the angle of view, various pieces of detected information are saved as learning data such that points for automatic shooting determination increases. Then, learning is performed in the process 716 of the learning mode.

In this way, when points for automatic shooting determination is increased in the case where the frequency of appearance of a subject being searched is high, the degrees of importance of persons and objects near the subject registered with personal identification may also be changed so as to increase.

When the degree of smile of the person A of the subject registered with personal identification is detected or when "pleasure", "surprise", or the like, is detected by detecting a facial expression, a process of learning a subject that appears at the same time is performed so as to be important. Since there is a low possibility that a subject that appears at the same time when "anger", "straight face", or the like, is detected from a facial expression is important, so a process of, for example, not learning is performed.

Next, learning in cooperation with the external communication apparatus in the present embodiment will be described.

For learning in cooperation with the external communication apparatus in the present embodiment, there are the following methods.

(3) Learning Through Acquisition of Image with External Communication Apparatus

As described in FIG. 3, the image pickup apparatus 101 and the external apparatus 301 have communication means for the communications 302, 303. Images are sent or received mainly via the communication 302. Images in the image pickup apparatus 101 can be communicated and acquired to the external apparatus 301 via the exclusive application in the external apparatus 301. Thumbnail images of image data saved in the image pickup apparatus 101 can be browsed via the exclusive application in the external apparatus 301. Thus, the user is able to select a his or her favorite image from among the thumbnail images, check the image, and acquire the image onto the external apparatus 301 by operating an image acquisition instruction.

At this time, since the user selects an image, issues a sending instruction, and acquires the image, there is a considerably high possibility that the acquired image is an image of the user's preference. Thus, it is determined that the acquired image is an image to be learned, and various learning of the user's preference can be performed by performing learning based on learning information of the acquired image.

Figure 16:
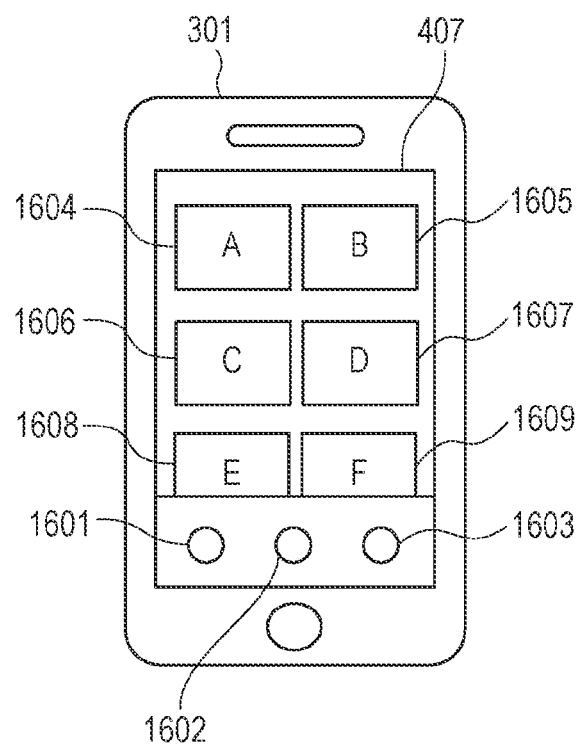
FIG. 16 is a diagram that illustrates a display process according to the present embodiment.

An operation example will be described. An example in which images in the image pickup apparatus 101 are being browsed via the exclusive application of the external apparatus 301 that is the smart device is shown in FIG. 16. Thumbnail images (1604 to 1609) of image data saved in the image pickup apparatus are displayed on the display part 407, and the user can select a user's favorite image and acquire the image. At this time, display method changing parts (1601, 1602, 1603) for changing a display method are provided. When the part 1601 is depressed, the order of display is changed into a date and time priority display mode, images are displayed on the display part 407 in order of the shooting dates and times of the images in the image pickup apparatus 101 (for example, the images are displayed such that the image 1604 has a new date and time and the image 1609 has an old date and time). When the part 1602 is depressed, the mode is changed to a recommended image priority display mode. The images are displayed on the display part 407 in descending order of the scores of the images in the image pickup apparatus 101 based on the score determined based on the user's preference for each image, computed in step S912 of FIG. 9 (for example, the images are displayed such that the image 1604 has a higher score and the image 1609 has a lower score). When the part 1603 is depressed, a subject person or object can be designated and subsequently a specific subject person or object is designated, only the specific subject can be displayed.

The display method changing parts 1601 to 1603 may be set to an on state at the same time. For example, when all are set to the on state, images are displayed such that only the designated subject is displayed and images having a newer shot date and time are given a higher priority and images having a higher score are given a higher priority.

In this way, since the user's preference is also learned from shot images as well, only images of the user's preference can be easily extracted with simple checking work from among a large number of shot images.

(4) Learning Through Input of Determination Value on Image via External Communication Apparatus As described above, the image pickup apparatus 101 and the external apparatus 301 have communication means, and images saved in the image pickup apparatus 101 can be browsed via the exclusive application in the external apparatus 301. Here, the configuration that the user scores each image may be applicable. The user is able to give high points (for example, 5 points) to an image that the user regards as a preference or give lower points (for example, 1 point) to an image that the user regards as not a preference. The image pickup apparatus is configured to learn based on a user's operation. The points of each image is used in re-learning together with learning information in the image pickup apparatus. Learning is performed such that the output of a neural network at the time of inputting feature data from designated image information approaches the points designated by the user.

In the present embodiment, the configuration that the user inputs a determination value to each shot image via the communication apparatus 301 is employed. Alternatively, the configuration that a determination value is directly input to each image by operating the image pickup apparatus 101 may be employed. In this case, for example, a touch panel display is equipped for the image pickup apparatus 101, and the mode is set to a mode for displaying a shot image by the user depressing a GUI button displayed on a touch panel display screen display part. Then, similar learning can be performed with a method in which the user inputs a determination value to each shot image while checking the image.

(5) Learning through Analysis of Images Saved in External Communication Apparatus The external apparatus 301 includes the storage section 404, and images other than the images shot by the image pickup apparatus 101 are also recorded in the storage section 404. At this time, the images saved in the external apparatus 301 can be easily browsed by the user and an image is easily uploaded to a shared server via the public line control section 406, so there is a considerably high possibility that many images of the user's preference are included.

The external apparatus 301 may be configured to be able to process a learning process equivalent to that of the learning processing section 219 in the image pickup apparatus 101 with the control section 411 over the images stored in the storage section 404 via the exclusive application. In this case, the external apparatus 301 can be configured to perform learning by communicating processed learning data to the image pickup apparatus 101. Alternatively, the external apparatus 301 may be configured to perform learning in the image pickup apparatus 101 by sending images or data that the external apparatus 301 wants the image pickup apparatus 101 to learn.

Alternatively, the external apparatus 301 may be configured to perform learning by the user selecting images to be learned from among the images saved in the storage section 404 via the exclusive application.

(6) Learning from Information Uploaded to Server of SNS with External Communication Apparatus A method of using information in a social networking service (SNS) that is a service or website that can construct a social network focusing on a connection between persons for learning will be described. There is a technology for, at the time of uploading images to an SNS, inputting tags related to the images from the smart device and sending the tags with the images. There is also a technology for inputting likes and dislikes on images uploaded by another user, and it can also be determined whether the images uploaded by the another user are photos of the preference of the user who owns the external apparatus 301.

With an exclusive SNS application downloaded onto the external apparatus 301, images uploaded by the user him or herself and information about the images as described above can be acquired. Alternatively, when the user inputs likes or dislikes on images uploaded by another user, images of the user's preference and tag information can be acquired. Those images and tag information are analyzed and can be learned and set in the image pickup apparatus 101.

As described above, the external apparatus 301 may be configured to acquire images uploaded by the user or images determined that the user likes, and be able to process a learning process equivalent to that of the learning processing section 219 in the image pickup apparatus 101 with the control section 411. Thus, learning can be performed by communicating the processed learning data to the image pickup apparatus 101. Alternatively, the external apparatus 301 may be configured to send images that the external apparatus 301 wants the image pickup apparatus 101 to learn and cause the image pickup apparatus 101 to perform learning.

In addition, learning is performed such that color conversion filter effect in the process 712 of the automatic editing mode of FIG. 7 or in color conversion filter effect of the editing S911 of FIG. 9 varies based on an image filter provided in the SNS using tag information.

Alternatively, information about a subject that is the user's preference is estimated from subject information set in tag information, and learning is performed by registering the subject as a subject to be detected and input to a neural network. It is presumable that the subject information is, for example, information about an object subject, such as a dog and a cat, information about a scene, such as a beach, information about a facial expression, such as a smile, or the like.

Current trendy image information in the world may be configured to be estimated from statistical values of tag information (image filter information or subject information) on the SNS, and learned and set in the image pickup apparatus 101.

(7) Learning through Change of Parameters with External Communication Apparatus

As described above, the image pickup apparatus 101 and the external apparatus 301 have communication means, and a learning parameter currently set in the image pickup apparatus 101 can be communicated to the external apparatus 301 and saved in the storage section 404 of the external apparatus 301. For example, the weights of a neural network, selection of a subject to be input to the neural network, or the like, is conceivable as a learning parameter. Alternatively, a learning parameter set in an exclusive server can be acquired via the public line control section 406 through the exclusive application in the external apparatus 301 and can be set to a learning parameter in the image pickup apparatus 101. Thus, a learning parameter can be returned by saving a parameter at a certain time point in the external apparatus 301 and setting the parameter in the image pickup apparatus 101, or a learning parameter that another user has can be acquired via an exclusive server and set to the image pickup apparatus 101 of his or her own.

A voice command registered by the user, identification registration, or a gesture may be able to be registered or an important place may be registered, via the exclusive application of the external apparatus 301. For these pieces of information, a shooting trigger described in the process of the automatic shooting mode (FIG. 9) is handled as input data of automatic shooting determination.

A shooting frequency, startup interval, still image-moving image ratio, preferred image(s), or the like, may be set, or a startup interval described in <Low Electric Power Consumption Mode Control>, a still image-moving image ratio described in <Automatic Editing>, or the like, may be set.

(8) Learning from Information on Manual Editing of Image with External Communication Apparatus The exclusive application of the external apparatus 301 can have a function that allows manual editing through a user's operation, and the details of editing work can be fed back to learning. For example, an image can be edited by application of image effect, and a neural network for automatic editing is trained so as to determine application of manually edited image effect for learning information of the image. It is conceivable that image effect is, for example, cropping, rotation, slide, zoom, fade, color conversion filter effect, time, still image-moving image ratio, or BGM.

Here, in the case of learning that the user him or herself has performed shooting (1) or image selection ((3) to (8)), because the user has intentionally operated, there is a high possibility that the learning is reliable learning to incorporate the user's preference. However, (2) Learning Using Information Detected During Subject Searching is not the learning based on an intentional user's operation, so there is a possibility that the learning contains learning not desired by the user. For example, another person, object, or scene appearing at the same time with a subject registered with personal identification is learned from image information during searching; however, a subject frequently appearing at the same time is not necessarily the user's preference. Hence, learning ((1), (3) to (8)) in the case where the user intentionally shoots or selects an image is preferentially performed rather than the case (2) where learning is not based on an intentional user's operation.

Learning data is various data (image information, vibration information, environmental information, sound information, place information, or the like) recorded as tag information during shooting or during searching, and, when incorporated into learning, the various data is saved in a list form. The number of data in a group for learning is a number set to a fixed value. A data group for learning is divided into two regions, that is, a region of learning data that the user has intentionally made and a region of learning data that the user has not intentionally made. The ratio of the numbers of data in the regions is set to a ratio such that the number of the learning data region that the user has intentionally made is greater. When a new instruction to incorporate learning is issued, learning data is deleted from the learning data associated with each region, and new learning data is added. For example, when two pieces of learning data that the user has intentionally made are to be added, two pieces of data are deleted from the learning data region that the user has intentionally made, the new two pieces of data are added, and learning is performed again.

With the above configuration, learning ((1), (3) to (8)) in the case where the user intentionally shoots or selects an image is preferentially performed rather than the case (2) where learning is not based on an intentional user's operation.

Alternatively, among various data for learning, dates and times at which the pieces of learning data are generated are managed, and a weighting coefficient La commensurate with an elapsed time from the date and time at which learning data is generated is calculated. The weighting coefficient La is updated so as to reduce as the elapsed time extends. In addition, a weighting coefficient Lb based on whether learning data is learning data that the user has intentionally made or learning data that the user has not intentionally made is also managed in association with each learning data. The weighting coefficient Lb for learning data that the user has intentionally made is set so as to be greater than the weighting coefficient Lb for learning data that the user has not intentionally made. Among pieces of learning data that the user has intentionally made, the weighting coefficient Lb may be changed depending on which one of the learnings (1), (3) to (8).

When new learning data is added, learning data of which a value obtained by multiplying the weighting coefficient La by Lb is the smallest among a current group of learning data is preferentially deleted, then the additional data is inserted, and machine learning is performed based on the updated learning data group.

With the above configuration, learning ((1), (3) to (8)) in the case where the user intentionally shoots or selects an image is preferentially performed rather than the case (2) where learning is not based on an intentional user's operation.

If, with the configuration of FIG. 1 to FIG. 6, no screen is equipped and setting a priority is difficult on the image pick up apparatus and setting a priority is performed on a menu on the external apparatus, time and effort of the user are required. However, when priority flags are automatically set based on not an operation for setting priority flags but an operation for shooting process or an operation for editing process, time and effort of the user can be reduced. When priorities are automatically evaluated by using shot images, for example, when images that are being shot at predetermined time intervals are evaluated, there is a possibility that similar images are shot but those are not necessarily a major subject, so a user's intention may not be reflected. In contrast to this, in the present embodiment, priority flags are set based on a process that the user has intentionally made, so there is a high possibility that the user's intention is sufficiently reflected.

Next, a learning process sequence will be described.

In determining a mode to be set in step 704 of FIG. 7, it is determined whether to perform a learning process. When the learning process is performed, it is determined that the mode is a learning mode, and the process of the learning mode of step 716 is performed.

A determination condition for the learning mode will be described. Whether to shift into the learning mode is determined based on an elapsed time from when a last learning process is performed, the number of pieces of information available for learning, whether there is a learning process instruction via the communication apparatus, or the like. A flow of the determination process as to whether to shift into the learning mode, which is determined in the mode setting determination process of step 704, is shown in FIG. 14.

Figure 14:
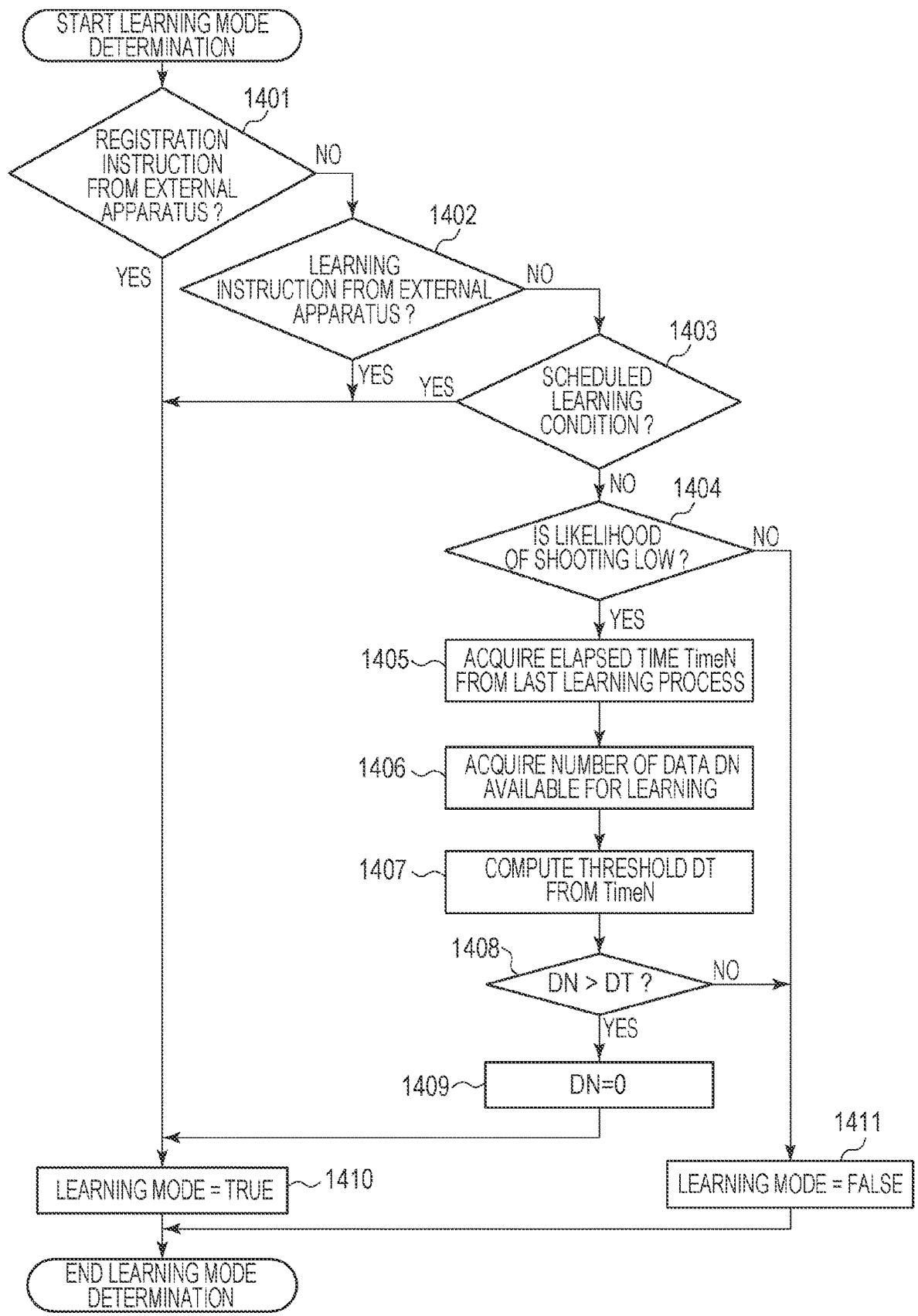
FIG. 14 is a flowchart that illustrates learning mode determination.

When an instruction to start the learning mode determination is issued in the mode setting determination process of step 704, the process of FIG. 14 starts. In step 1401, it is determined whether there is a registration instruction from the external apparatus 301. Registration here is a determination as to whether there is the above-described registration instruction for learning. For example, there is <Learning Using Image Information Acquired with Communication Apparatus> or <Learning through Input of Determination Value on Image via External Communication Apparatus>. There is also <Learning through Analysis of Images Saved in Communication Apparatus>, or the like. When there is a registration instruction from the external apparatus in step 1401, the process proceeds to step S1410, and the process of step 716 is set so as to be executed by setting a learning mode determination to TRUE. When there is no registration instruction from the external apparatus in step S1401, the process proceeds to step 1402. In step 1402, it is determined whether there is a learning instruction from the external apparatus. The learning instruction here is a determination as to whether there is an instruction to set learning parameters like <Learning through Change of Image Pickup Apparatus Parameter with Communication Apparatus>. When there is a learning instruction from the external apparatus in step 1402, the process proceeds to step S1410, and the process of step 716 is set so as to be executed by setting a learning mode determination to TRUE, after which the learning mode determination process is ended. When there is no learning instruction from the external apparatus in step S1402, the process proceeds to step 1403.

In step 1403, it is determined whether a scheduled learning condition is satisfied. A learning condition based on scheduled time may be used. For example, learning is performed at 24:00 every day. Thus, learning is periodically performed, so the newness of a learned result can be kept constant. As another example, learning may be performed on the condition that an instruction for power off is issued by depressing the power button of the image pickup apparatus 101. At this time, the power is turned off after the learning process is ended. The learning process generally needs a long processing time. When the learning process is executed at the timing at which it is estimated that the user does not use the image pickup apparatus 101 for shooting, or the like, for a while like during power off, the learning process can be executed without interfering with a use of the user. When the predetermined learning condition is satisfied, the process proceeds to step S1410. When the condition is not satisfied, the process proceeds to step 1404. In step 1404, it is determined whether there is a possibility that shooting is performed. As described above, the learning process takes time, so it is advisable to avoid executing the learning process at the timing at which there is a possibility of performing shooting. Hence, for example, based on the condition that an instruction for manual shooting has not been issued for a last set period of time or longer or the condition that the importance level of an area in the automatic shooting mode is lower than or equal to a predetermined level, it is determined that there is a low possibility of performing shooting for some time. When it is determined that the possibility of shooting is low, the process proceeds to step 1405. Otherwise, the process proceeds to step 1411, and the learning mode determination is set to FALSE. In step 1405, an elapsed time TimeN from the last learning process (re-calculation of the weights of the neural network) is performed, and the process proceeds to step S1406. In step 1406, the number of new data DN to be learned (the number of images to be learned, designated during the elapsed time TimeN from when the last learning process is performed) is acquired, and the process proceeds to step 1407. In step 1407, a threshold DT is computed from TimeN. For example, a threshold DTa for the case where TimeN is shorter than a predetermined value is set so as to be greater than a threshold DTb for the case where TimeN is longer than the predetermined value, and the threshold is set so as to reduce with time. Thus, even when the number of learning data is small, learning is performed again when an elapsed time is long, thus making it easy for the image pickup apparatus to learn and vary according to a usage time.

When the threshold DT is computed in step 1407, the process proceeds to step 1408, and it is determined whether the number of data DN to be learned is greater than the threshold DT. When DN is greater than the threshold DT, the process proceeds to step 1409, and DN is set to zero. Then, the process proceeds to step 1410, the learning mode determination is set to TRUE to set up such that the process of step 716 is performed, after which the learning mode determination process is ended.

When DN is less than or equal to the threshold DT in step 1408, the process proceeds to 1411. Since there is neither a registration instruction from the external apparatus nor a learning instruction from the external apparatus and the number of learning data is also less than or equal to the predetermined value, the learning mode determination is set to FALSE to set up such that the process of step 716 will not be performed, after which the learning mode determination process is ended.

Next, a process in the learning mode process (step 716) will be described. The detailed flow of the process of the learning mode is shown in FIG. 15.

Figure 15:
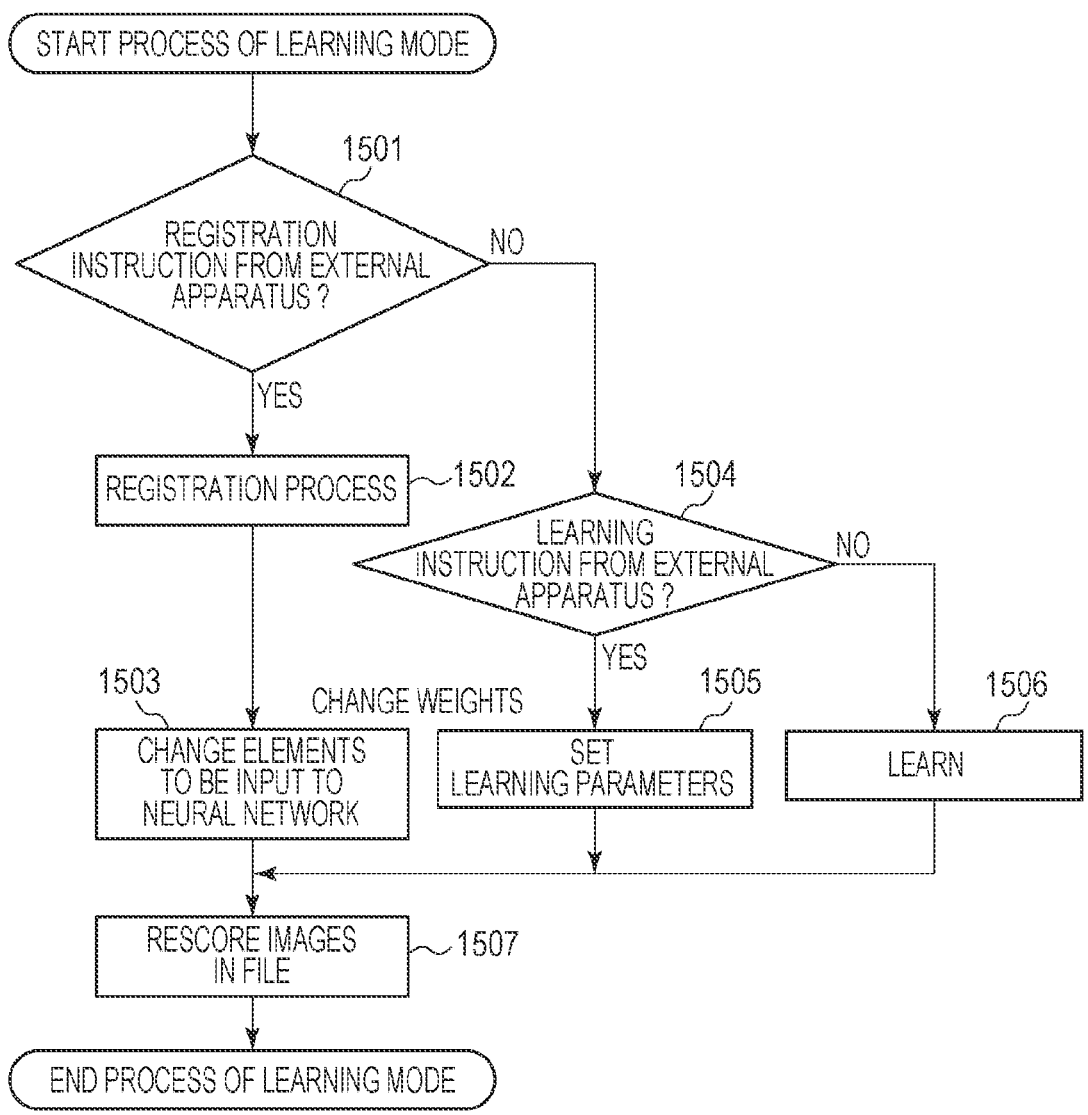
FIG. 15 is a flowchart that illustrates a learning process.

When it is determined in step 715 of FIG. 7 that the mode is the learning mode and the process proceeds to step 716, the process of FIG. 15 starts. In step 1501, it is determined whether there is a registration instruction from the external apparatus 301. When there is a registration instruction from the external apparatus in step 1501, the process proceeds to step 1502. In step 1502, a process of various types of registration is performed.

Various types of registration are registration of features to be input to a neural network, and include, for example, registration of face identification, registration of general object recognition, registration of sound information, registration of place information, and the like.

When the registration process completes, the process proceeds to step 1503, and elements to be input to the neural network are changed based on the information registered in step 1502.

When the process of step 1503 completes, the process proceeds to step 1507.

When there is no registration instruction from the external apparatus 301 in step 1501, the process proceeds to step 1504, and it is determined whether there is a learning instruction from the external apparatus 301. When there is a learning instruction from the external apparatus, the process proceeds to step 1505, the learning parameters communicated from the external apparatus are set to each determination device (the weights of the neural network, or the like), and the process proceeds to step 1507.

When there is no learning instruction from the external apparatus in step 1504, learning (re-calculation of the weights of the neural network) is performed in step 1506. A condition to shift into the process of step 1506 is a condition that, as described with reference to FIG. 14, the number of data DN to be learned exceeds the threshold and re-learning of each determination device is allowed. Re-learning is performed by using a method, such as an error back propagation method and a gradient descent method, the weights of the neural network are re-calculated, and the parameters of each determination device are changed. When the learning parameters are set, the process proceeds to step 1507.

In step 1507, scores are assigned to the images in the file again. In the present embodiment, scores are assigned to all the shot images saved in the file (recording medium 221) based on the learned result, and automatic editing or automatic file deletion is performed according to the assigned scores. Thus, when re-learning or setting of the learning parameters from the external apparatus is performed, scores of the already shot images also need to be updated. Thus, in step 1507, re-calculation for assigning new scores to shot images saved in the file is performed. When the process ends, the process of the learning mode is ended.

In the present embodiment, a method of suggesting a video image of the user's preference by extracting scenes that the user seems to like, learning the features of the scenes, and reflecting the learned features in an operation such as automatic shooting and automatic editing, is described; however, the present invention is not limited to this application. For example, the learned features may be intentionally used in application to provide a video image that is different from those of the user's preference. Examples of the implemented methods are as follows.

(1) Method Using Neural Network Having Learned Preference

For learning, learning of the user's preference is performed as described above. Then, in S908 of "Automatic Shooting", automatic shooting is performed when an output value of the neural network is a value that indicates to be different from those of the user's preference that is training data. For example, when images that the user likes are set for training images and learning is performed such that a higher value is output when an image having features similar to those of the training images, automatic shooting is performed on the condition that an output value is less by a predetermined value or more on the contrary. Similarly, in subject searching process or automatic editing process as well, a process in which an output value of the neural network is a value that indicates to be different from those of the user's preference that is training data is executed.

(2) Method Using Neural Network Having Learned Situation Different from Preference In this method, at the time point of the learning process, learning is performed using a situation different from those of the user's preference as training data. For example, manually shot images are scenes that the user likes to shoot, and a learning method using the manually shot images as training data is described above. In contrast to this, in the present embodiment, manually shot images are not used as training data on the contrary, and scenes that have not been manually shot for a predetermined time or longer are added as training data. Alternatively, when scenes of which features are similar to those of manually shot images are included in training data, those scenes may be deleted from the training data. Alternatively, images of which features are different from those of images shot by the external communication apparatus may be added to training data or images of which features are similar to those of the shot images may be deleted from the training data. With this configuration, data different from those of the user's preference gathers in training data, and, as a result of learning, the neural network is able to identify situations different from those of the user's preference. In automatic shooting, by performing shooting according to an output value of the neural network, a scene different from those of the user's preference can be shot. Also, in automatic editing, editing images different from those of the user's preference can be suggested similarly.

As described above, by intentionally suggesting a video image different from those of the user's preference, shooting is performed under scenes that a user hesitates to manually shoot, so the effect of reducing the missing of a photo opportunity is obtained. Also, by suggesting the effect of shooting or editing in scenes on which the user him or herself has no idea, the effect that the user may find something or broaden the preference can be expected.

By combining the above-described means, it is easy to adjust the degree of adaptation to the user's preference like suggesting a situation slightly similar but partially different from those of the user's preference. The degree of adaptation to the user's preference may be changed according to mode setting, the statuses of the various sensors, and the statuses of the pieces of detected information.

In the present embodiment, description is made based on the configuration that performs learning within the image pickup apparatus 101; however, the configuration that a learning process is provided on the external apparatus 301, data required for learning is communicated to the external apparatus 301, and learning is performed only on the external apparatus is also able to achieve a similar learning effect. In this case, as described in the above <Learning through Change of Parameter with Communication Apparatus>, the configuration that learning is performed by setting parameters, such as the weights of the neural network, learned on the external apparatus to the image pickup apparatus 101 through communication may be employed.

The configuration that a learning process is provided in each of both the image pickup apparatus 101 and the external apparatus 301 may be employed. For example, the configuration that learning information in the external apparatus 301 is communicated to the image pickup apparatus 101 at the timing at which the process 716 of the learning mode is performed in the image pickup apparatus 101 and learning is performed by merging learning parameters may be employed.

Figure 17:
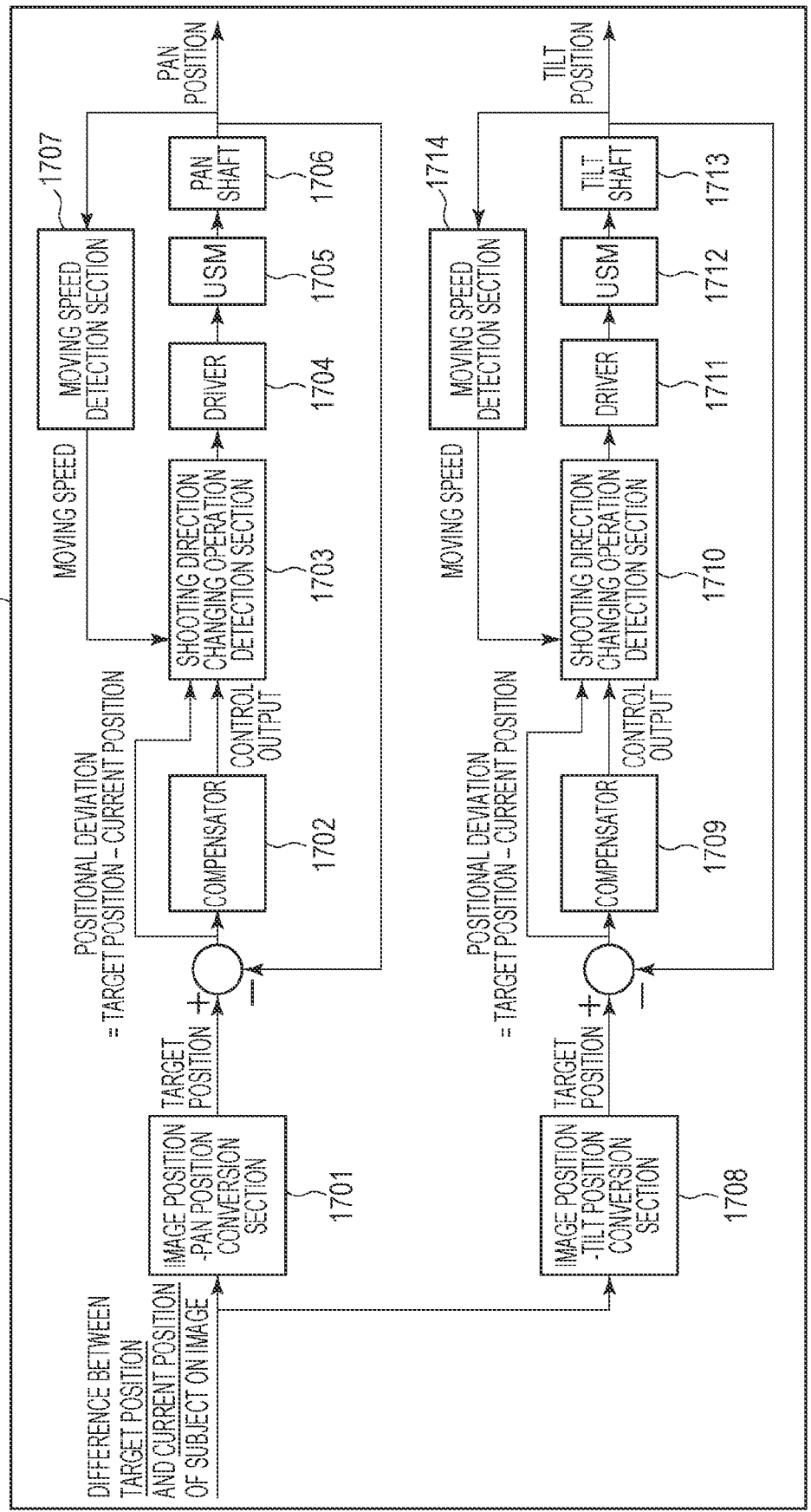
FIG. 17 is a diagram that shows the configuration of a lens-barrel rotation drive section.
Figure 18:
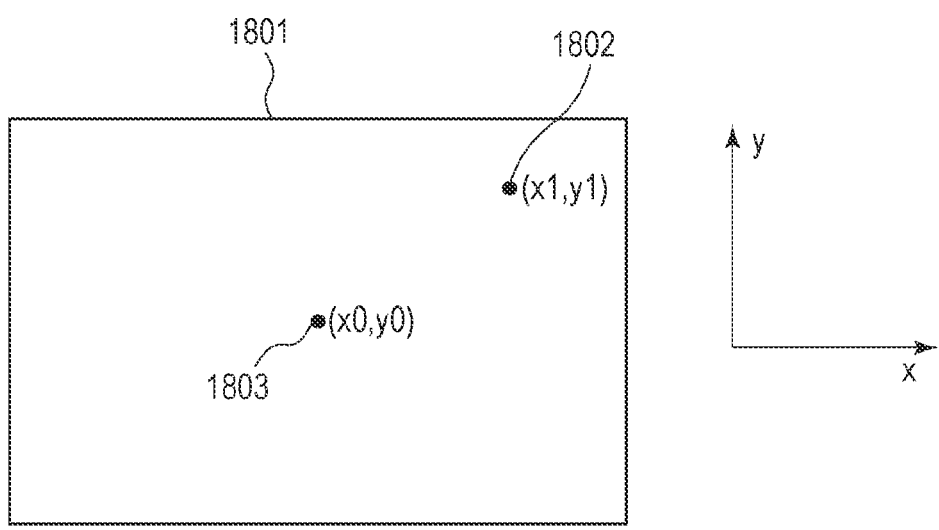
FIG. 18 is a view that illustrates a target position and actual position of a subject on an image.

In S907 of the above-described process of the automatic shooting mode (FIG. 9), it is determined whether there is a user's (manual) shooting instruction, and when there is a shooting instruction, the process proceeds to S910. Here, the user's (manual) shooting instruction may be issued by manually turning the direction in which the image pickup apparatus is oriented (hereinafter, shooting direction). FIG. 17 is a block diagram that shows the configuration of the lens-barrel rotation drive section 205. Components 1701 to 1707 of FIG. 17 are related to driving of the pan shaft. Components 1708 to 1714 of FIG. 17 are related to driving and controlling of the tilt shaft. Basic configurations related to driving of the pan shaft and driving of the tilt shaft are the same, so only the configuration related to the pan shaft will be described, and the description of the configuration related to driving of the tilt shaft is omitted. The reference numeral 1701 indicates an image position-pan position conversion section for calculating a target position at the time of driving the pan shaft 1706 based on the difference between a target position and a current position of a subject on an image. FIG. 18 is a view that shows the relationship between the current position and target position of a subject in an image shot by the image pickup apparatus. The reference numeral 1801 indicates a certain instantaneous image obtained with the image processing section 207 during subject searching of the image pickup apparatus. The reference number 1802 indicates the current position (x1,y1) of the subject. The reference numeral 1803 indicates the target position (x0,y0) of the subject. At the time of calculating pan and tilt target positions based on the difference between the target position

1803 and current position 1802 of the subject on the image, the following formulas are used.

$$kp(f) \times (x1-x0) \quad (1)$$

$$kt(f) \times (y1-y0) \quad (2)$$

kp(f) is a conversion coefficient for calculating a target pan position based on the difference between the target position and current position of the subject on the image, which varies according to the focal length f of the image pickup apparatus. kt(f) is a conversion coefficient for calculating a target tilt position based on the difference between the target position and current position of the subject on the image, which varies according to the focal length f of the image pickup apparatus.

Figure 19:
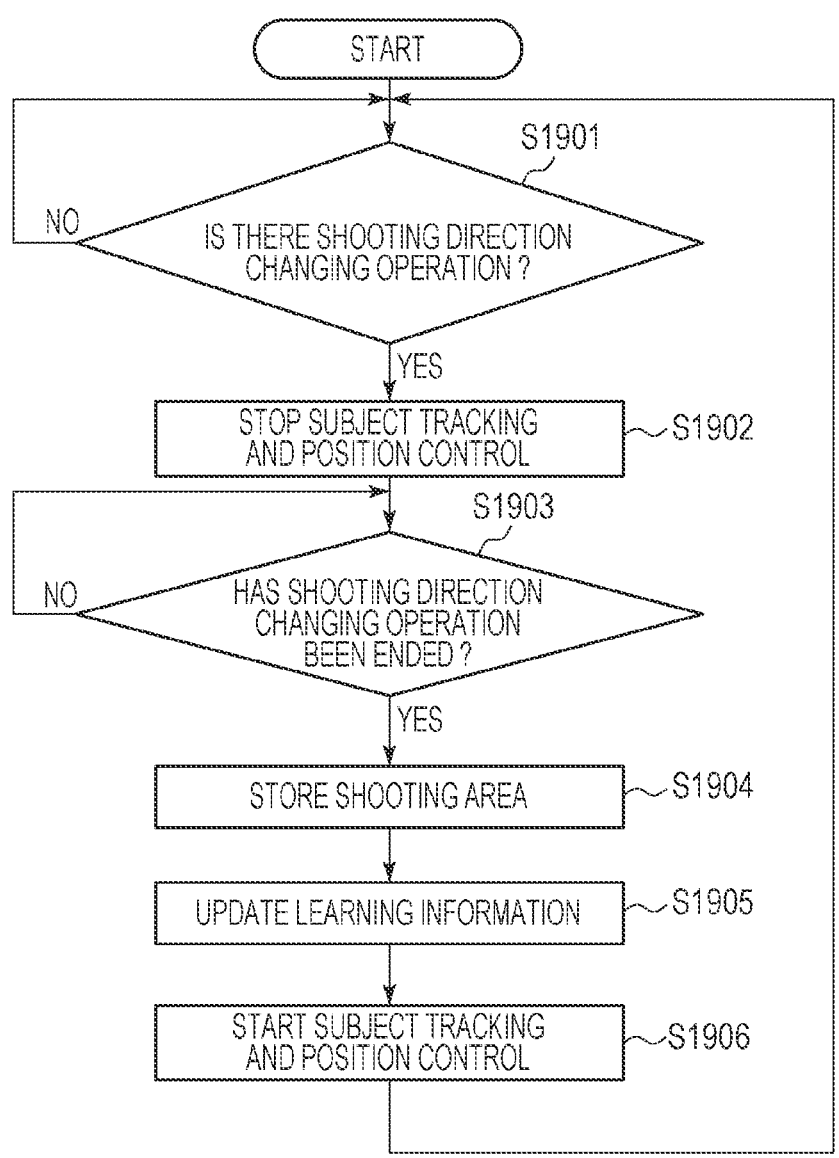
FIG. 19 is a flowchart that illustrates detection of a shooting direction changing operation.

The reference numeral 1702 in FIG. 17 indicates a compensator. The compensator 1702 calculates a control output by performing PID control computation such that the difference between the current pan position and the target pan position calculated by the image position-pan position conversion section 1701 is eliminated. The reference numeral 1703 indicates a shooting direction changing operation detection section. The shooting direction changing operation detection section 1703 detects a shooting direction changing operation based on the difference (hereinafter, positional deviation) between the target pan position and the current pan position, the control output, and pan moving speed. When the shooting direction changing operation detection section 1703 detects a change of the shooting direction, the shooting direction changing operation detection section 1703 stops panning by stopping the control output. On the other hand, when the shooting direction changing operation detection section 1703 does not detect a change of the shooting direction, the shooting direction changing operation detection section 1703 drives and controls panning according to the control output calculated by the compensator 1702. The reference numeral 1704 indicates a driver for generating a drive signal commensurate with the control output calculated by the compensator 1702. The reference numeral 1705 is an ultrasonic motor (USM) that is an actuator for driving the pan shaft 1706. The reference numeral 1707 indicates a moving speed detection section for calculating a pan moving speed from a time change in pan position. The moving speed detection section 1707 calculates a pan moving speed from a variation in pan position at each control sampling. FIG. 19 is a flowchart that shows the flow of detecting a shooting direction changing operation made through a user's operation and updating learning information by setting a shooting area after the shooting direction changing operation as an important area.

In S1901, it is determined whether there is a shooting direction changing operation made by the user on the image pickup apparatus. In detecting a shooting direction changing operation made by the user, when the control output and the positional deviation (described later) satisfy predetermined conditions, the shooting direction changing operation detection section 1703 determines that there is a change in shooting direction. When a shooting direction changing operation is detected in S1901, the process proceeds to S1902, and the position control operation is stopped. When subject tracking or searching is being performed, the subject tracking or searching is interrupted, and then the position control operation is stopped. On the other hand, when a shooting direction changing operation is not detected in S1901, detection of a shooting direction changing operation is continued. After position control is stopped in S1902, the process proceeds to S1903, and it is determined whether the shooting direction changing operation made by the user is ended.

Figure 20:
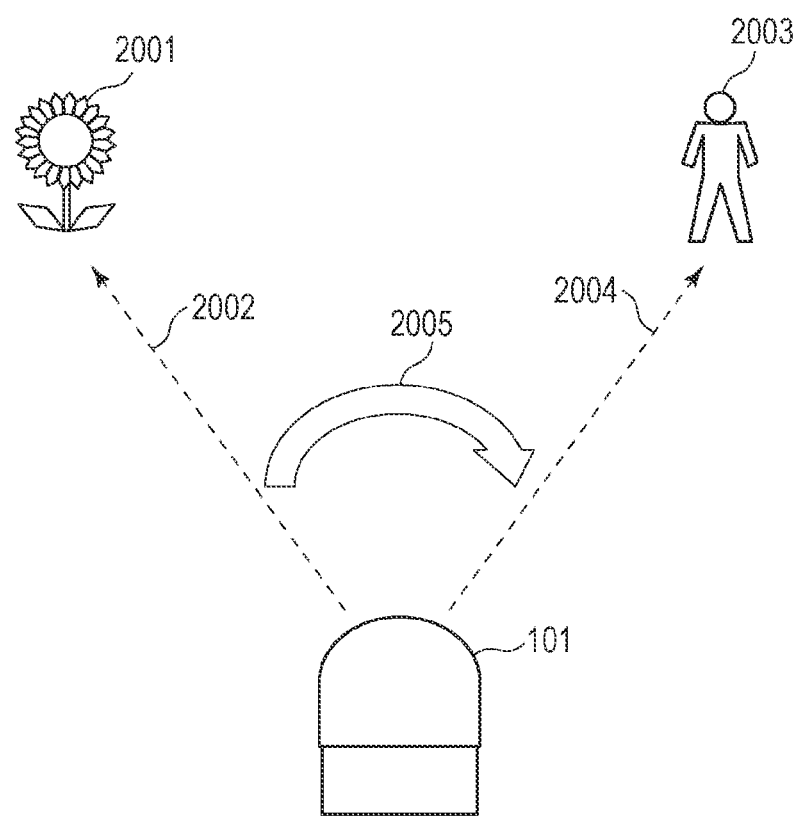
FIG. 20 is a diagram that schematically shows detection of the shooting direction changing operation.

In determining the end of the shooting direction changing operation, the shooting direction changing operation detection section 1703 determines whether the shooting direction changing operation is continued or ended based on the pan moving speed. When it is determined that the shooting direction changing operation is ended, the process proceeds to S1904, and shooting area information after the end of the shooting direction changing operation is stored. The area to be stored is a closest area by comparing the angle of view that is determined from the position of the image pickup apparatus, the pan position, the tilt position, and the focal length, with each divided area. When it is determined in S1903 that the shooting direction changing operation is being performed, detection of the end of the shooting direction changing operation is continued. In S1905, learning information is updated such that the area stored in S1904 is more important than the other divided areas. In S1906, subject tracking and position control are enabled, and then the process proceeds to S1901, and detection of a shooting direction changing operation is resumed. At this time, in order to inform the user that the image pickup apparatus 101 is tracking, a special image (image effect) different from that of the above-described face identification is displayed on a tracking target image or around the image. As an example in which the user makes a shooting direction changing operation, an example of the case where the user makes the shooting direction changing operation by turning the lens barrel 102 by hand while shooting a flower with the image pickup apparatus 101 such that the optical axis of the image pickup apparatus 101 is directed toward a specific person outside the angle of view will be described. FIG. 20 is a schematic diagram for illustrating an example in which the lens barrel 102 is turned by user's hand toward a person 2003 while the image of a flower 2001 is being shot with the image pickup apparatus 101 and then learning information is updated such that an area in which the person 2003 is present is set as an important area. The reference numeral 2002 in FIG. 20 indicates the optical axis of the image pickup apparatus 101 that is shooting the flower 2001. The reference numeral 2004 indicates the optical axis after the user changes the shooting direction by hand. The reference numeral 2005 indicates the turning direction of the lens barrel 102 at the time when the user changes the shooting direction. The operation in which the shooting direction is changed toward the person 2003 through a user's operation while the flower 2001 is being shot and then learning information is updated such that the area in which the person 2003 is present is set as an important area will be described with reference to FIG. 21 and FIG. 22. FIG. 21A, FIG. 21B, FIG. 21C, and FIG. 21D are views that show instantaneous images shot in a period during which the shooting direction is changed toward the specific person 2003 by changing the shooting direction while the flower is being shot and learning information is updated. FIG. 22 is a graph that shows time changes in pan control output 2201, positional deviation 2202, and moving speed 2203 in a period during which the user changes the shooting direction toward the specific person 2003 while the flower is being shot and learning information is updated such that the area of the changed angle of view is set as an important area. ta, tb, tc, td in FIG. 22 are respectively times at which the images shown in FIG. 21A, FIG. 21B, FIG. 21C, and FIG. 21D are shot. ThC in FIG. 22 is a threshold of control output, which is used to determine that the user has turned the lens barrel 102 by hand. ThDiff is a threshold of positional deviation, which is used to determine that the user has turned the lens barrel 102 by hand. When the state where the control output is greater than or equal to ThC and the positional deviation is greater than or equal to ThDiff continues for a predetermined time (t2−t1 in FIG. 22), it is regarded that the shooting direction has been changed by the user, and the control output of the compensator 1702 is stopped. ThV is a threshold of the moving speed of the pan shaft, which is used to determine that the user has stopped operating the shooting direction. CMax is a maximum value of control output of the compensator 1702. At the time of position control, the pan shaft is driven and controlled such that the subject is located at the target position on the image by changing the control output within the range from −CMax to CMax. t1 in FIG. 22 indicates the time at which the control output 2201 is greater than or equal to ThC and the positional deviation is greater than or equal to ThDiff after the user starts the shooting direction operation. t2 indicates the time at which a period of time in which the control output 2201 is greater than or equal to ThC and the positional deviation 2202 is greater than or equal to ThDiff has reached a shooting direction change determination time (t2−t1). t3 indicates the time at which, after time t2, the pan shaft moving speed becomes ThV or below for the first time. t4 indicates the time at which an elapsed time after the moving speed becomes ThV or below at time t3 becomes a shooting direction change end determination time (t4−t3).

Figure 21A:
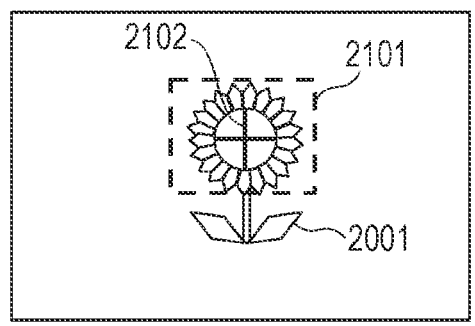
FIG. 21A is a view that shows an image shot at the timing of time ta.
Figure 21B:
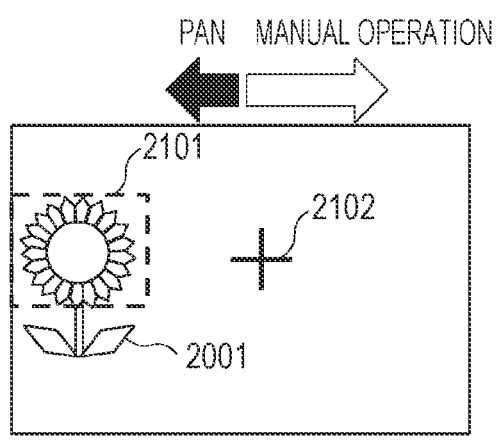
FIG. 21B is a view that shows an image shot when a user turns a lens barrel 102 rightward with respect to a fixed part 103 at the timing of time tb.
Figure 22:
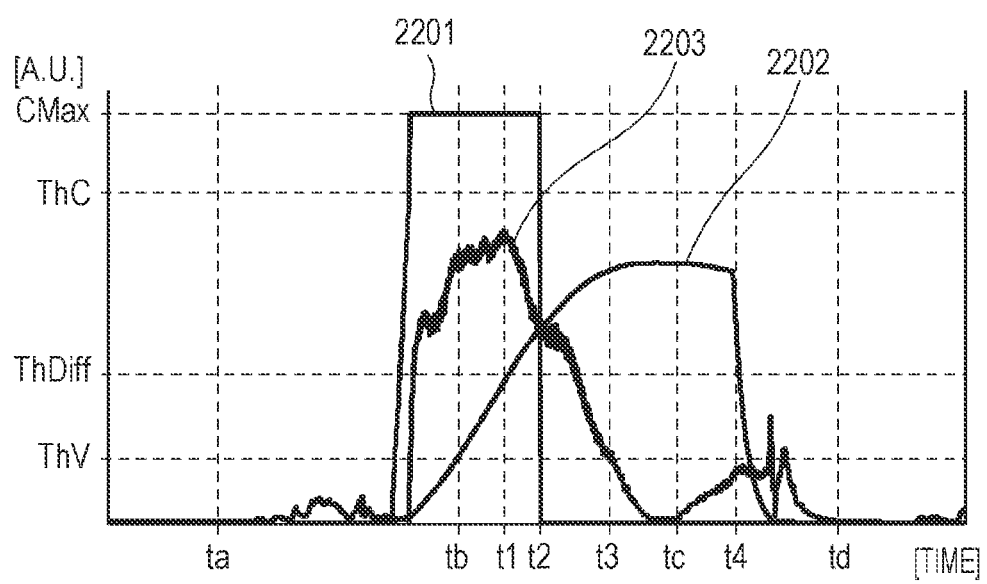
FIG. 22 is a graph that shows time changes in control output 2201, positional deviation 2202, and moving speed 2203 of panning for the shooting direction changing operation.

FIG. 21A is an image shot at the timing of time to while the flower 2001 is being shot. The reference numeral 2101 in FIG. 21A indicates a subject frame that represents a subject as a tracking, searching, or shooting target. The reference numeral 2102 indicates a target point that is the target position on the image at the center of the subject frame 2101. A point at which the two lines indicated by 2102 intersect with each other is the target position of the subject on the image. During normal shooting operation (not in a state of shooting direction changing operation), position alignment is performed by driving and controlling the pan shaft or the tilt shaft such that the center of the subject frame 2101 and the target point 2102 coincide with each other. FIG. 21B is an image shot at the time when the user turns the lens barrel 102 rightward with respect to the fixed part 103 at the timing of time tb in the state of FIG. 21A. The solid arrow in FIG. 21B indicates the panning direction for position control. The outlined arrow indicates the turning direction of the lens barrel 102 through a user's shooting direction changing operation. When the control output 2201 and the positional deviation 2202 at time tb are seen, although the control output is the maximum value CMax, the positional deviation 2202 tends to increase. From this, it is determined that the user is intentionally turning the pan shaft. In the present embodiment, a determination as to whether the shooting direction is changed is performed after the predetermined time (t2−t1) that is taken from when the state where the user is turning the lens barrel 102 by hand is sensed to when the control output of the compensator 1702 is stopped. This is a measure for not determining that there is a shooting direction operation when the user unintentionally touches the lens barrel or under the influence of load fluctuations of the pan shaft or tilt shaft being driven for searching although the user is not performing a direction change operation. A time to fix may be shortened or omitted in order to quickly perform a shooting direction change determination after the user starts the shooting direction changing operation.

Figure 21C:
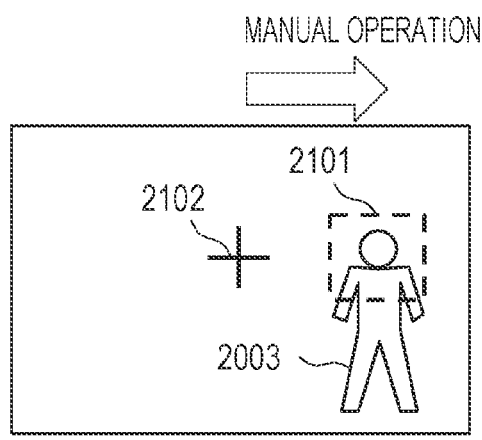
FIG. 21C is a view that shows an image when a target subject is placed in the angle of view as a result of turning a pan shaft to near a new subject through user's shooting direction changing operation in a state where a control output of a compensator 1702 is stopped at time tc.

FIG. 21C is a view at the time when a target subject enters the angle of view by turning the pan shaft to near the new subject through a user's shooting direction changing operation in a state where the control output of the compensator 1702 is stopped at time tc. In this way, the user needs to continue the shooting direction changing operation until a subject that is a new shooting target enters the angle of view. When an image of which the shooting direction is being changed cannot be directly checked as in the case of the image pickup apparatus 101 described in the present embodiment, the user confirms that a subject that is a shooting target enters the angle of view by making the operation while checking the image being changed with the smart device. As another means for the user to learn that a subject that is a shooting target enters the angle of view, when a new subject enters the angle of view during a change in shooting direction, the user may be notified by the LED control section 224 lighting the LED or the voice output section 218 outputting a voice.

Figure 21D:
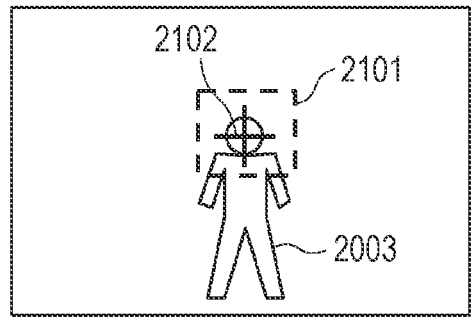
FIG. 21D is a view that shows an image obtained by tracking and imaging the new subject after a change of the shooting direction in a state where the control output of the compensator 1702 is started at the timing of time t4.

FIG. 21D is an image during tracking or shooting of a new subject after the shooting direction is changed in a state where the control output of the compensator 1702 is started at the timing of time t4. Time t4 is the timing at which a period of time after the pan moving speed 2203 becomes lower than or equal to ThV at time td is longer than or equal to the shooting direction changing operation end determination time (t4−t3). When it is determined at time t4 that the user's shooting direction changing operation is ended, the shooting area at the time point of t4 is set as a user's preferred area and is set so as to be higher in degree of importance than the other areas, and then learning information is updated. Also, a subject present in this area may be subjected to one or more operations of tracking, shooting, and identification registration as an important subject. For example, as shown in FIG. 21D, when the person 2003 is present within the angle of view at the timing at which the end of the user's shooting direction changing operation is detected, the person 2003 is subjected to any one or more operations of tracking, shooting, and identification registration as an important subject. The learning information updating process may be performed only when there is a user's learning instruction and not performed automatically. Learning information may be updated only when there is a learning instruction from the user. For example, after the image pickup apparatus notifies the user that a subject enters the angle of view, only when the user inputs a specific voice command for a learning instruction registered in advance, learning information is updated.

Figure 23:
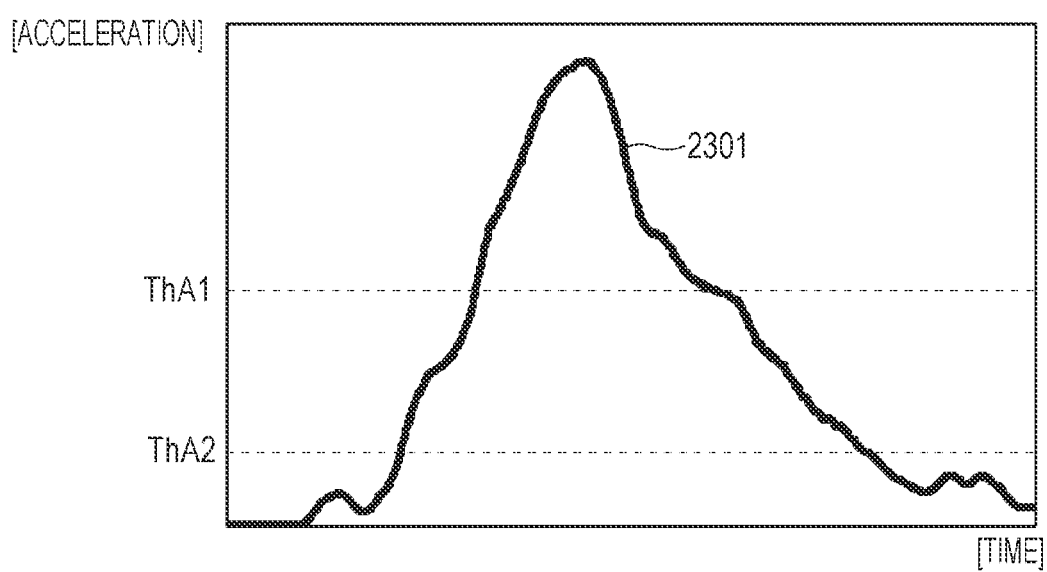
FIG. 23 is a graph that shows a change in the output of an acceleration sensor of an apparatus shake detection section 209 at the time when the shooting direction of the image pickup apparatus is changed through user's operation.

In the present embodiment, the example in which the start and end of the shooting direction changing operation on the image pickup apparatus by the user is detected based on the control output of the compensator, the positional deviation, and the moving speed of the drive shaft is described; however, a user's shooting direction operation may be detected with another method as long as the user's shooting direction operation can be detected. For example, whether there is a change in shooting direction, made by the user, may be detected based on a time change in the signal of the gyro sensor or acceleration sensor from the apparatus shake detection section 209. FIG. 23 shows a change in the output of the acceleration sensor of the apparatus shake detection section 209 at the time when the shooting direction of the image pickup apparatus is changed through a user's operation. The reference numeral 2301 indicates a time change in acceleration. ThA1 is a threshold of acceleration, which is used at the time of determining that the user has started the shooting direction changing operation. ThA2 is a threshold of acceleration, which is used at the time of determining that the user has stopped the shooting direction changing operation. The start and stop of the shooting direction changing operation may be detected by comparing the acceleration with these thresholds. At this time, in order to prevent erroneous detection of a shooting direction changing operation, a time change pattern of acceleration at the time of shooting direction changing operation may be learned in advance, and it may be determined that the shooting direction has been changed when the similarity between a time change in detected acceleration and the learned time change pattern is higher than or equal to a predetermined value. Similarly, whether there is a shooting direction operation may be detected based on a change in the motion vector of an image shot by the image pickup apparatus.

In the above-described description, the process in which a shooting area that enters the angle of view after the shooting direction changing operation is learned as an important area is described. However, not limited thereto, a process in which, when there is a zoom change or a change of the shooting area through a user's operation on the external apparatus, the shooting area after the change operation is learned as an important area may be employed.

Process is Changed According to Low Electric Power Consumption Mode Cancellation Condition The basic process sequence of the shooting mode in the present embodiment is described with reference to FIG. 9; however, if a process is performed in accordance with this sequence anytime, it takes time to find a subject and perform automatic shooting. In this case, there are concerns that a photo opportunity is missed or a subject different from a user's intention is shot. Particularly, at the time when the low electric power consumption mode is cancelled (hereinafter, referred to as wake-up), an optimal process sequence varies depending on a cancellation made based on what condition. Here, examples of a wake-up condition and a process sequence suitable for the condition will be described.

(1) Wake-Up Based on Tap Detection

A wake-up based on tap detection is possible as described above. In such a case, it is presumable that the owner of the image pickup apparatus 101 has issued a wake-up instruction with an intention to perform shooting. Therefore, a process in which the owner is found as a result of searching therearound and automatic shooting is performed immediately such that the owner is shot is preferable.

Figure 27:
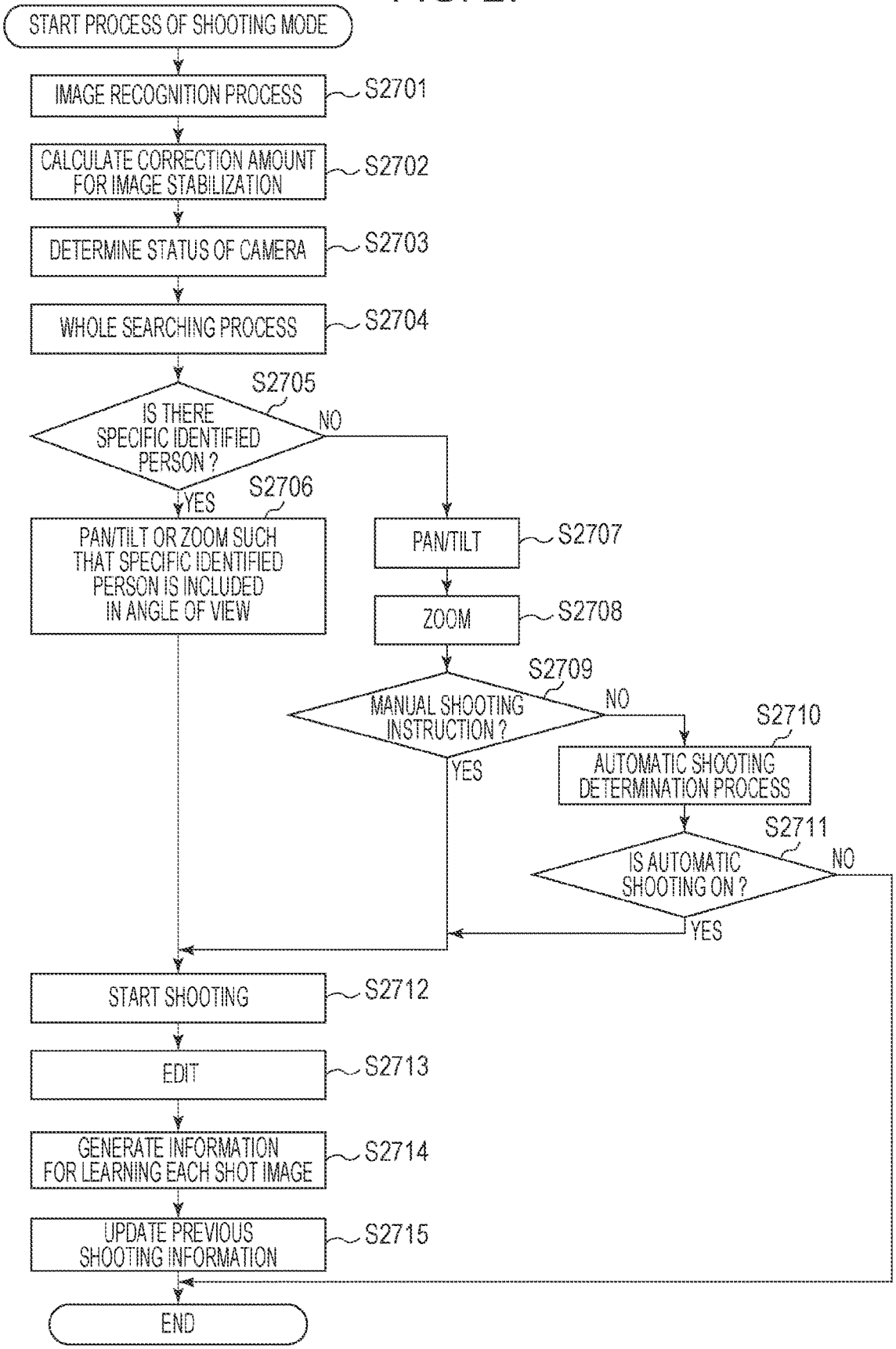
FIG. 27 is a flowchart that illustrates an automatic shooting process in the case of wake-up based on tap detection.

FIG. 27 shows a process for the shooting mode in this case.

Step S2701 to step S2703 are the same as those of the process during normal times, described in FIG. 9, so the description is omitted.

In step S2704, different from the normal process, searching is performed while the camera is being panned/tilted such that all the angle of view is covered.

In step S2705, it is determined whether a specific identified person is in the angle of view. At this time, it is desirable that the face of the owner is registered as an identified face for the owner in advance and a search for the owner is made as the specific identified person. When the owner is found within the angle of view, the process proceeds to S2706.

In step S2706, the camera is panned/tilted or zoomed such that the owner is included in the angle of view, and then the process proceeds to the shooting start operation of step S2712.

Step S2707 to step S2715 are processes similar to S905 to S913 of FIG. 9, so the description is omitted.

With such a process, shooting that immediately responds to a user's intention is possible.

(2) Wake-Up Based on Sound Detection

A wake-up based on sound detection and voice command recognition is possible as described above. In the case of sound detection, there is a high possibility that a person of concern is present in the sound direction. In the case of voice command recognition, it is presumable that a person who spoke a voice command has an intention to want the camera to take a picture of his or her own. Hence, a process in which a person in a direction in which a voice is detected is found and automatic shooting is immediately performed is preferable.

Figure 28:
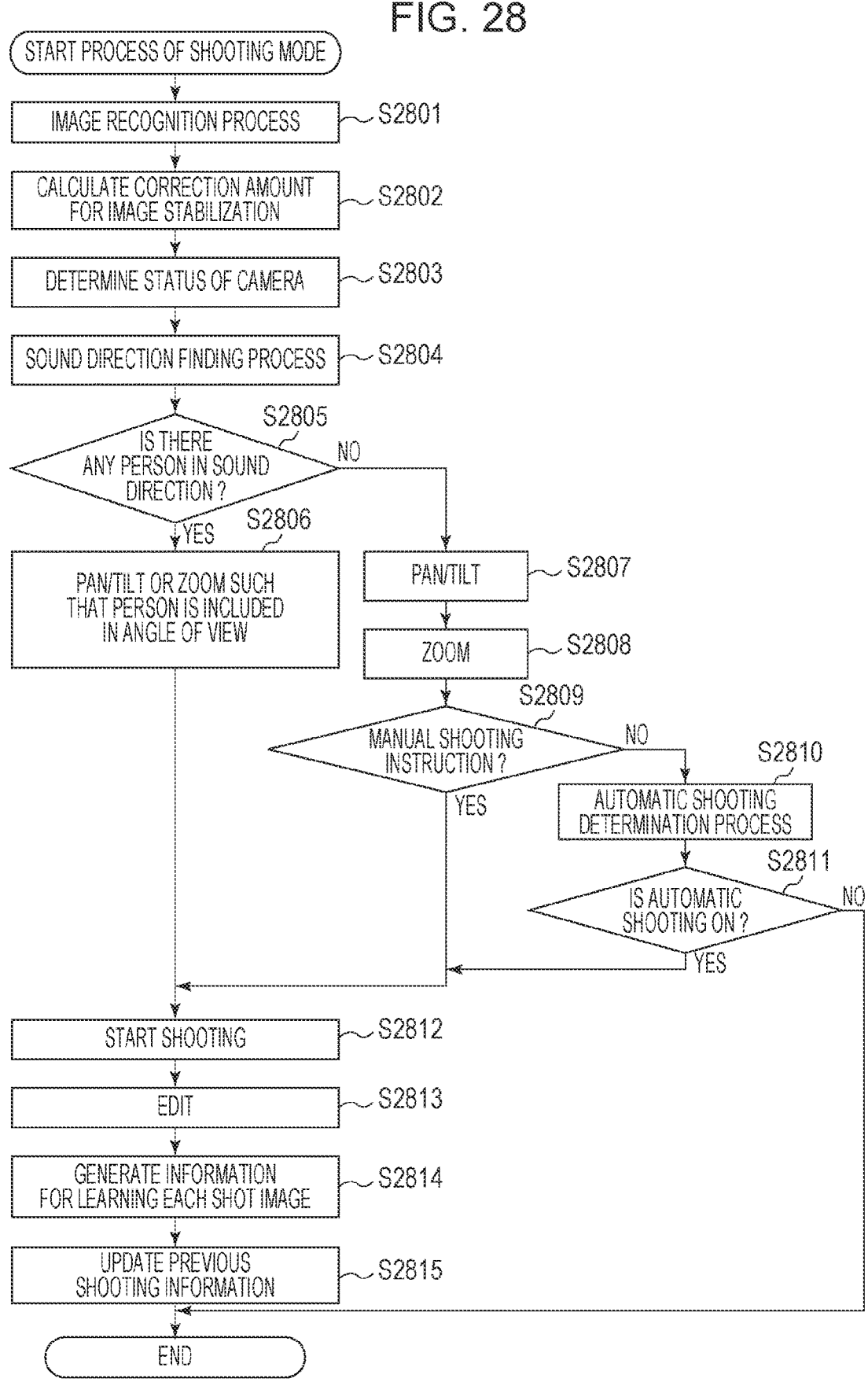
FIG. 28 is a flowchart that illustrates an automatic shooting process in the case of wake-up based on sound detection.

FIG. 28 shows a process for the shooting mode in this case.

Step S2801 to step S2803 are the same as those of the process during normal times, described in FIG. 9, so the description is omitted.

In step S2804, different from the normal process, the camera is panned/tilted such that the direction in which the sound direction is detected is included in the angle of view.

In step S2805, it is determined whether there is a person in the angle of view in the sound direction. When there is a person, the person is regarded as a source that generates the sound or voice command, and the process proceeds to S2806 for shooting the person.

In step S2806, the camera is panned/tilted or zoomed such that the person is included in the angle of view, and then the process proceeds to the shooting start operation of step S2812.

Step S2807 to step S2815 are processes similar to S905 to S913 of FIG. 9, so the description is omitted.

With such a process, the effect of being able to perform shooting without missing an opportunity to shoot a highly interested moment, such as a cheer arouse, can be expected. Also shooting that immediately responds to the intention of a person who speaks a voice command is possible.

(3) Wake-Up Based On Other Conditions

At the time of wake-up based on the other conditions (for example, the time lapse determination described in FIG. 8), a process is performed in accordance with the basic sequence of FIG. 9. With this configuration, automatic shooting is performed only when an important subject is needed, so electric power consumption and consumption of the available capacity of the storage device are reduced.

According to the above-described embodiment, the following functions are possible.

(1) Startup

The searching and shooting process after startup are changed according to a startup condition.

In this way, according to what the image pickup apparatus is started up, a process after startup (automatic shooting determination, searching process, or sleep determination process) is changed. Thus, this can solve the problem that it takes time when a uniform startup sequence is executed each time and, as a result, a photo opportunity is missed or a subject different from a user's intention is shot.

Example 1

When woken by voice, the image pickup apparatus faces toward the direction of the voice and starts searching and a shooting determination Example 2

When woken up by tapping, the image pickup apparatus searches for an owner (identified face).

(2) Sleep

A subject scene determination means is provided, and the image pickup apparatus decides to enter into automatic sleep according to the scene determination result. A sleep time is adjusted according to the determination result. A means for determining the internal status of the image pickup apparatus is provided, and the image pickup apparatus enters into automatic sleep in accordance with the internal status determination means.

In this way, the image pickup apparatus enters into automatic sleep according to a subject or a scene. A sleep time is also adjusted. The image pickup apparatus enters into automatic sleep according to the internal status of the process on the image pickup apparatus. Thus, the problem that, in the case of sleep simply based on an elapsed time or no operation, the power saving effect is low and there are concerns of the missing of a photo opportunity can be solved.

Example 1

When there is no subject, the image pickup apparatus shifts into power saving.

Example 2

When there is a poor change in scene, the image pickup apparatus is placed in sleep for a longer time.

Example 3

When the mode does not correspond to any one of automatic shooting mode, learning mode, editing mode, and transfer mode, the image pickup apparatus is placed in sleep.

Example 4

Battery Level (3) Automatic Image Transfer

According to at least one of conditions, that is, an elapsed time, an evaluation value of a shot image, a battery level, and a card capacity, an image is automatically transferred or an image transfer frequency is automatically decided.

In this way, an image is automatically transferred according to a condition (at each lapse of a predetermined time, when a highly valued image is shot). An image transfer frequency is automatically decided according to a condition (when the level of the battery is low, image transfer is made difficult; when a shooting frequency is set to a high frequency, the transfer frequency is also increased; when the available capacity of the storage medium is small, the transfer frequency is increased). Thus, the problem that, when image transfer is performed according to a user's instruction, there is a time for waiting for a transfer process or the capacity of the external apparatus is tightened depending on a user for a prescribed transfer frequency or transfer number of images can be solved.

(4) Learning

The image pickup apparatus automatically enters into the learning mode according to at least one of the conditions, that is, an elapsed time, the degree of accumulation of training data, a determination result of a current scene or subject, scheduled time, a possibility of future shooting, and the time of power off.

In this way, the image pickup apparatus automatically enters into the learning mode according to a condition (automatic shooting is not performed for a certain time, such as when new training data has accumulated more than or equal to a predetermined amount, when a lapse of time from the last learning is long, or when no distinguishable subject is present around). Thus, the problem that, unless a condition that the shooting mode enters into the learning mode is appropriately set, a time to wait for a learning process arises or an electric power is uselessly consumed can be solved.

(5) Automatic Deletion of Image

Automatic deletion is performed according to a condition. A target number of images to be deleted is set according to a shooting frequency and available capacity. <Images manually shot by the user>, <images highly valued by the user>, and <images having a high importance score calculated by the image pickup apparatus> are made difficult to be deleted. <Images transferred to the external apparatus> and <images not seen by the user even at once> are made easy to be deleted. When acquired highlight videos are shot at short intervals, old files may be preferentially deleted. When acquired highlight videos are shot at long intervals, files old but having a high score may be set not to be deleted. When learning is performed such that a video shooting frequency increases, images more than usual may be automatically deleted.

Thus, the problems that automatic shooting cannot be performed when there is no available capacity and deleting one by one by user's hand is troublesome can be solved.

(6) Automatic Editing

According to at least one of conditions, that is, the degree of accumulation of shot images, an elapsed time from last editing, an evaluation value of each shot image, and a temporal occasion, the editing process is automatically performed.

Thus, the problem that, when a story photo moving image is created according to a user's instruction, there is a time for waiting for a creation process and usability is poor can be solved.

In the above-described <Configuration of Accessories>, the attachment for connection to another camera 3201 is described with reference to FIG. 32. An example of the case where the image pickup apparatus 101 and another camera 3201 perform shooting in cooperation with each other will be described.

A method of shooting at the same time by releasing one of the cameras so as to match the release timing of the other camera between the cameras is known as an existing technology.

In the present embodiment, shooting is performed in cooperation between the cameras; however, before the release button 3203 of the camera 3201 is depressed, the image pickup apparatus 101 starts shooting before the camera 3201 performs shooting by predicting depression of the release.

The image pickup apparatus 101 performs automatic shooting with a similar method to the method of the described automatic shooting. At this time, learning for predicting the timing that the camera 3201 performs shooting is performed. When cooperative shooting is performed, an automatic shooting determination is performed with this network.

The operation of the image pickup apparatus 101 in the configuration that the user operates the camera 3201 to perform shooting will be described. FIG. 33 shows a flowchart of the image pickup apparatus 101.

Here, an example in which the camera 3201 shoots a still image and the image pickup apparatus 101 shoots a moving image will be described.

When the shooting mode process starts, it is initially determined in S3301 whether the mode is a camera cooperation mode. When the mode is the cooperation mode, the process proceeds to S3303; whereas, when the mode is not the cooperation mode, the process proceeds to S3302.

The cooperation mode may be determined whether the camera 3201 and the image pickup apparatus 101 are connected by wire or wirelessly or may be set with the smart device 301.

In S3202, the mode is not the camera cooperation mode, so the process described with reference to FIG. 9 is performed, the shooting mode process is ended, and the process waits for the next computation cycle. In S3303, information is loaded from the camera 3201. Information about depression of the release switch of the camera 3201, power on state information, information about a subject from an image, or the like, is provided to the image pickup apparatus 101 as the information, and the process proceeds to S3304.

In S3304, it is determined whether the image pickup apparatus 101 is performing shooting. When the image pickup apparatus 101 is not performing shooting, the process proceeds to S3305; whereas, when the image pickup apparatus 101 is performing shooting, the process proceeds to S3306. In S3305, it is determined whether the camera 3201 has started shooting. When the camera 3201 has started shooting, the process proceeds to S3310, shooting of the image pickup apparatus 101 is started, the shooting mode process is ended, and the process waits for the next computation cycle. When the camera 3201 has not started shooting in S3305, the process proceeds to S3307 and performs an automatic shooting determination process. The automatic shooting determination process can be implemented with a similar method to the method described with reference to FIG. 12. At this time, a determination may be performed by using both information from the camera 3201 and information from the image pickup apparatus 101 as feature amount inputs or a determination may be performed by using information from only any one of them.

When the automatic shooting determination process is completed, the process proceeds to S3308, and it is determined whether to start shooting in the automatic shooting determination process. When the start of automatic shooting is determined, the process proceeds to S3309, and the image pickup apparatus 101 starts automatic shooting. When the start of automatic shooting is not determined, shooting is not performed, the shooting mode process is ended, and the process waits for the next computation cycle.

When it is determined in S3304 that shooting is being performed after the start of shooting in S3310 or S3309, a shooting end determination process is performed in S3306. Then, when the end of shooting is determined, the process proceeds to S3311, and the image pickup apparatus 1010 ends shooting. When the end of shooting is not determined, the shooting mode process is ended while shooting is being performed as it is, and the process waits for the next computation cycle.

The automatic shooting determination process may be implemented with a similar method to the method described with reference to FIG. 12. At this time, a determination may be performed by using both information from the camera 3201 and information from the image pickup apparatus 101 as feature amount inputs or a determination may be performed by using information from only any one of them.

In this configuration, the image pickup apparatus 101 is configured to perform automatic shooting. Alternatively, the image pickup apparatus 101 may continuously shoot a moving image, attach a tag to an important time frame, and record the tag in a final moving image file.

Cooperative automatic shooting timing may be learned by using shooting results.

For example, when the image pickup apparatus 101 is not performing automatic shooting or when the camera 3201 starts shooting, feature amounts that are inputs of FIG. 12 at that time as learning data are saved as incorrect data.

When the image pickup apparatus 101 is performing automatic shooting or when the camera 3201 starts shooting, feature amounts that are inputs of FIG. 12 at that time as learning data are saved as correct data.

When the image pickup apparatus 101 is performing automatic shooting or when the camera 3201 does not start shooting after a lapse of a predetermined time, feature amounts that are inputs of FIG. 12 at that time as learning data are saved as incorrect data.

When learning data accumulates more than or equal to a predetermined amount, the learning data is learned, and the weights of the neural network of FIG. 12 are changed.

An example in which the camera 3201 shoots a still image and the image pickup apparatus 101 shoots a moving image is described; however, the shooting method is not limited thereto. The following patterns may be manually selected with the smart device 301, or the like.

The following patterns may be automatically selected by the image pickup apparatus 101. When automatically selected, which pattern is used to perform shooting is also automatically determined.

For example, when the camera 3201 shoots a still image, the image pickup apparatus 101 shoots a moving image.

Alternatively, for example, when the camera 3201 shoots a still image, the image pickup apparatus 101 shoots a still image.

Alternatively, when the camera 3201 shoots a moving image, the image pickup apparatus 101 shoots a still image.

Alternatively, when the camera 3201 shoots a moving image, the image pickup apparatus 101 shoots a moving image.

The orientations and angles of view of the optical axis directions of the camera 3201 and image pickup apparatus 101 may be manually selected or automatically selected.

For example, the optical axis directions of the camera 3201 and image pickup apparatus 101 are oriented in the same direction.

Alternatively, for example, the optical axis directions of the camera 3201 and image pickup apparatus 101 are oriented in the different directions.

The angles of view of the camera 3201 and image pickup apparatus 101 are the same.

Alternatively. the angles of view of the camera 3201 and image pickup apparatus 101 are different.

Even when the image pickup apparatus 101 shoots a still image, the image pickup apparatus 101 may predict the timing before the start of shooting and, during an automatic shooting period, automatically shoot not only a single image but also several images.

In the present embodiment, the example in which the image pickup apparatus 101 is connected to the accessory shoe 3202 of the camera 3201 and is used is described; however, the configuration is not limited thereto. For example, the image pickup apparatus 101 may be mounted on another member (for example, a tripod screw thread, or the like) of the camera 3201 or may be used without being directly mounted on the camera 3201 (for example, worn on the user in a wearable manner and information is provided through wireless communication).

In the present embodiment, an example in which the image pickup apparatus 101 shoots an image by predicting that the camera 3201 shoots an image in advance is described. Alternatively, the camera 3201 itself may predict shooting in advance. In this case, when it is determined to perform shooting through prediction in advance, the camera 3201 may output an instruction to start shooting to the image pickup apparatus 101, thus performing camera cooperation shooting with advance prediction may be performed.

Notification of information between the camera 3201 and the image pickup apparatus 101 may be configured to be provided only at the release timing. Detected information of both the camera 3201 and the image pickup apparatus 101 may be used to determine the start of shooting. Alternatively, detected information of only the image pickup apparatus 101 may be used to determine the start of shooting.

Learning Using Camera 3201

(1) Transfer of Information of Camera 3201 to Image Pickup Apparatus 101

For example, a main subject is extracted from an image shot by the camera 3201 through a user's operation.

Then, subject information is provided to the image pickup apparatus 101 and set. After that, the image pickup apparatus 101 determines whether the subject is important based on the number of shot images of the subject, registers the subject, and performs automatic shooting, tracking, or the like.

(2) Subject Registration with Information Acquired in Image Pickup Apparatus 101 at Time Point of Start of Release For example, the timing at which the camera 3201 performs shooting is provided to the image pickup apparatus 101 through a user's operation. Then, an important subject is set from the image in the image pickup apparatus 101 at the shooting timing. After that, the image pickup apparatus 101 determines whether the subject is important based on the number of shot images of the subject, registers the subject, and performs automatic shooting, tracking, or the like.

Notification of Information from Image Pickup Apparatus 101 to Camera 3201

An example in which another camera 3201 is assisted with information from the image pickup apparatus 101 in the case where shooting is performed in cooperation between the image pickup apparatus 101 and the camera 3201 will be described.

(1) Notification of Subject Information

Subject information detected by the image pickup apparatus 101 (for example, a personally registered face, a subject, such as a dog or a cat, determined as owner's preference, or a determination result of sensuousness that a subject of the user's preference is determined) is provided to the camera 3201. Then, where the subject is located in a live image of the camera 3201 and what subject is present outside an image (for example, a vehicle is present at the right side of the screen) is provided, and whether there is a subject of the user's preference is provided.

(2) Release Notification

The image pickup apparatus 101 may be configured to provide a shooting instruction to the camera 3201.

With the method described in the process of the automatic shooting mode, shooting timing is determined, and an automatic shooting instruction is provided to the camera 3201.

It may be determined whether a specific object approaches into the screen of the camera 3201, and continuous shooting or video shooting may be performed at the timing at which the specific object enters into the screen.

According to the present embodiment, the image pickup apparatus that is able to acquire a video image of the user's preference without any user's special operation can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging apparatus comprising:
an imaging unit configured to output image data; and
one or more processors and/or circuitry which functions as:
 a control unit configured to control a direction of the imaging unit so that the imaging unit is directed to a subject;
 a subject detection unit configured to detect a subject in the image data output by the imaging unit; and
 a state acquisition unit configured to acquire information about a holding state of the imaging apparatus among a plurality of holding states including at least one of a state where the imaging apparatus is placed to capture an image, a state where the imaging apparatus is held by a hand, a state where the imaging apparatus is hung from a neck, and a state where the imaging apparatus is wearable,
wherein the control unit is configured to set a change range in which the direction of the imaging unit is changed based on the information about the holding state of the imaging apparatus acquired by the state acquisition unit.

2. The imaging apparatus according to claim 1, wherein the control unit is configured to control the imaging unit to rotate in a pan direction and a tilt direction.

3. The imaging apparatus according to claim 1, wherein the imaging unit is configured to input detection information about the subject detected by the subject detection unit into a neural network and learn the change range.

4. The imaging apparatus according to claim 1, wherein the imaging unit is configured to input a captured image into a neural network and learn the change range.

5. The imaging apparatus according to claim 1, wherein the information about the holding state of the imaging apparatus is information about an attachment attached to the imaging apparatus.

6. The imaging apparatus according to claim 1, wherein the information about the holding state of the imaging apparatus is acquired based on an output of a shake detection unit configured to detect a shake of an apparatus.

7. The imaging apparatus according to claim 1, wherein the processors and/or circuitry further function as an automatic imaging unit configured to perform imaging processing of recording the image data output by the imaging unit based on information about the subject detected by the subject detection unit.

8. The imaging apparatus according to claim 7,
wherein the subject detected by the subject detection unit is a human face, and
wherein the automatic imaging unit is configured to perform the imaging processing based on a frequency of a subject being searched and an expression of a person.

9. The imaging apparatus according to claim 7,
wherein the subject detected by the subject detection unit is an object, and
wherein the automatic imaging unit is configured to perform the imaging processing based on object recognition.

10. The imaging apparatus according to claim 7, wherein the automatic imaging unit is configured to perform the imaging processing using a parameter generated based on machine learning.

11. The imaging apparatus according to claim 1, wherein the control unit changes the change range in which the direction of the imaging unit is changed depending on whether the information acquired by the state acquisition unit indicates a state where the imaging apparatus is placed to capture an image or a state where the imaging apparatus is held by hand.

12. The imaging apparatus according to claim 1, wherein the control unit changes the direction of the imaging unit within the change range and performs subject searching.

13. A control method for controlling an imaging apparatus including an imaging unit configured to output image data, and one or more processors and/or circuitry, the control method comprising:
detecting a subject in the image data output by the imaging unit;
acquiring information about a holding state of the imaging apparatus among a plurality of holding states including at least one of a state where the imaging apparatus is placed to capture an image, a state where the imaging apparatus is held by a hand, a state where the imaging apparatus is hung from a neck, and a state where the imaging apparatus is wearable; and
controlling a change range in which a direction of the imaging unit is changed based on the information about the holding state of the imaging apparatus acquired in the acquiring.

14. A non-transitory computer-readable storage medium storing a program for causing a computer to execute the control method according to claim 13.

* * * * *